(12) United States Patent
Wynn

(10) Patent No.: US 7,092,386 B2
(45) Date of Patent: Aug. 15, 2006

(54) NETWORK TELEPHONE SYSTEM AND METHODS THEREFOR

(76) Inventor: Sol H. Wynn, 11046 Grenache Way, Elk Grove, CA (US) 95624

( * ) Notice: Subject to any disclaimer, the term of this patent is extended or adjusted under 35 U.S.C. 154(b) by 217 days.

(21) Appl. No.: 10/644,642

(22) Filed: Aug. 20, 2003

(65) Prior Publication Data

US 2004/0091089 A1    May 13, 2004

Related U.S. Application Data

(63) Continuation-in-part of application No. 10/242,291, filed on Sep. 11, 2002.

(51) Int. Cl.
*H04L 12/66* (2006.01)
*H04L 12/56* (2006.01)
*H04L 12/28* (2006.01)

(52) U.S. Cl. ..................... 370/352; 370/401
(58) Field of Classification Search ............ 370/352, 370/356, 401, 419, 420, 389; 379/90.01
See application file for complete search history.

(56) References Cited

U.S. PATENT DOCUMENTS

| | | | |
|---|---|---|---|
| 4,837,799 A | | 6/1989 | Prohs et al. |
| 4,914,689 A | * | 4/1990 | Quade et al. ............ 379/142.01 |
| 5,625,675 A | | 4/1997 | Katsumaru et al. |
| 5,781,552 A | * | 7/1998 | Hashimoto ............... 370/447 |
| 5,883,944 A | * | 3/1999 | Burke et al. ............. 379/159 |
| 5,892,764 A | * | 4/1999 | Riemann et al. .......... 370/401 |
| 5,903,724 A | * | 5/1999 | Takamoto et al. ........ 709/200 |
| 5,943,319 A | | 8/1999 | Fraser |
| 5,953,322 A | * | 9/1999 | Kimball .................. 370/328 |
| 5,978,568 A | * | 11/1999 | Abraham et al. ......... 709/224 |
| 6,069,888 A | * | 5/2000 | LaRocca .................. 370/342 |
| 6,118,862 A | | 9/2000 | Dorfman et al. |
| 6,130,893 A | * | 10/2000 | Whittaker et al. ........ 370/420 |
| 6,144,724 A | | 11/2000 | Stovall |
| 6,181,736 B1 | | 1/2001 | McLaughlin et al. |

(Continued)

OTHER PUBLICATIONS

"PCT International Search Report", Application No. PCT/US03/27676, mailed Mar. 1, 2004.

*Primary Examiner*—Chi Pham
*Assistant Examiner*—Kevin C. Harper
(74) *Attorney, Agent, or Firm*—Kang Lim

(57) ABSTRACT

One embodiment of the present invention includes a telephony interface, a network interface and a local area network (LAN). The telephony interface provides connectivity between one or more netphones and an external telephone network such as a PSTN telephone system. The network interface provides connectivity between one or more computers and an external computer network such as the Internet. The local area network provides interconnectivity between the netphone(s), the computer(s), the telephony interface and the network interface. In some embodiments, there may be two or more netphones which can communicate with each other internally via the LAN, in addition to communicating with the external telephone network. Similarly, there may be two or more computers that can also communicate with each other internally via the same LAN, in addition to the external computer network. By combining both the internal and external connectivity needs of both the netphone(s) and computer(s), the entry cost of installing both the netphone(s) and the computer(s) is dramatically lowered. In addition, once the network infrastructure has been installed, the existing netphone(s) and computer(s) can be very easily relocated within the network, and new netphone(s) and computer(s) can be added to the network with minimal changes to the network.

22 Claims, 63 Drawing Sheets

U.S. PATENT DOCUMENTS

| | | | |
|---|---|---|---|
| 6,243,379 B1 * | 6/2001 | Veerina et al. | 370/389 |
| 6,421,425 B1 | 7/2002 | Bossi et al. | |
| 6,449,269 B1 | 9/2002 | Edholm | |
| 6,456,625 B1 | 9/2002 | Itoi | |
| 6,487,200 B1 | 11/2002 | Fraser | |
| 6,498,791 B1 | 12/2002 | Pickett et al. | |
| 6,510,454 B1 | 1/2003 | Walukiewicz | |
| 2001/0023458 A1 * | 9/2001 | Gavoille | 709/245 |
| 2002/0006137 A1 * | 1/2002 | Rabenko et al. | 370/466 |
| 2002/0039407 A1 * | 4/2002 | O'Donovan et al. | 379/67.1 |
| 2002/0103872 A1 * | 8/2002 | Watanabe | 709/206 |
| 2003/0123636 A1 | 7/2003 | Bigelow | |
| 2003/0179743 A1 | 9/2003 | Bosik et al. | |
| 2003/0194071 A1 | 10/2003 | Ramian | |
| 2003/0214930 A1 * | 11/2003 | Fischer | 370/338 |
| 2003/0227910 A1 * | 12/2003 | Koyama | 370/352 |
| 2004/0029568 A1 * | 2/2004 | DeLuca et al. | 455/412.1 |

* cited by examiner

NETWORK TELEPHONE SYSTEM AND METHODS THEREFOR

PRIORITY AND INCORPORATION BY REFERENCE

This is a continuation-in-part application of and claims priority of U.S. patent application Ser. No. 10/242,291 filed Sep. 11, 2002, titled "Self-Configuring Network Telephone System", which is incorporated by reference herein.

BACKGROUND OF THE INVENTION

The present invention pertains to a local area network-coupled telephone system and method. More particularly, the present invention describes a self-configuring local area network phone system for use in Ethernet networks.

The use of local area networks (LAN) to support telephone systems has become increasingly popular as the speed available on the LAN have increased. It is not uncommon to find current Ethernet based networks capable of data rates from 100 Mbits/sec to 1000 Mbits/sec (1 Gbit/sec). This has made it more practical to integrate digitized voice traffic onto these networks without impacting the main data traffic also flowing on the network. In many companies and organizations, most users have computer systems connected into a LAN system. Traditionally, these users have a telephone line connected to their office as well. The costs associated with maintaining both LAN and telephone wiring systems can be reduced if either the LAN system or the telephone wiring system is eliminated. Because the networking requirements of most office computers cannot be met by traditional phone networks, this means that the telephone wiring system should be eliminated and the telephone system should operate over the LAN. Benefits of this arrangement include the use of the existing LAN wiring, easy expandability for new users, potentially increased functionality, and reduced cost.

One system in which a telephone system operates over a LAN includes a Personal Computer (PC) connected to the LAN and having an interface module for connecting to an analog telephone. A disadvantage of such a system is that the user must have a PC on and operating to use his phone. Additionally, connecting multiple phones to the LAN requires a hub device. The disadvantage of the required hub device is that a secondary wiring system connecting each analog phone to the hub must be supplied, in addition to the LAN. This reduces the cost effectiveness of LAN-based communication.

Another system that is available uses telephone units connected directly to the LAN via Ethernet connections, but requires a central controller, also connected to the LAN, to manage all call traffic. The central controller, which has an interface to the Public Switched Telephone Network (PSTN), supports only a limited number of call stations. Multiple controllers can be interconnected to increase the capacity of the system, but at increased cost.

For the smaller office, the above systems are still too complex and expensive. Many small office organizations cannot afford the dedicated Information Technology (IT) support necessary to set up and operate these systems. Even larger organizations can benefit from a system of reduced complexity that benefits from greatly reduced startup and configuration time periods. Therefore, there is a need for a LAN-based phone system that is lower in overall cost, is faster to setup and configure, and requires less IT support, than the above-described systems.

SUMMARY OF THE INVENTION

One embodiment of the present invention includes a telephony interface, a network interface and a local area network (LAN). The telephony interface provides connectivity between one or more netphones and an external telephone network such as a PSTN telephone system. The network interface provides connectivity between one or more computers and an external computer network such as the Internet. The local area network provides interconnectivity between the netphone(s), the computer(s), the telephony interface and the network interface.

In some embodiments, there may be two or more netphones which can communicate with each other internally via the LAN, in addition to communicating with the external telephone network. Similarly, there may be two or more computers that can also communicate with each other internally via the same LAN, in addition to the external computer network.

One advantage of the present invention is that by combining both the internal and external connectivity needs of both the netphone(s) and computer(s), the user does not have to install for example a DSL modem, a router, an Ethernet switch and a telephone switch, thereby dramatically lowering the entry cost of installing both the netphone(s) and the computer(s).

Another advantage is that once the network infrastructure has been installed, the existing netphone(s) and computer(s) can be very easily relocated within the network, and new netphone(s) and computer(s) can be added to the network with minimal changes to the network, if any is needed.

Note that the various features of the present invention can be practiced alone or in combination. These features of the present invention will be described in more detail below in the detailed description of the invention and in conjunction with the following figures.

BRIEF DESCRIPTION OF THE DRAWINGS

These and other features, aspects and advantages of the present invention will become better understood with regard to the following description, appended claims, and accompanying drawings where:

DETAILED DESCRIPTION OF THE INVENTION

Figure 1:
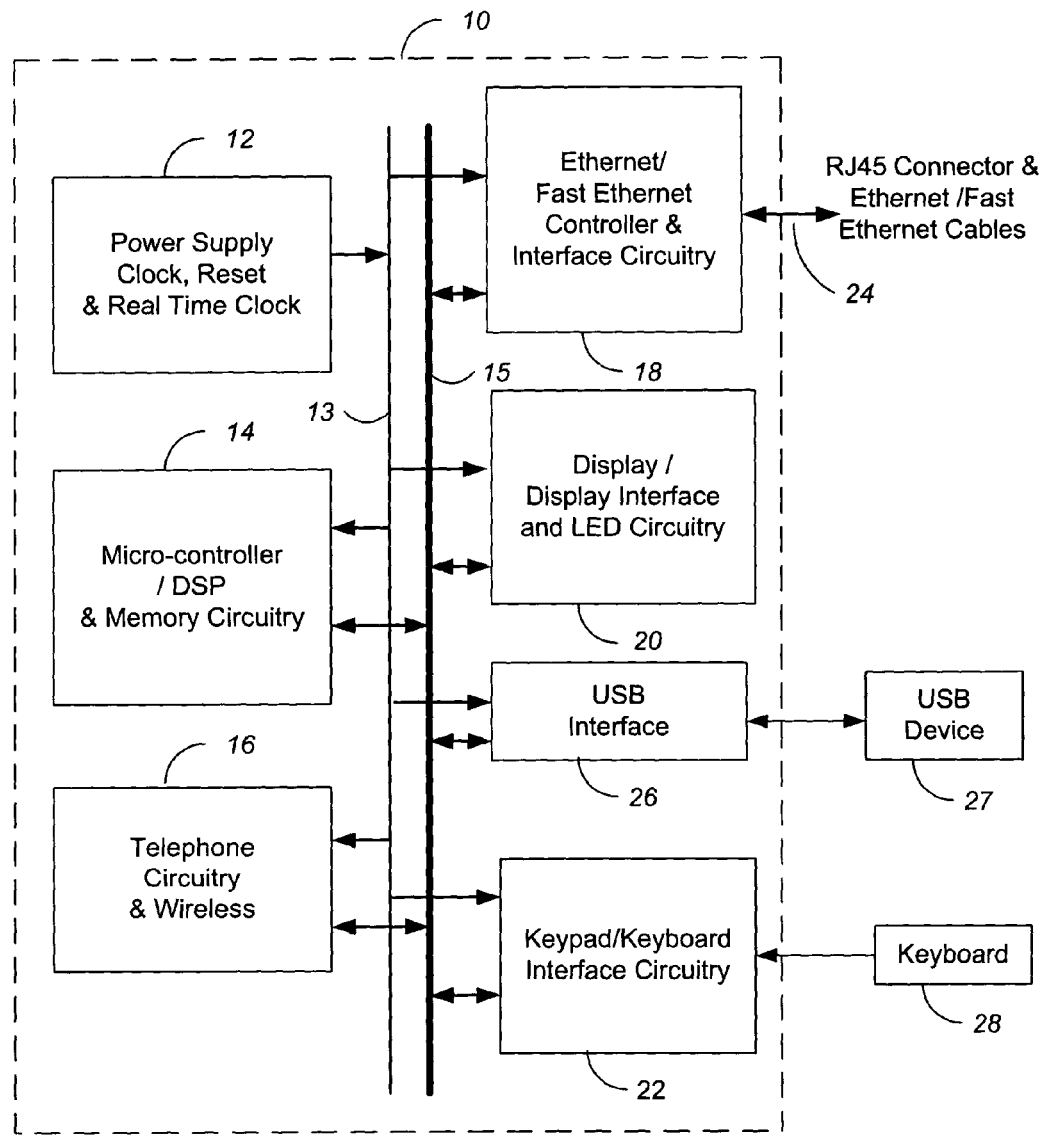
FIG. 1 shows a functional block diagram of a telephone device for connection to a LAN in accordance with an embodiment of the present invention.

FIG. 1 shows a functional block diagram of a Telephone Device 10 for connection to a LAN (Local Area Network), in accordance with an embodiment of the present invention. Network connection to the Telephone Device 10 is made through 10/100/1000 Megabit/sec Ethernet cables 24 of the LAN, although other network wiring technologies, such as high speed optical cable, may also be used. For Ethernet networks, RJ-45 type connectors are utilized to connect telephone device 10 to LAN cables 24, but other acceptable connectors are also utilized, as is well known to those skilled in the art. An Ethernet controller 18 interfaces the Micro-controller & Memory Circuitry 14 to the LAN via a standard data, address, and control bus 15. An example of such device is the ASIX AX88796 L Local Bus Fast Ethernet Controller (with ADSP-21065L) or the Intel LXT971A Fast Ethernet Transceiver (with PPC855T).

The Micro-controller & Memory Circuitry 14 is coupled to the Display Interface Circuitry 20, Key Pad Interface circuitry 22, Telephone Circuitry 16, and USB (Universal Serial Bus) Interface Circuitry 26. Power supply and clock functions in Power Supply Module 12 are supplied to Micro-controller & Memory Circuitry 14, Telephone Circuitry 16, Ethernet Circuitry 18, Display Circuitry 20, Keyboard Circuitry 22, and USB Interface Circuitry 26 via Power Bus 13. Micro-controller & Memory Circuitry 14 includes a CPU/DSP (Central Processing Unit/Digital Signal Processor) that fetches, decodes, and executes the program that resides in its internal or external memory. An example of such a device is the Analog Devices ADSP-21065L or Motorola PPC855T CPU. Memory configurations can include (but are not limited to) flash, EPROM (electronically programmable read only memory), EEPROM (electronically erasable programmable read only memory), RAM (random access memory), DRAM (dynamic random access memory), SRAM (static random access memory), and SDRAM (synchronous DRAM ). The primary functions of the Micro-controller & Memory Circuitry 14 are to control and communicate with Telephone Circuitry 16, Ethernet Circuitry 18, Display Circuitry 20, Key Pad Interface circuitry 22, and USB Interface Circuitry 26 within telephone device 10, as well as communicate with other network devices connected to the LAN. For example, this may include decoding keypad signals from Key Pad Interface circuitry 22, receiving, decoding, and transferring voice data (via voice recognition) and tone signals to and from Telephone Circuitry 16, receiving/transmitting USB data from USB Interface Circuitry 26, displaying incoming network data and keypad inputs, displaying help menus, and other functions on Display Circuitry 20. A separate keyboard 28 may also be attached via Key Pad Interface circuitry 22.

USB Interface Circuitry 26 is utilized to communicate with USB device 27 to enable data transfers to and from the LAN. An example of such a device is the USS-820D USB Device Controller from Agere Systems. Examples of USB device 27 include printers, digital cameras, scanners, video devices, memory devices, personal assistants, portable personal computers. For example, in one application, a video input/out device is connected so video and audio transmission can take place via the network phone. The USB port can be assigned with its own separate phone number, if desired. In another application, a document is transmitted to a destination elsewhere on the LAN by using a USB scanner as USB device 27. The document is received and printed at another network phone via a printer connected as device 27, or at a print server directly connected to the LAN.

Power Supply Circuitry 12 provides DC power for all modules, power on RESET functions, clock synchronization, and real time clock information including date. Power Supply Circuitry 12 may also include a battery backup system for power loss operation. Telephone Circuitry 16 provides the standard handset and speaker/microphone interface and analog to digital conversion.

Figure 2:
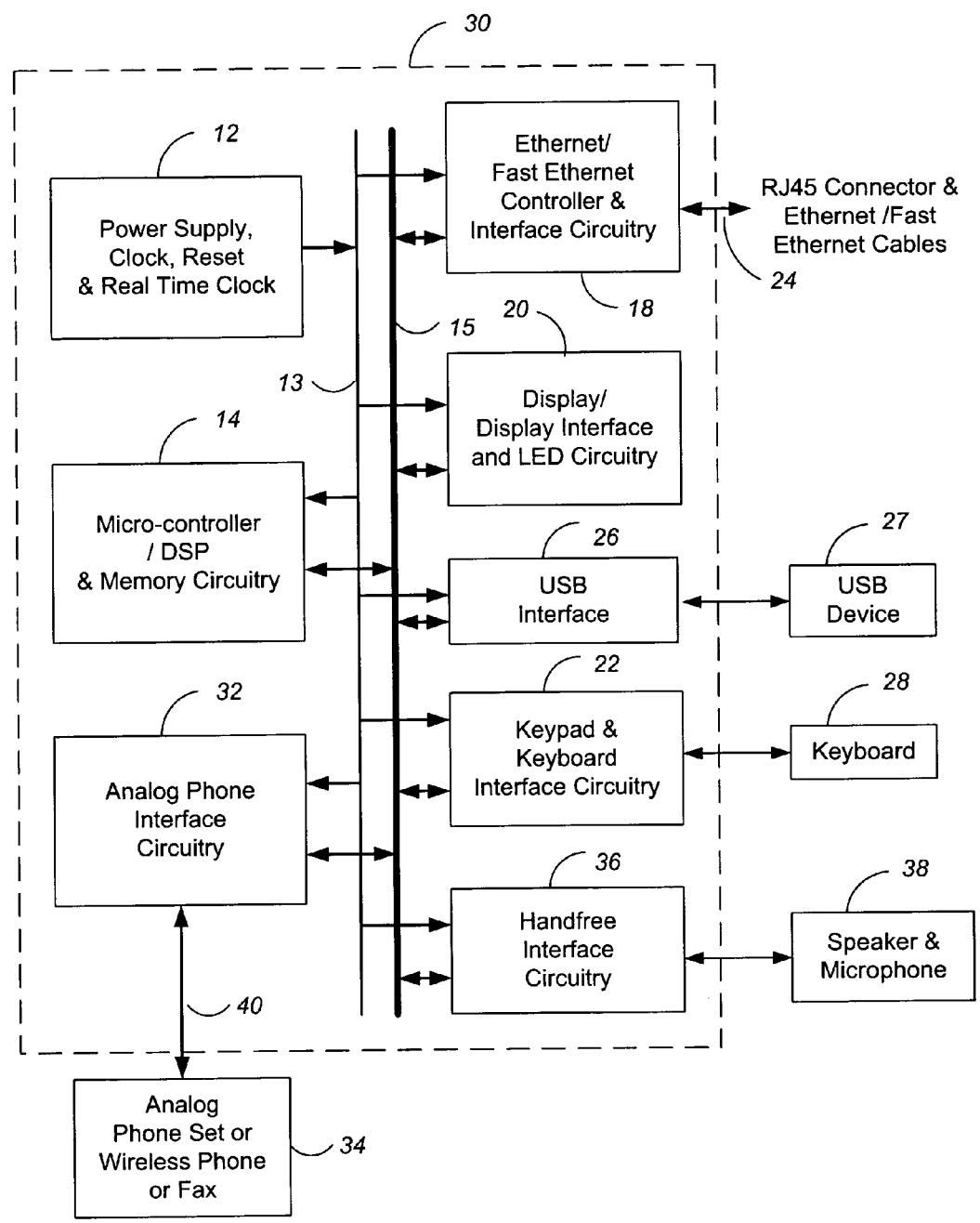
FIG. 2 shows a functional block diagram of a device for interfacing an analog telephone to a LAN in accordance with an embodiment of the present invention.

FIG. 2 shows a functional block diagram of a device 30 for interfacing an analog telephone set 34 to a LAN, in accordance with an embodiment of the present invention. Analog Phone LAN Interface device 30 contains components that allow interfacing of a standard analog telephone set 34 with a LAN system, preferably an Ethernet LAN system. Analog Phone Interface circuitry 32 decodes voice and key input DTMF (dual tone multi-frequency) commands for digital transmission over the LAN. Analog Phone Interface circuitry 32 also provides dial tone, busy tone and ring tone functions to an analog phone set 34. An example of Analog Phone Interface circuitry 32 is the Silicon Laboratories Si3210 (Programmable CMOS SLIC/Codec with Ringing/Battery Voltage Generation). The analog phone set 34 or multiple sets may be connected to device 30 via standard RJ11 connectors and phone wire 40. Analog phone set(s) 34 may also include a fax machine or cordless telephone.

The analog phone LAN interface device 30 also contains Hands-Free Interface circuitry 36 for connection to speaker and microphone 38 to provide hands-free operation that is absent from many analog phone sets. A numerical keypad is optional for analog phone LAN interface device 30, because most analog phone sets 34 already contain a numeric keypad.

Figure 3:
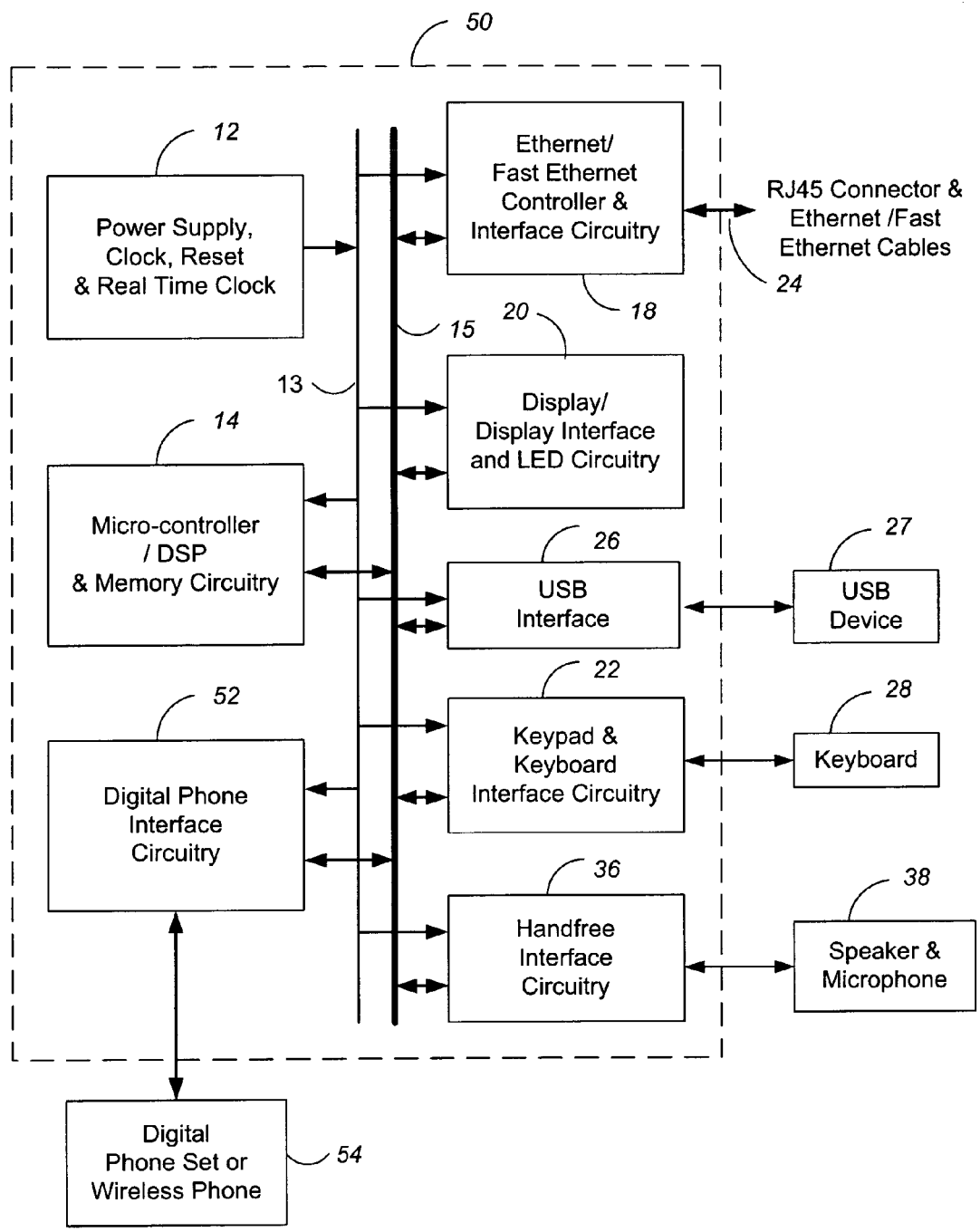
FIG. 3 shows a functional block diagram of a device for interfacing a digital telephone to a LAN in accordance with an embodiment of the present invention.

FIG. 3 shows a functional block diagram of a device 50 for interfacing a digital telephone 54 to a LAN, in accordance with an embodiment of the present invention. Since the communication protocols for digital phone sets are non-standard and specific to each manufacturer, custom Digital Phone Interface Circuitry 52 is utilized to decode voice and key input commands for the digital phone set 54. Hands-free Interface Circuitry 36 may not be needed, since this is often provided on digital phone set 54. Other functions of Digital Phone LAN Interface device 50 are similar to those described for Telephone Device 10 and Analog Phone LAN Interface device 30.

Figure 4A:
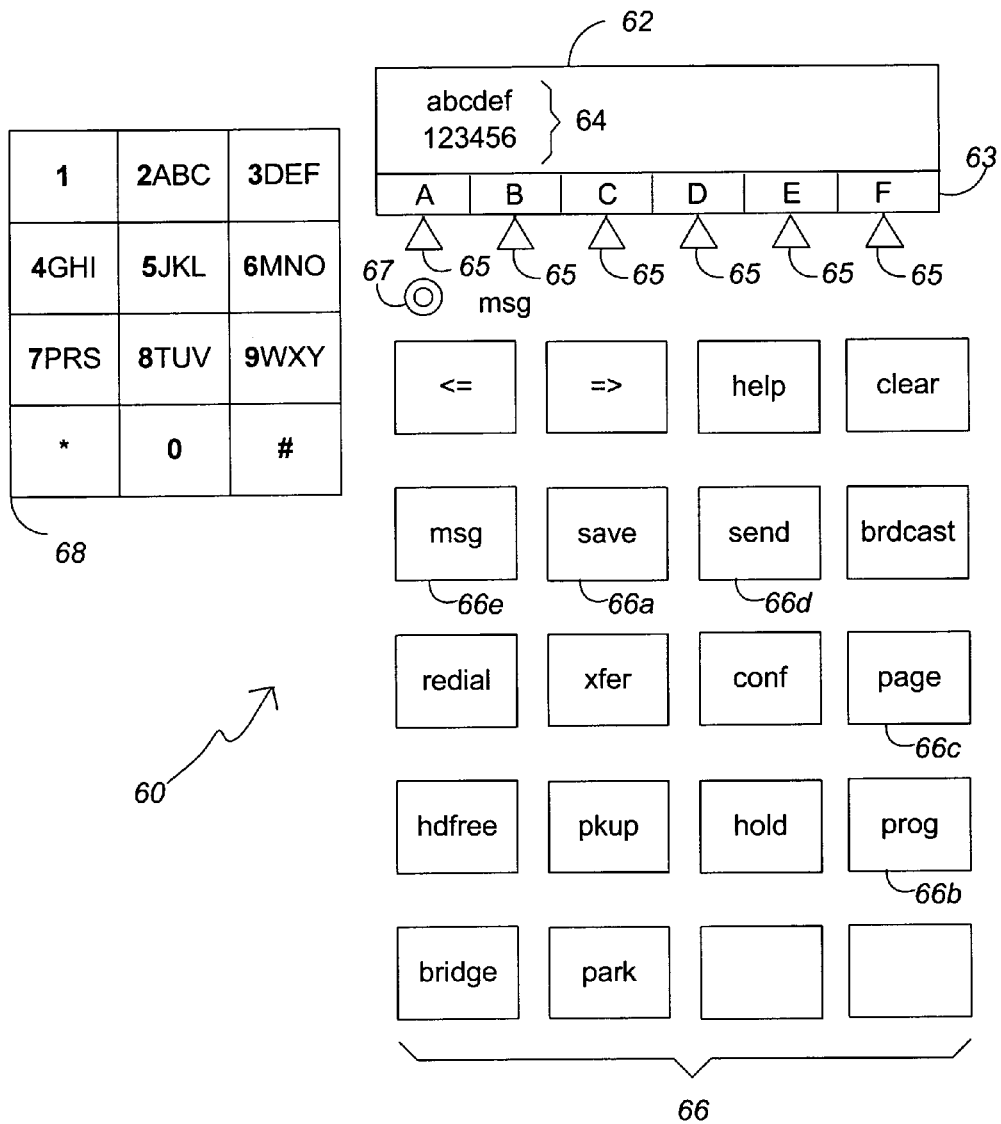
FIG. 4A shows a layout of the keypad and display of a network telephone device in accordance with an embodiment of the present invention.

FIG. 4A shows a layout 60 of the keypad and display 62 of a network telephone device in accordance with an embodiment of the present invention. The keypad includes keys 63, 66, and 68. A standard telephone numeric keypad 68 is used to input numeric and character information. Keys 66 are fixed function keys and keys 63 are programmable function keys A–F. Indicator lamps 65 are used to indicate which functions A–F are active. Not all keys are shown or need to be used in any given phone configuration, such as Telephone Device 10, Analog Phone LAN Interface device 30, or Digital Phone LAN Interface device 50. A display 62 is also provided for viewing character-based information 64. The display may be liquid-crystal, plasma, light-emitting diodes or any other suitable technology. A message lamp 67 indicates the status of voicemail messages. Table 1 shows an example of control key values, in hexadecimal, for the keys shown in FIG. 4A.

Figure 4B:
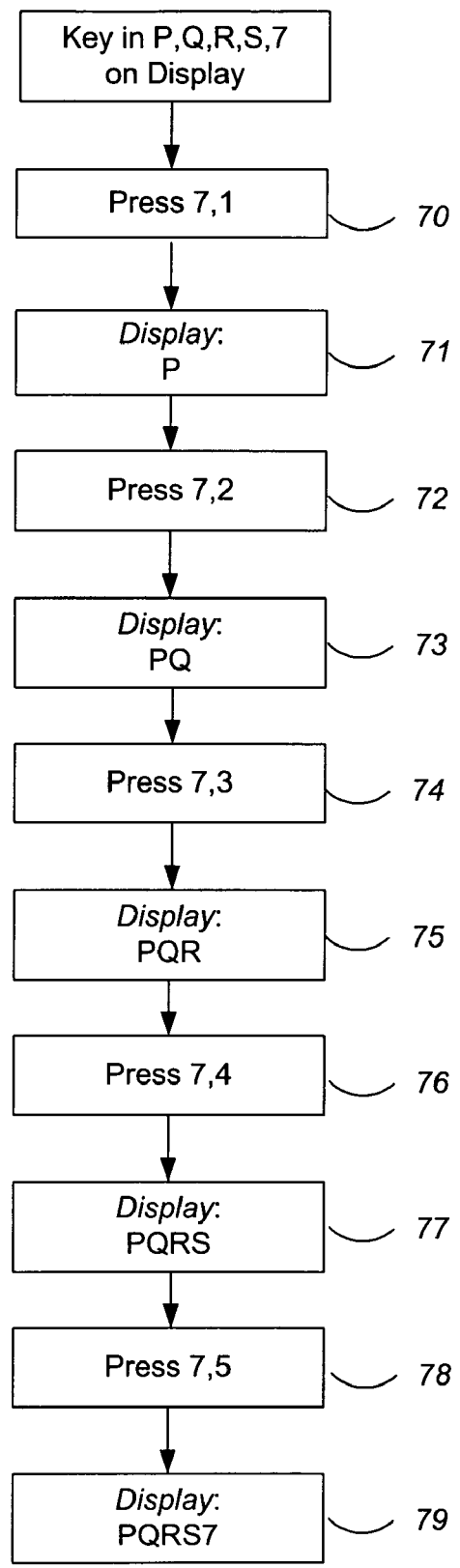
FIG. 4B shows a process block diagram for entering characters on the display of FIG. 4A in accordance with an embodiment of the present invention.

FIG. 4B shows a process block diagram for entering characters PQRS7 on the display 62 of FIG. 4A, in accordance with an embodiment of the present invention. Since each key in pad 68 contains multiple alpha and numeric characters, distinguishing between each is illustrated in this example. Starting at step 70 of FIG. 4B, the character P is entered on the display by pressing the '7' key (or 7PQRS key) followed by the '1' key, indicating the first character in the PQRS string on the 7 key. The display indicates P, in step 71. Q is added to the display, in step 72, by pressing the '7' key followed by the '2' key, giving PQ on the display, as indicated in step 73. Pressing the '7' and '3' keys, in step 74, yields PQR on the display, in step 75. Pressing the '7' and '4' keys, in step 76, yields PQRS on the display, in step 77. Pressing the '7' and '5' keys, in step 78, yields PQRS7 on the display, in step 79. For the purposes of future discussion, when a character is entered into the display, it is assumed that a process similar to that described in FIG. 4B is utilized, even though a shortened description such as "type in ABC" may be recited.

TABLE 1

| Numeric Key Description 68 | Control Key Value, Hex | Function Key Description 66 | Control Key Value, Hex | Variable Key Description 63 | Control Key Value, Hex |
|---|---|---|---|---|---|
| 1 | 01 | > | 10 | A | 30 |
| 2 | 02 | < | 11 | B | 31 |
| 3 | 03 | help | 12 | C | 32 |
| 4 | 04 | clear | 13 | D | 33 |
| 5 | 05 | msg (ref 66e) | 14 | E | 34 |
| 6 | 06 | save (ref 66a) | 15 | F | 35 |
| 7 | 07 | send (ref 66d) | 16 | | |
| 8 | 08 | brdcast | 17 | | |
| 9 | 09 | redial | 18 | | |
| 0 | 0A | xfer | 19 | | |
| * | 0B | conf | 1A | | |
| # | 0C | page (ref 66c) | 1B | | |
| spare | 00 | hdfree | 1C | | |
| | | pkup | 1D | | |
| | | hold | 1E | | |
| | | prog (ref 66b) | 1F | | |
| | | bridge | 20 | | |
| | | park | 21 | | |

Figure 5:
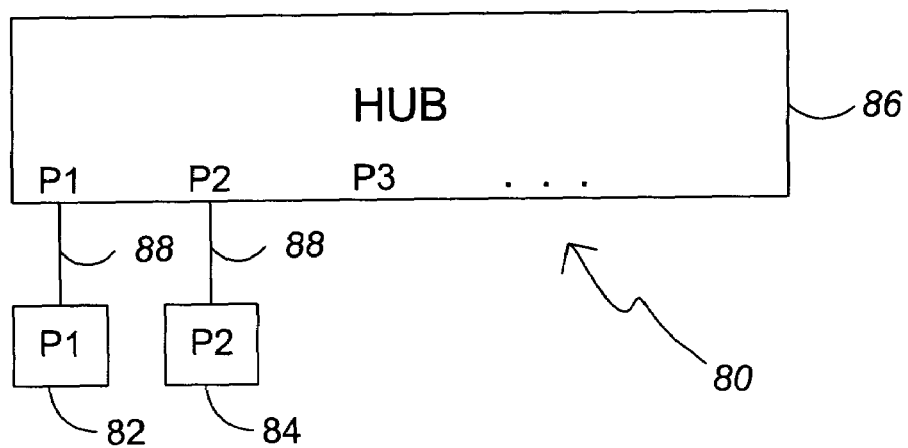
FIG. 5 shows a block diagram illustrating a pair of network telephones coupled to a LAN hub in accordance with an embodiment of the present invention.

FIG. 5 shows a block diagram 80 illustrating a pair of network telephones 82, 84 coupled to a LAN hub 86, in accordance with an embodiment of the present invention. Preferably, LAN hub 86 is an Ethernet hub, but may be other technologies as well. Subsequent discussion is limited to Ethernet systems by way of example, but this in no way limits the application only to Ethernet systems, since other alternate high-speed network systems are suitable as well. Network telephones 82, 84 are connected to LAN Ethernet lines 88 via 10/100/1000 Mbit/sec shielded or unshielded twisted pair cables, or other compatible high speed data cables. Cables 88 are connected to telephones 82 and 84 with, for example RJ-45 connectors, but other compatible connectors may also be utilized. Network telephones 82, 84 are coupled to LAN hub 86 for communication with other devices coupled to the LAN. The operation of telephones 82 and 84 does not require a central switch, control station, or PBX system to configure their operation or make calls to one another, or other telephones on the same LAN system.

Figure 6:
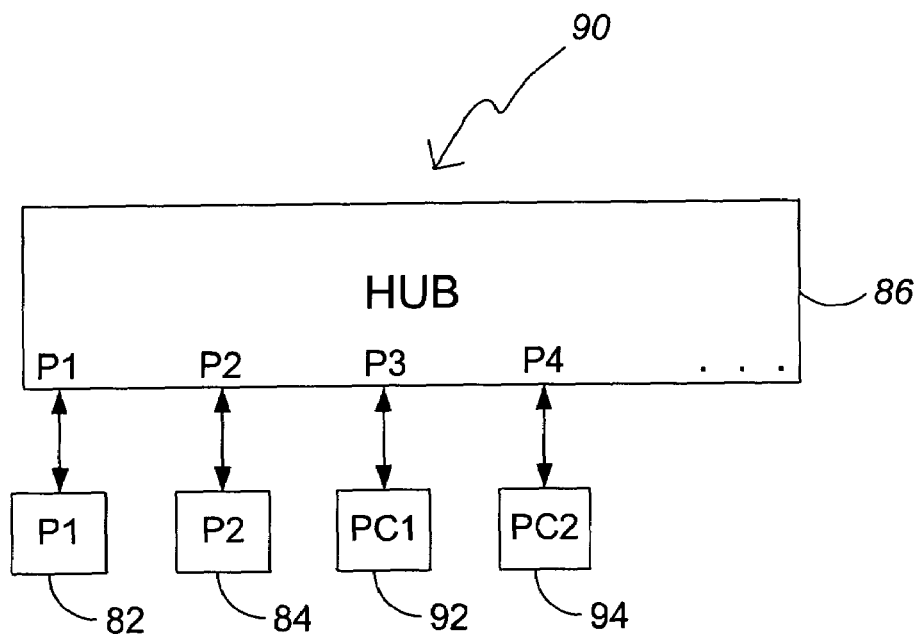
FIG. 6 shows a block diagram illustrating a pair of network telephones and a pair of personal computers coupled to a LAN hub in accordance with an embodiment of the present invention.

FIG. 6 shows a block diagram 90 illustrating a pair of network telephones P1 82, P2 84 and a pair of personal computers PC1 92, PC2 94 coupled to LAN hub 86, in accordance with an embodiment of the present invention. Network phones P1 and P2 can operate cooperatively with other devices, such as PC1 and PC2 coupled to hub 86. Network phones P1 and P2 may call each other or other phones (not shown) coupled to the LAN without interfering with the network communication of PC1 and PC2 (except for a small increase in network data traffic). P1 and P2 may also communicate directly with PC1 and PC2 for services such as Voice Mail, or to facilitate data communication between, for example, USB devices 27 connected to the network phones 82, 84 and the PCs. Once phones P1 and P2 are installed and configured, a first user on phone P1 can place a call to a second user on phone P2 without the need for a central switching device to route the call.

Figure 7A:
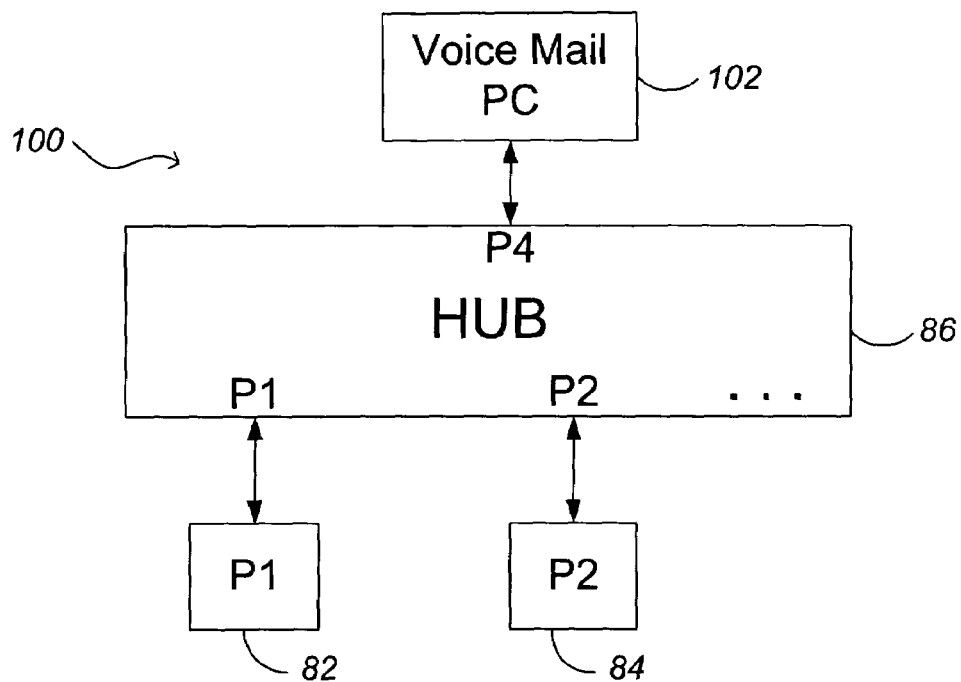
FIG. 7A shows a block diagram illustrating two network telephones and a voice mail/network storage equipped PC coupled to a LAN hub in accordance with an embodiment of the present invention.

FIG. 7A shows a block diagram 100 illustrating two network telephones 82, 84 and a voice mail/network storage-equipped PC 102 coupled to a LAN hub 86, in accordance with an embodiment of the present invention. P1 and P2, coupled to LAN hub 86, utilize communication through the LAN to leave voice mail or data messages in the storage provided by the PC 102. Use of the PC may be advantageous for this purpose due to the large amount of inexpensive memory available. It is also possible to provide messaging memory capability in each of phones P1 and P2, although at reduced capacity. If a reduced capacity is acceptable, some network communication advantages, such as reduced network traffic, may be obtained by locally storing voice mail messages in the phone units 82, 84. However, for larger systems with a greater number of users, the voice mail equipped-PC is more efficient and secure, because voice mail messages are backed-up routinely in such a system to prevent accidental loss. Also, PC usage provides hard drive memory storage at a much lower cost than solid state DRAM costs.

Figure 7B:
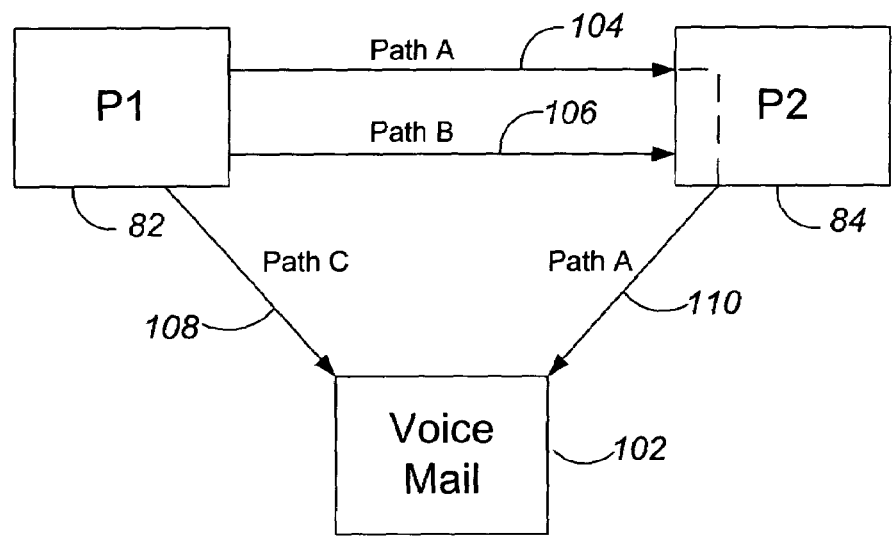
FIG. 7B shows a block diagram illustrating voice mail message pathways between two network phones and a voicemail/network storage PC in accordance with an embodiment of the present invention.

FIG. 7B shows a block diagram illustrating voice mail message pathways between two network phones P1 82, P2 84 and a voicemail/network storage PC 102, in accordance with an embodiment of the present invention. There are potentially three message pathways available if a user on network phone P1 wants to leave a voice message for a user on network phone P2. For systems without a voice mail-equipped PC, Path B 106 is the only route available, wherein a voice mail message is transmitted directly to P2 from P1 and stored there in local memory. For systems with a voice mail PC, Path A 104, 110 and Path C 108 are available. In Path A, the voice mail message is routed from phone P1 to phone P2, then to the voice mail PC 102. In Path C 108, the voice mail is routed from phone P1 82 directly to the voice mail PC 102. The detailed process for both paths A and C is explained in further detail below.

Figure 8:
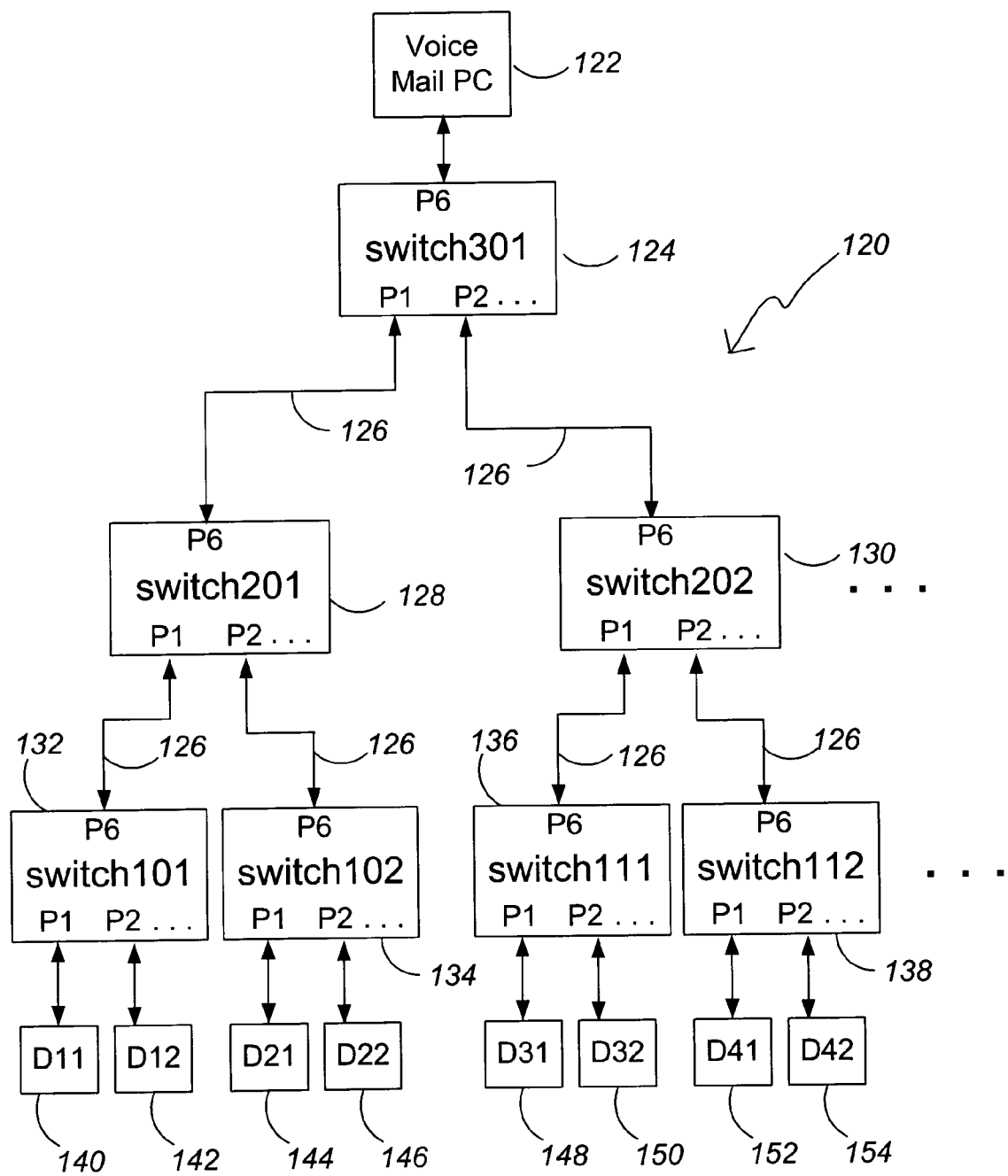
FIG. 8 shows a schematic block diagram illustrating connection of multiple network telephones to a voice mail/ network storage PC via Ethernet LAN switches in accordance with an embodiment of the present invention.

FIG. 8 shows a schematic block diagram 120 illustrating connection of multiple network telephones to a voice mail/network storage PC via Ethernet LAN switches, in accordance with an embodiment of the present invention. In FIG. 8, three levels of interconnected LAN switches are utilized to connect a larger number of network phones to a voice mail/network storage PC 122, though any number of levels can be used. In this example, the switches 124, 128, 130, 132, 134, 136, 138 are six-port P1–P6 (not all shown) units. Six-port switches are illustrated, but switches of greater or lesser ports can be utilized as equivalent. Voice mail/network storage PC 122 is coupled to port P6 of switch301 124, which in turn may be connected to up to five switches at level 200, although only two of these, switch201 128 and switch202 130, are illustrated for clarity and simplicity. To the five ports of each of the switches 128, 130 at level 200, up to five additional switches at level 100 may be added. Only two are illustrated for clarity. In this example, switch101 132 and switch102 134 are coupled to ports on switch201 128. In like fashion, switch111 136 and switch 112 138 are coupled to switch 202 130. Network devices 140–154 are coupled to the ports on each of the switches 132, 134, 136, 138 at level 0. All of these devices 140–154 may be network phones, or only a portion, with the remaining devices being PCs, servers, or other compatible devices. LAN hubs may be utilized instead of switches 124, 128, 130, 132, 134, 136, 138 or any combination of hubs and switches. For Ethernet based systems, interconnection lines 126 are preferably high-speed 10/100/1000 Mbits/sec base-T Ethernet cables.

Figure 9:
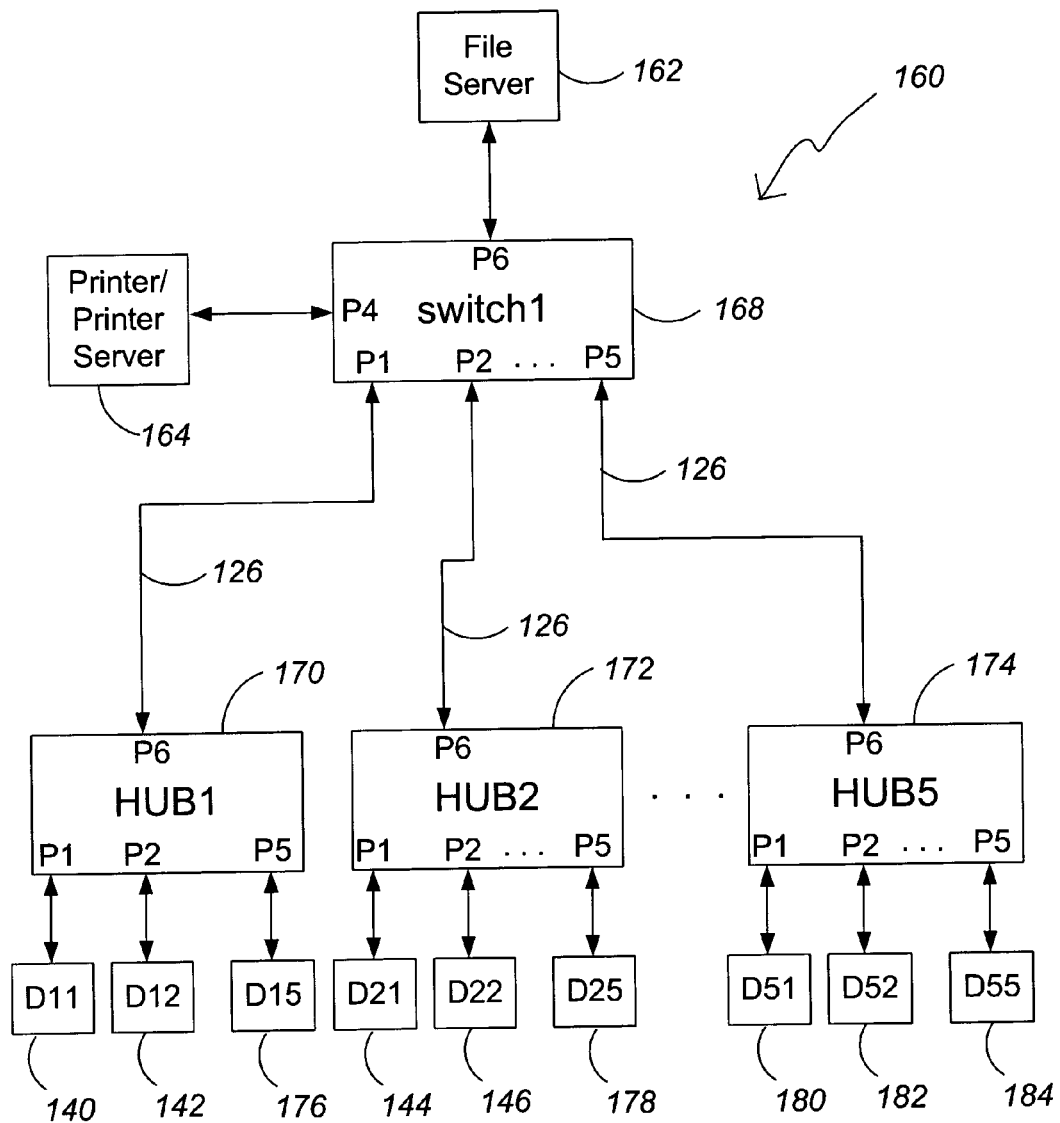
FIG. 9 shows a schematic block diagram illustrating connection of multiple network telephones to Ethernet LAN hubs and switches in accordance with an embodiment of the present invention.

FIG. 9 shows a schematic block diagram illustrating the connection of multiple network telephones to Ethernet LAN hubs and switches, in accordance with an embodiment of the present invention. A typical LAN system 160 includes a file server 162 coupled to an Ethernet switch 168. The switch may be subsequently coupled to LAN hubs 170–174 and print server 164. To each of the six-port hubs 170–174, up to five network devices D11 140, D12 142, D15 176, D21 144, D22 146, D25 178, D51 180, D52 182, D55 184 may be connected. For clarity only some are shown in the figure. Any number of the network devices 140, 142, 176, 144, 146, 178, 180, 182, 184 maybe network phones, the balance being other suitable network devices such as PCs or servers. Six port switch 168 and hubs 170, 172, 174 are illustrated, but a switch and hubs having more or fewer ports can be utilized as equivalent.

Figure 10:
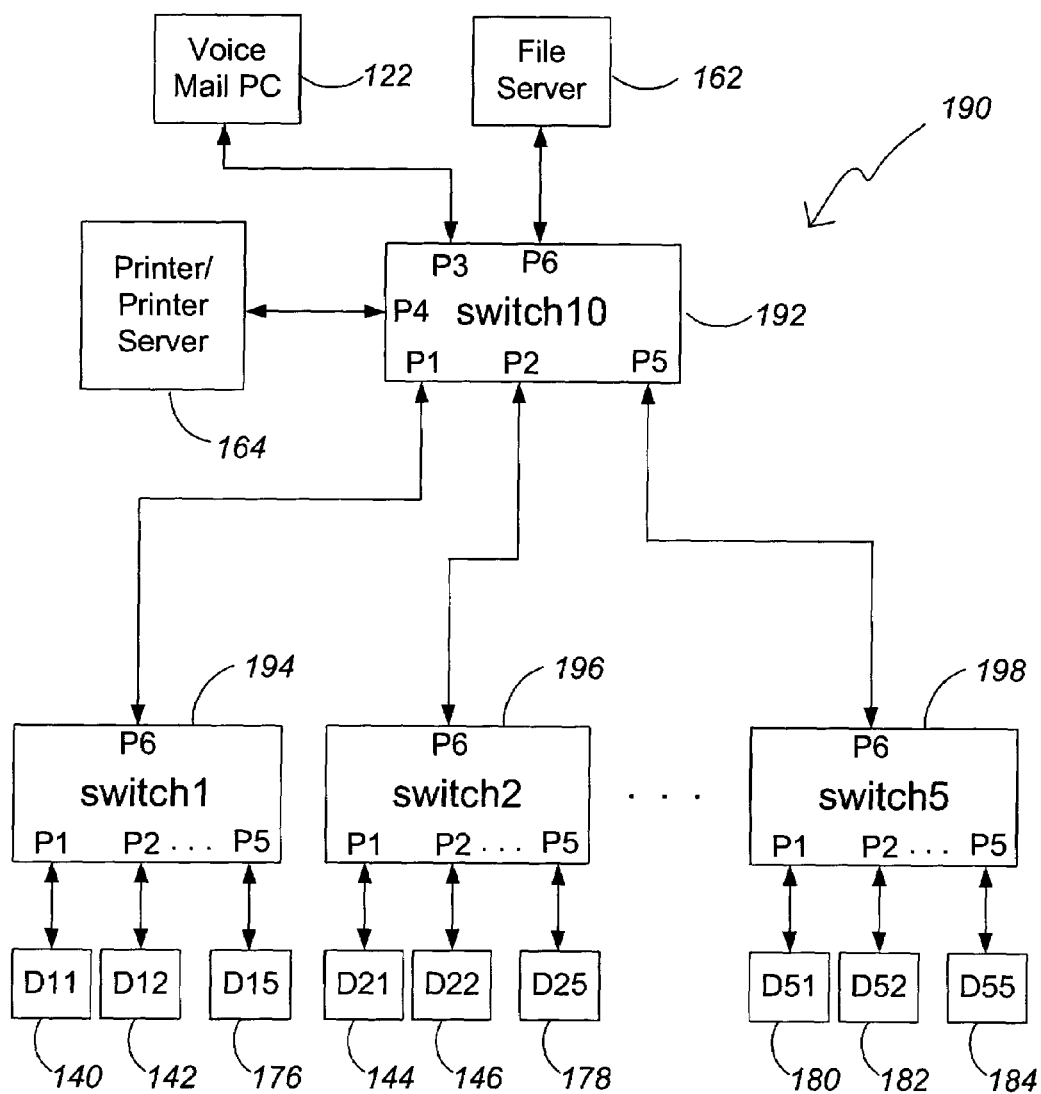
FIG. 10 shows a schematic block diagram illustrating multiple network telephones and voicemail/network storage PC connected to Ethernet LAN switches in accordance with an embodiment of the present invention.

FIG. 10 shows a schematic block diagram 190 illustrating multiple network telephones and voicemail/network storage PC connected to Ethernet LAN switches, in accordance with an embodiment of the present invention. Hubs 170, 172, 174, in FIG. 9, are replaced with Ethernet LAN switches 194, 196, 198. Network devices 140–146, 176–184 are coupled to switches 194–198. Any number of the network devices 140–146, 176–184 may be network phones. Switches 194–198 are in turn coupled to switch 192. File server 162 and printer server 164 are also coupled to switch 192. As previously noted, the file server 162 and print server 164 may be connected to any of switches 192–198 in the LAN system 190. Switches 194–198 are employed instead of hubs to reduce data collisions (multiple LAN devices transmitting at the same time) and improve network performance.

Figure 11:
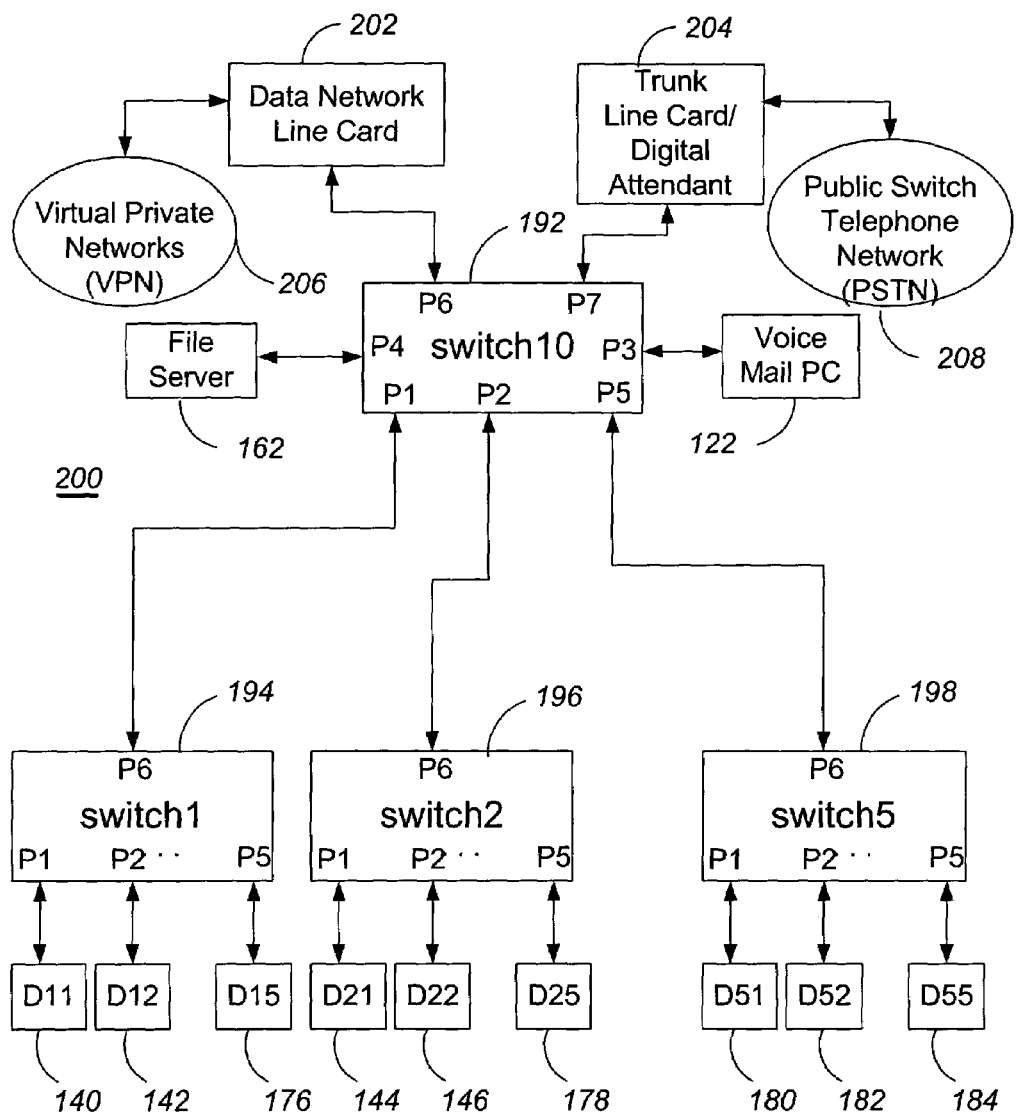
FIG. 11 shows a schematic block diagram illustrating the connection of External Networks and Public Switched Phone Networks to a LAN containing network telephones in accordance with an embodiment of the present invention.

FIG. 11 shows a schematic block diagram 200 illustrating the connection of External Networks and Public Switched Phone Networks to a LAN to which network telephones are connected, in accordance with an embodiment of the present invention. As previously described, any number of network devices D11–D15, D21–D25, D51–55 may be network phones.

To connect internally generated calls from the network phones D11–D55 to Public Switched Telephone Networks (PSTN) 208, an interfacing device called a Trunk Line Card/Digital Attendant is required. The Trunk Line Card interfaces the analog circuitry of the outside phone lines (PSTN) to the digital circuitry required by a digital attendant. In the present embodiment, both functions are included in device 204. The Digital Attendant converts the MAC (media access control) addresses used by the LAN devices (including the network phones D11–D55) to telephone numbers understandable by standard telephone systems. The Digital Attendant, together with the trunk line card, convert the digital data streams representing the audio conversation to the frequency and signal levels of the outside phone lines. Trunk Line card/Digital Attendant 204 also serves to convert outside dialed connections to the appropriate MAC address of a network phone. The Digital Attendant/Trunk Line card 204 are either packaged together (for example on the same printed circuit board) and installed in a PC, or packaged separately. If separately packaged, the digital attendant is housed in a stand alone console with various types of display indicators (LEDs, LCD displays, etc) and controls to intercept and direct calls within the LAN system.

In like manner, calls originating from a External Network 206 are interfaced through a Data Network Line Card line card/digital attendant 202 for conversion to/from MAC addresses utilized by the network phones. External Network 206 may be a wide area network (WAN) such as the Internet, a Virtual Private Network (VPN), or may be implemented by more local communication systems utilizing microwave, laser, or buried cable for building to building or intercampus connections. It may be convenient to limit LAN coverage to within a given building or structure, for example, and utilize a microwave or laser based system for building to building or structure to structure communication. For communication with locations farther apart, the use of Internet or a VPN may be suitable. In this case, the Data Network Line Card/digital attendant line card 202 and network phones are programmed to support Internet protocols. Data Network Line Card 202 and Trunk Line Card/Digital Attendant 204 may, for example, reside in a PC connected to the LAN, or may each be a separate device. The capability may additionally be built into Switch10 192 or into a separate console type device as described above.

Figure 12A:
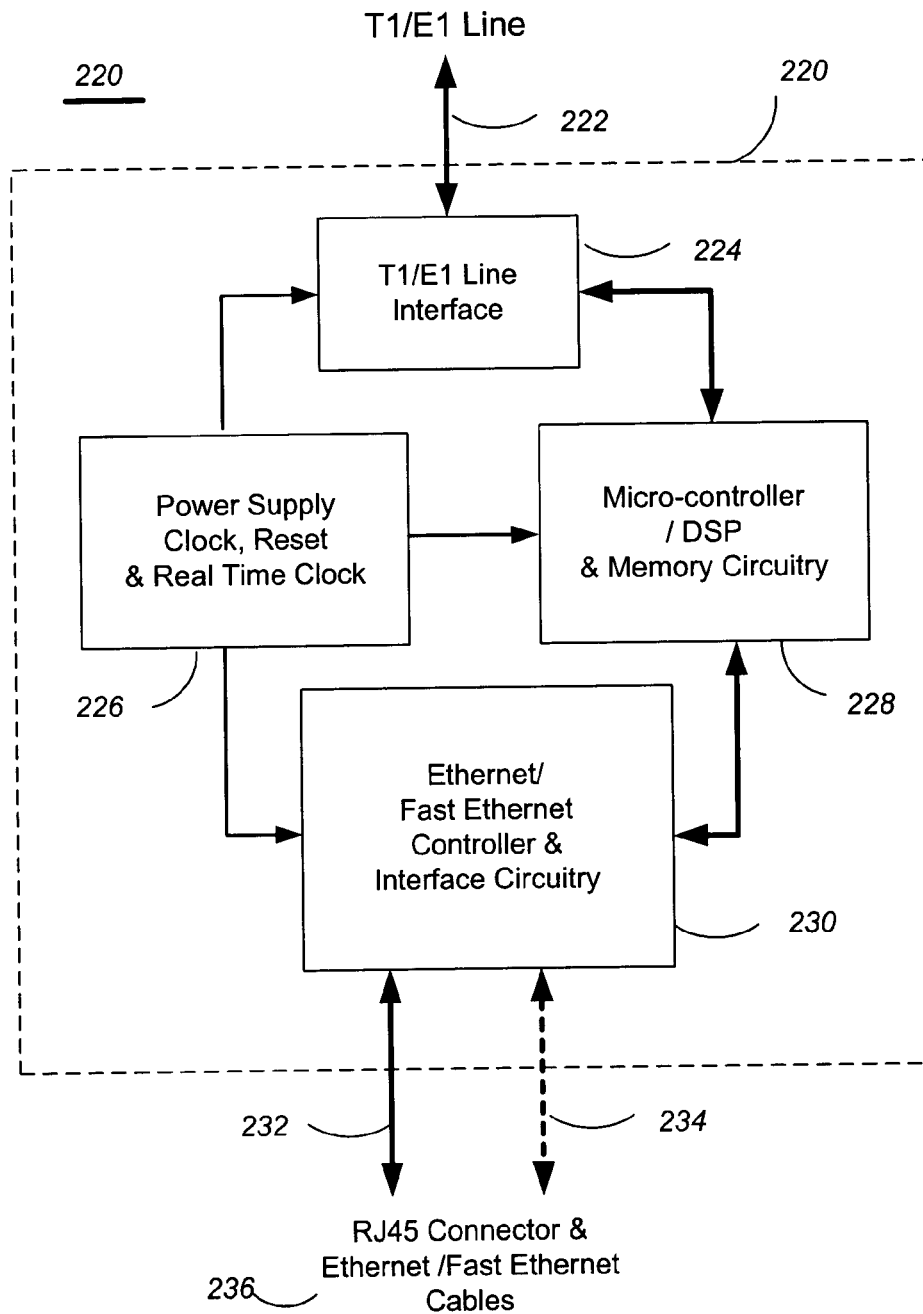
FIG. 12A shows a functional block diagram of a trunk line card in accordance with an embodiment of the present invention.

FIG. 12A shows a functional block diagram of a Trunk Line Card 220, in accordance with an embodiment of the present invention. This embodiment provides for connection to T1/E1 lines 222, but may be configured for other PSTN phone line configurations as well, with no loss in functionality. A T1/E1 line interface circuit 224 is coupled to micro-controller/DSP & memory circuitry 228, which, in turn, is coupled to Ethernet controller and Interface circuitry 230. RJ45 connectors 236 are supplied to connect the Trunk Line Card 220 to the LAN system. Single line 232 or an additional auxiliary line 234 or more, can be provided. Power supply, clocking, and reset circuitry is supplied to components 224-230 via Power Module 226.

Figure 12B:
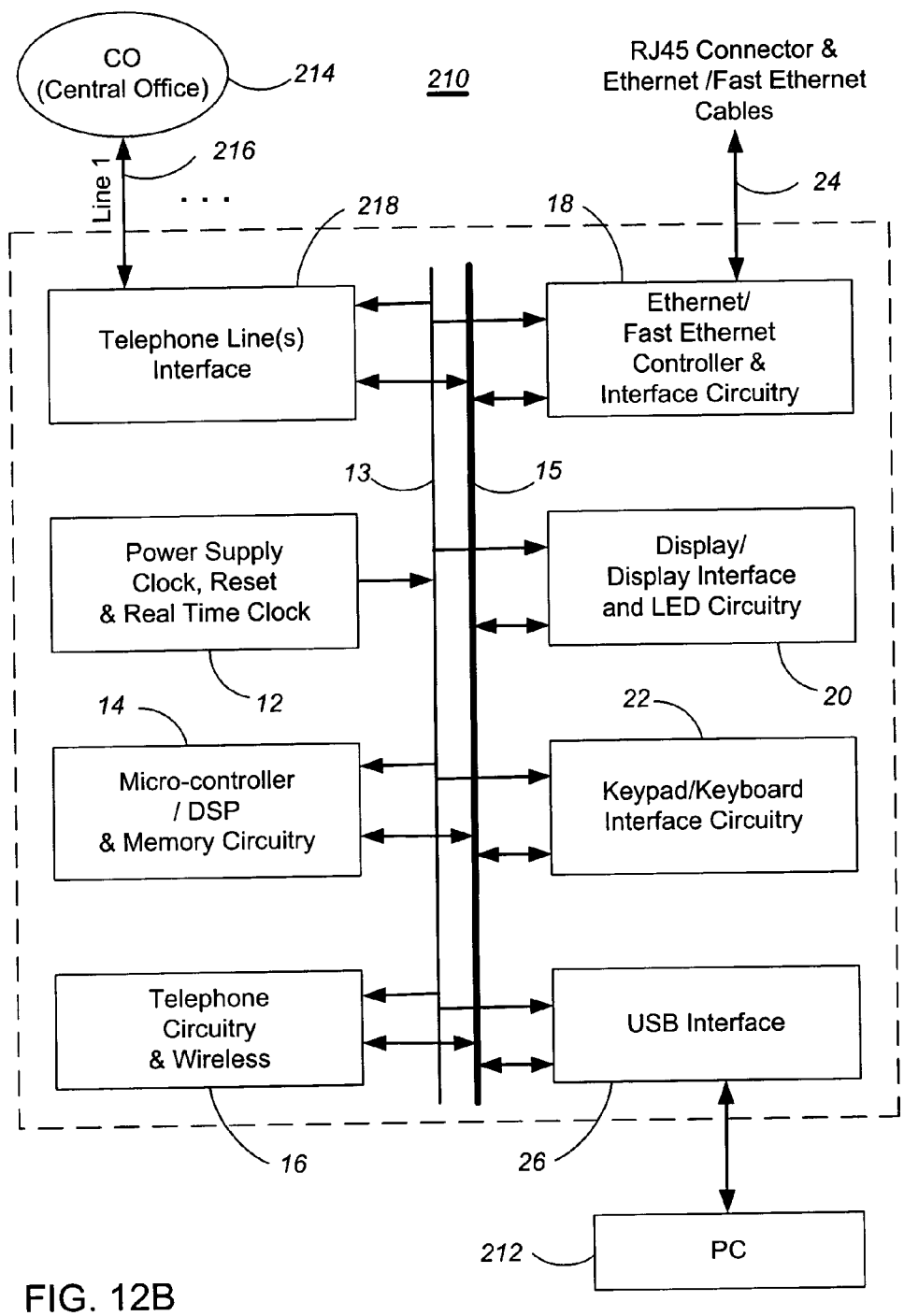
FIG. 12B shows a functional block diagram of a Digital Attendant in accordance with an embodiment of the present invention.

FIG. 12B shows a block diagram of a Digital Attendant 210, in accordance with an embodiment of the present invention. The circuitry is similar to the embodiments illustrated in FIGS. 1 and 12A, but adds additional features as well. The Digital Attendant 210 can be provided with these additional interface features through use of the PC 212, which may allow a user to implement a human operator interface as part of the attendant function. The PC 212 allows for a video screen display with GUI programming to allow the operator to easily determine the status of callers in the network and direct incoming calls. To connect with the central office 214 through line 216, or more lines, a circuit module 218 has been added to the embodiment of FIG. 1. PC 212 is shown connected to USB interface 26.

Figure 13:
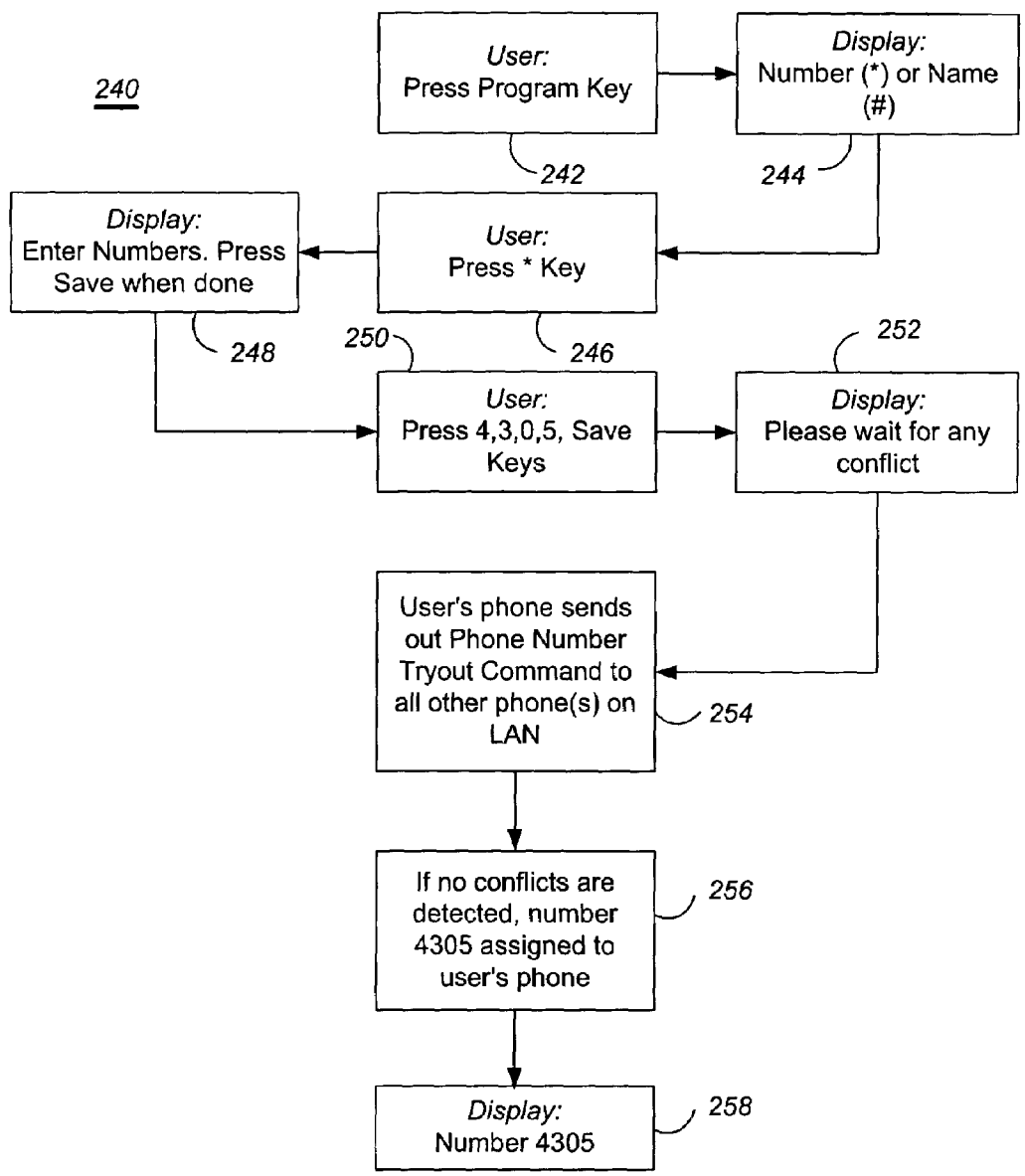
FIG. 13 shows flow chart illustrating the process for programming a phone number in accordance with an embodiment of the present invention.

FIG. 13 shows flow chart illustrating the process 240 for programming a phone number, in accordance with an embodiment of the present invention. In this process, the user manually programs a particular phone extension number 4305 into the user's extension by starting at step 242 and pressing the Program key 66b. In the next step 244, the phone display 62 in FIG. 4A, indicates a choice of Number (*) or Name (#). In step 246, the user presses the (*) key to program a number. In step 248, the display 62 prompts the user to enter the numbers and press the Save key 66a, when complete. In step 250, the user presses the 4, 3, 0, 5, and Save keys. In step 252, the display 62 instructs the user to wait while the phone checks for phone number conflicts elsewhere on the LAN. In step 254, the network phone sends out the 'Phone Number Tryout' command to all other network phones on the LAN. In steps 256 and 257 the network phone is waiting for the response from other network phones. If no other phone responds with "4305 in current use", number '4305' is assigned to the user, in step 258. All other phones will update their look up tables (LUTs) with the new number, such as shown in step 726, in FIG. 23. The number will be displayed on the user's phone, in step 259. If there is any phone number conflict then phone number already exists message is shown by the display in step 253. The user then enters different phone numbers in step 255.

Figure 14:
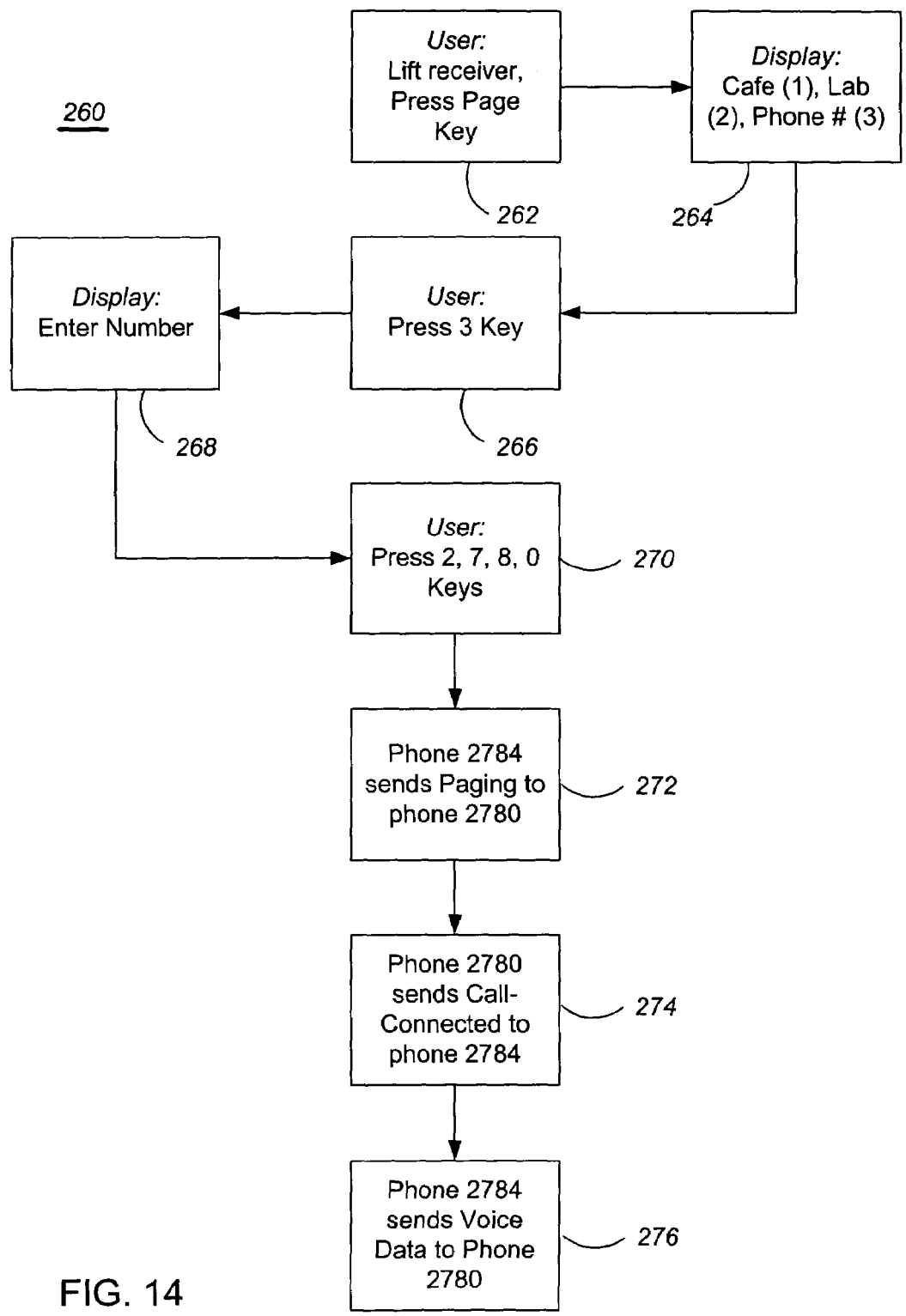
FIG. 14 shows a flow chart illustrating the process for paging in accordance with an embodiment of the present invention.

FIG. 14 shows a flow chart illustrating a process for paging, in accordance with an embodiment of the present invention. The user starts the process by lifting the handset and pressing the Page key 66c, in step 262. The display prompts the user for a choice, in step 264. In this example, the user chooses Phone #, choice (3), in step 266, by pressing the 3 key. In step 268, the display prompts for the phone number to which the page is to be directed. In this example, the user enters '2780' by pressing 2, 7, 8, 0 keys, in step 270. In step 272, phone '2784' sends a paging command to phone '2780'. In step 274, phone '2780' sends the phone at '2784', a 'Call-connected' command. In step 276, the phone at '2784' sends voice data to phone at '2780'.

Figure 15:
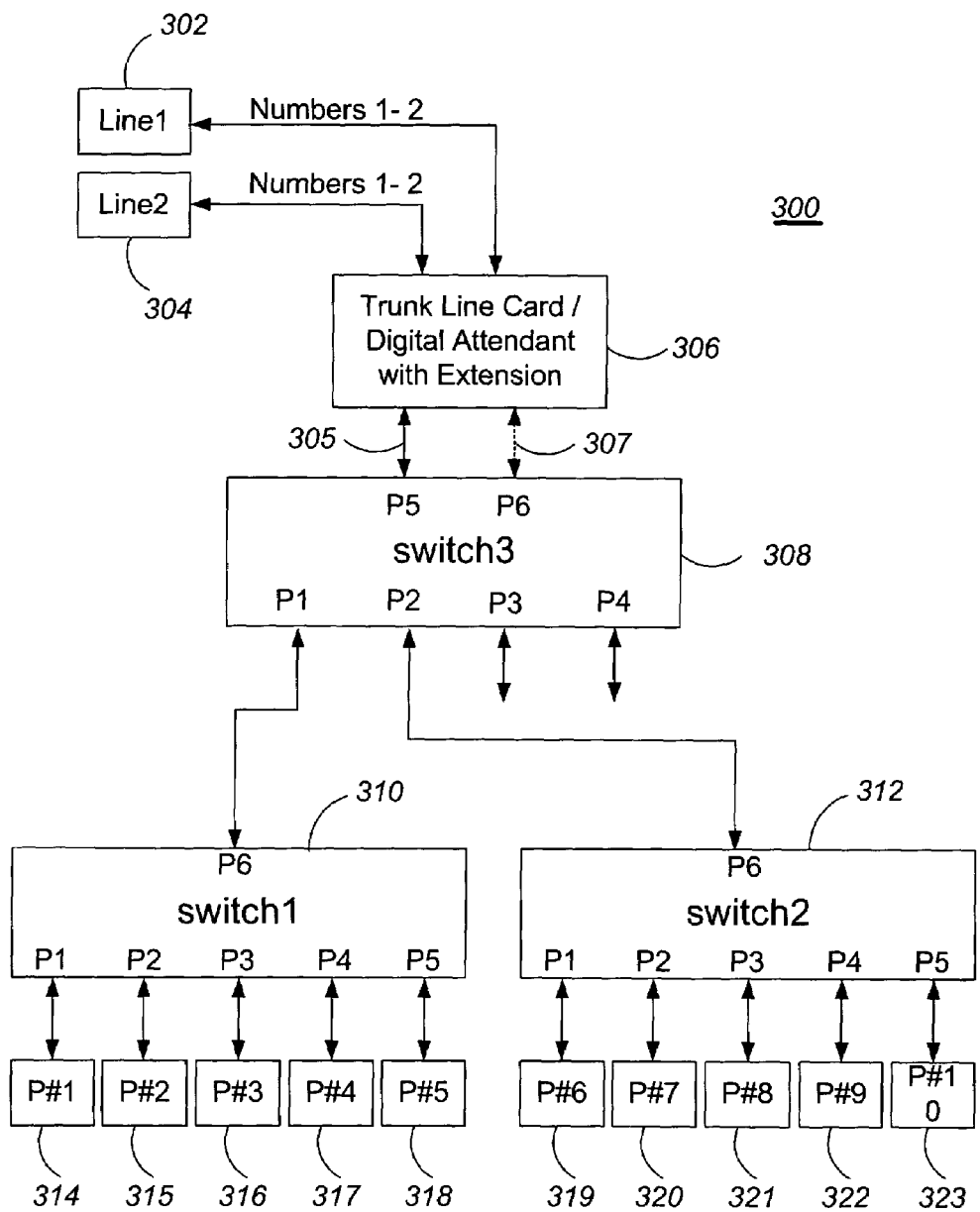
FIG. 15 shows a block diagram illustrating the connection of multiple network telephones with two outside phone lines and two phone numbers in accordance with an embodiment of the present invention.

FIG. 15 shows a block diagram 300 illustrating the connection of multiple network telephones with two outside phone lines 302, 304 in accordance with an embodiment of the present invention. Phone lines 302, 304 are coupled to a Trunk Line Card/Digital Attendant device 306. Trunk Line Card/Digital Attendant device 306 is normally supplied with one port 305, but optionally has a second port 307 for increased capacity. Trunk Line Card/Digital Attendant device 306 is coupled to six-port LAN switch 308, which in turn is coupled to six-port LAN switches 310 and 312. Network phones P#1 314 through P#5 318 are coupled to switch 310, and network phones P#6 319 through P#10 323 are coupled to switch 312.

In this embodiment, only two lines and two phone numbers are assigned by the phone company. As a result, only two open lines are available at any one time between users on phones P#1–P#10. Device 306 includes an extension identification utility that allows an incoming caller to pick an appropriate extension to which the call is directed. Such a utility can be completely automated, with prerecorded selections that allow the incoming caller to access directories of all internal phone extensions. Or, if preferred, trunk line card/digital attendant device 306 can be set up to provide human operator intervention to route calls.

Figure 16:
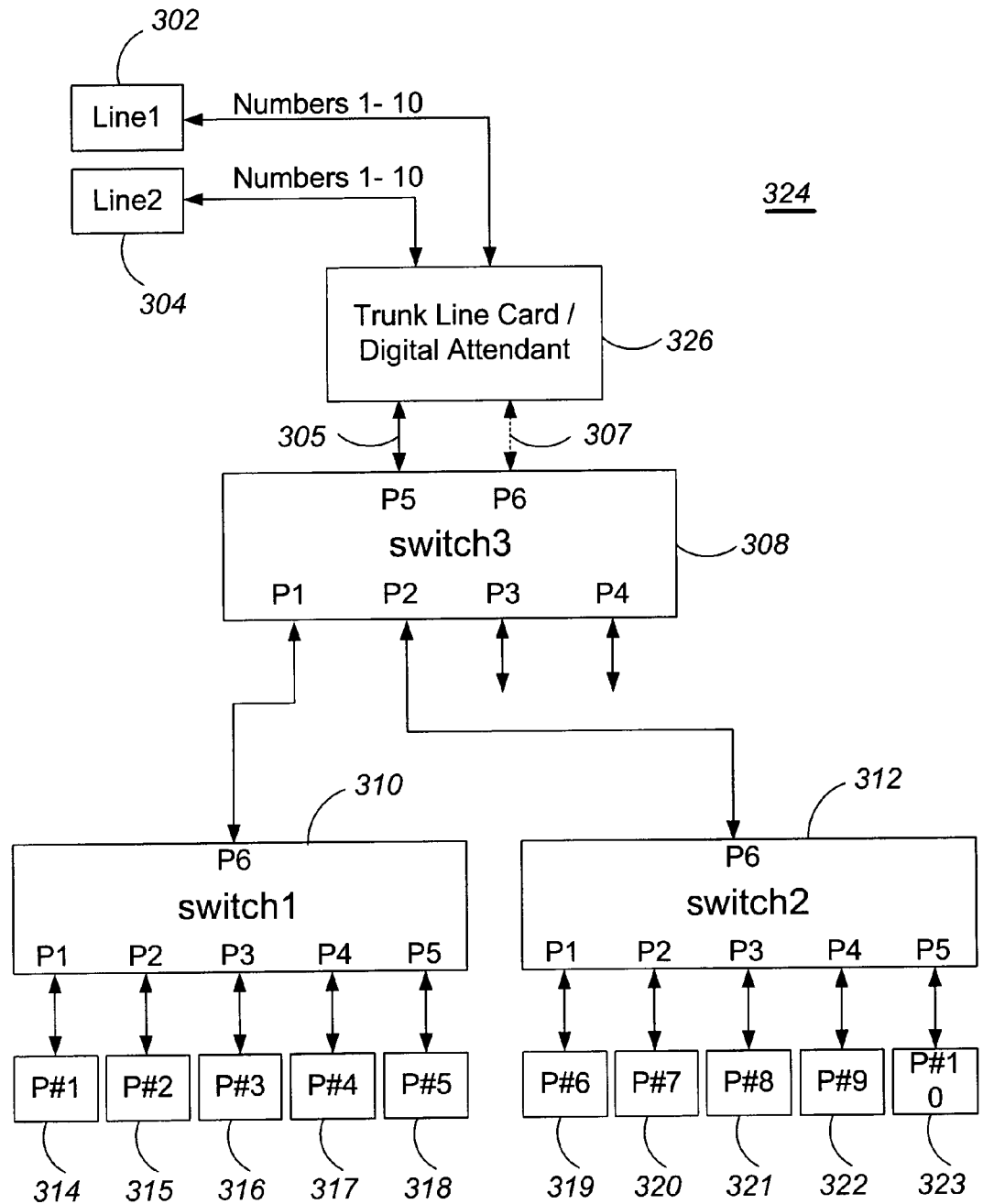
FIG. 16 shows a block diagram of the system of FIG. 15 with multiple phone numbers in accordance with an embodiment of the present invention.

FIG. 16 shows a block diagram 324 of the system of FIG. 15 with multiple outside telephone numbers in accordance with an embodiment of the present invention. In this embodiment, enough phone numbers have been allocated to allow a direct dial connection from an outside caller to each user at phones P#1–P#10. Module 326 no longer requires the extension access capability.

Figure 17:
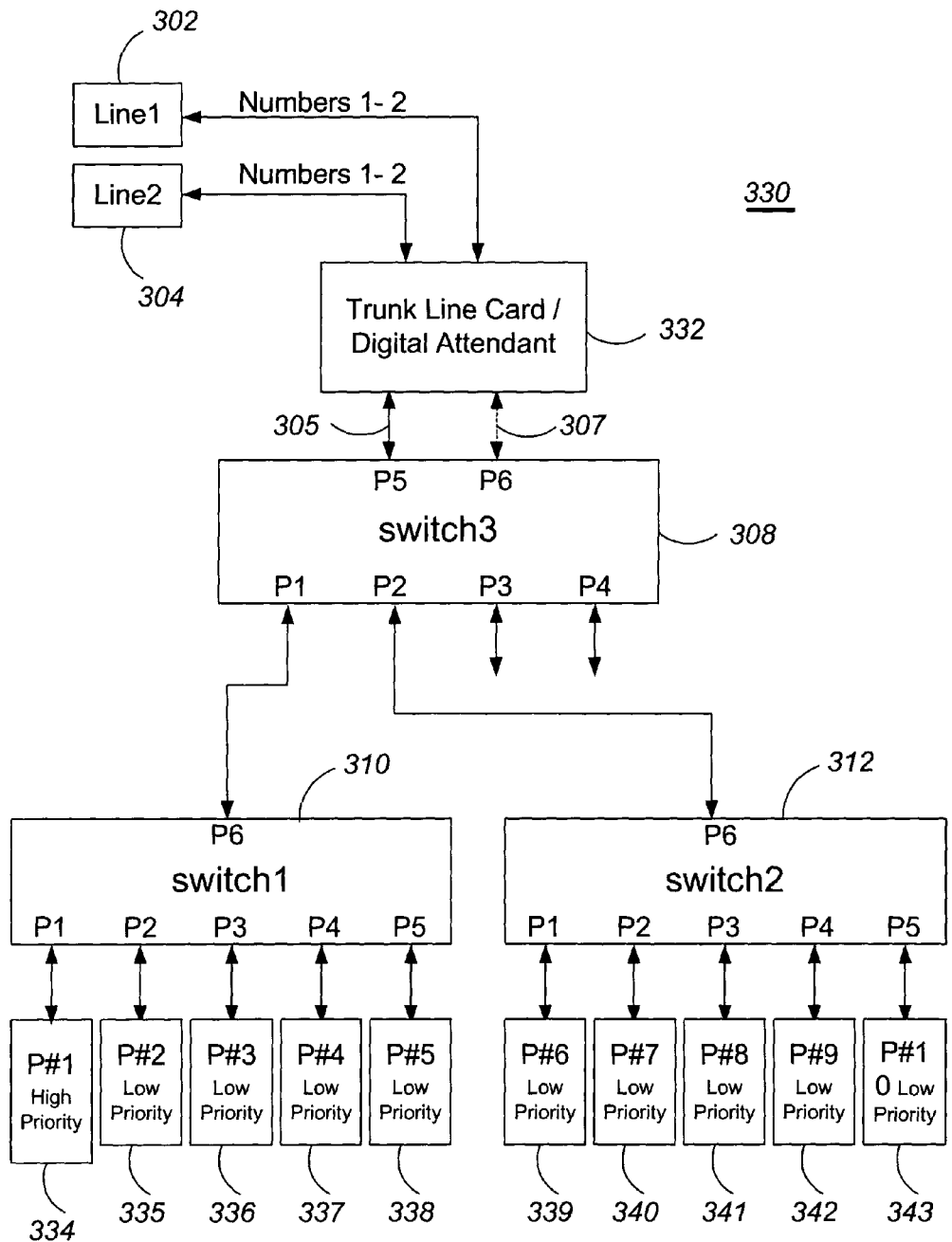
FIG. 17 shows a block diagram of the system of FIG. 15 designating one telephone of highest priority in accordance with an embodiment of the present invention.

FIG. 17 shows a block diagram 330 of the system of FIG. 15 except that one telephone is designated to have the highest priority, in accordance with an embodiment of the present invention. In this embodiment, only two phone numbers are provided, and network phone P#1 334 is designated highest priority. This causes all incoming calls are directed to P#1, and if P#1 is busy, the attendant module 332 directs the caller to choose an extension to which to direct the call. The call is then directed to one of phones P#2–P#10. This embodiment may be useful for organizations that wish to direct all calls through a receptionist or operator, for example. After hours or when the receptionist is unavailable, calls are forwarded directly to a chosen extension.

Figure 18:
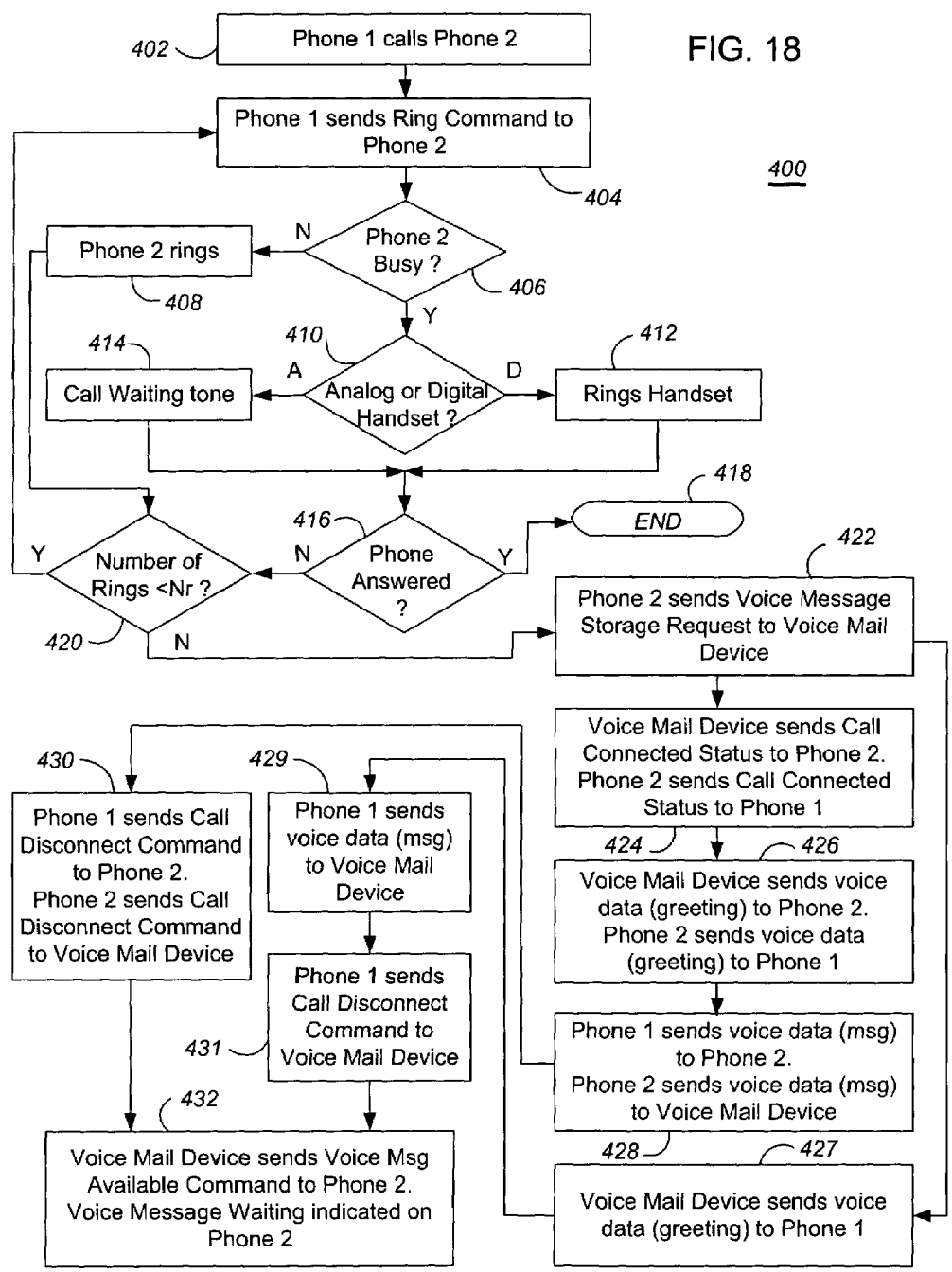
FIG. 18 shows a flow chart illustrating the processing steps for the voice mail function in accordance with an embodiment of the present invention.

FIG. 18 shows a flow chart 400 illustrating the processing steps for the voice mail function, in accordance with an embodiment of the present invention. The process starts at step 402 with phone 1 calling phone 2. In step 404, phone 1 sends a 'Ring' command to phone 2. If phone 2 is not busy, as determined in step 406, the phone 2 rings, in step 408. Next, in step 420, the number of rings is compared with a preset value NR and, if the number of rings does not exceed the preset value, as determined in step 420, the process continues at step 404. If the number of rings does exceed the preset value NR, as determined in step 420, the caller begins the voice mail function at step 422.

If phone 2 is busy, as determined in step 406, the type of handset for phone is determined in step 410. If the handset is analog, as determined in step 410, a call waiting tone is generated, in step 414, for the user on phone 2. If the handset is digital, as determined in step 410, the handset is rung, in step 412. In both steps 412 and 414, the user on phone 2 is allowed to interrupt the current call and pickup the incoming call from phone 1, in step 416.

If the phone is answered, as determined in step 416, the process ends. If the phone is not answered, as determined in step 416, the user at phone 1 has decided not to interrupt his current call and the number of ring attempts is again determined in step 420. If the number of ring attempts exceeds NR, then the caller on phone 1 begins the voice mail function at step 422.

At step 422, phone 2 sends a 'Voice Message Storage Request' command to the voice mail device. In step 424, the voice mail device sends a 'Call Connected Status' message to phone 2, and phone 2 sends a 'Call Connected Status' message to phone 1. In step 426, the voice mail device sends voice data ("leave a message" greeting) to phone 2, and phone 2 forwards the voice data (greeting) to phone 1. In step 428, phone 1 sends voice data (the message) to phone 2, which sends it to the voice mail device. In step 430, phone 1 sends phone 2 a 'Call Disconnect' command, and phone 2 forwards to the voice mail device the 'Call Disconnect' command. In step 432, the voice mail device sends a 'Voice Message Available' command to phone 2, and the Voice Message Available Indicator Lamp 67 is lit thereon to so indicate. Optionally, display 62 displays a '1 Msg Available' message.

In an alternative embodiment, the voice mail device sends the call connected status and voice data (greeting) directly to phone 1, in step 427 following step 422. In step 429, phone 1 sends the voice data (message) to the voice mail device and, in step 431, phone 1 sends the 'Call Disconnect' command to the voice mail device. In step 432, the voice mail device sends a 'Voice Message Available' command to phone 2, which lights the Voice Message Available Indicator Lamp 67.

Figure 19:
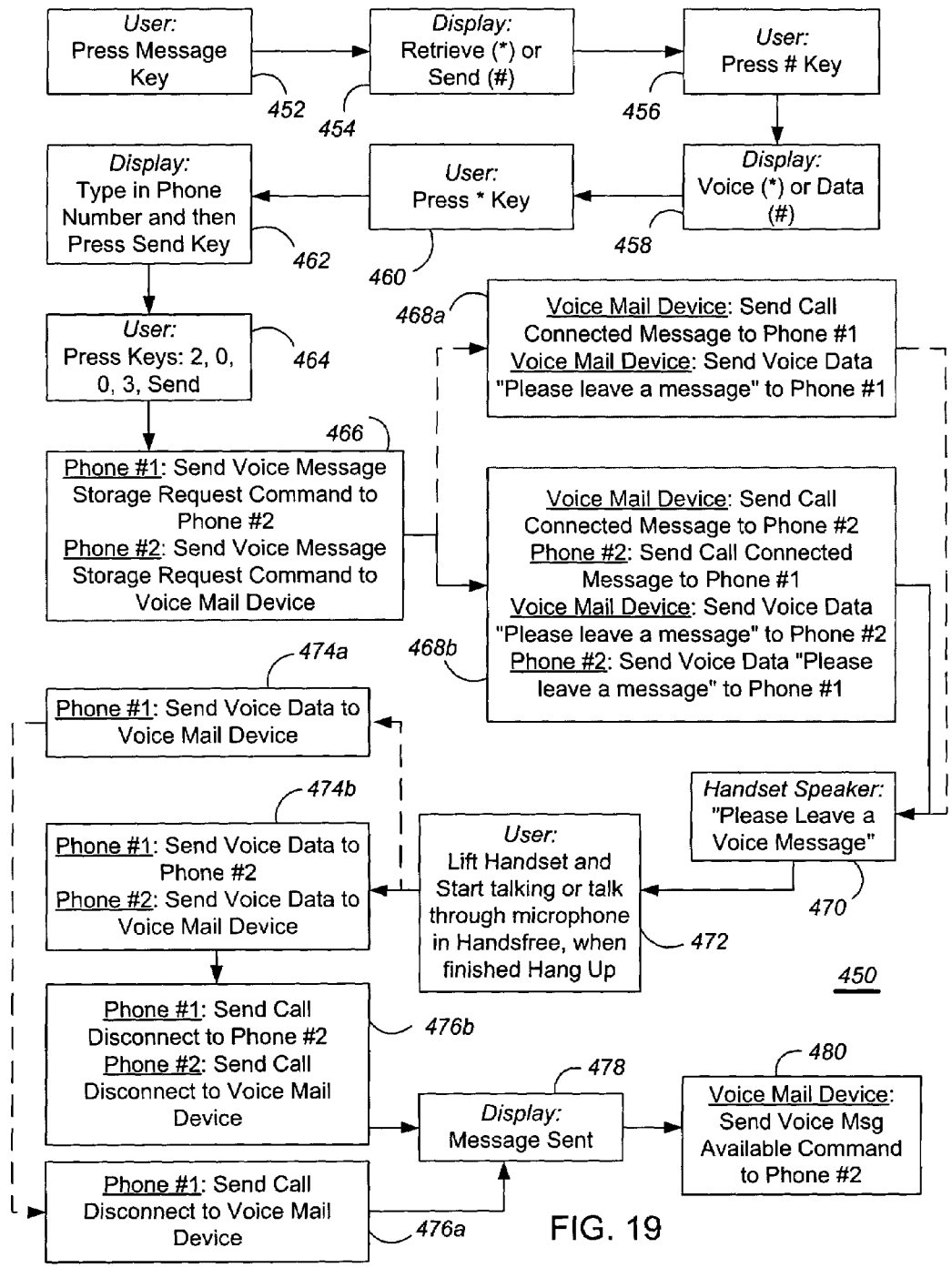
FIG. 19 shows a flow chart illustrating the process of transmitting a voice message between network telephones in accordance with an embodiment of the present invention.

FIG. 19 shows a flow chart 450 illustrating the process of transmitting a voice message between network telephones, in accordance with an embodiment of the present invention. In this process, the user on phone #1 leaves a voice message for the user at phone #2 without ringing phone #2. In step 452, the user at phone #1 presses the Message key 66*e*. In step 454, the display 62 at phone #1 prompts "Retrieve (*) or Send (#)". In step 456, the user presses the (#) key, making the choice to send a message. The display, in step 458, then prompts "Voice (*) or Data (#)". In step 460, the user presses the (*) key, selecting to send a voice message. In step 462, the display prompts the user to enter the phone number and press the Send key 66*d*. In step 464, the user enters the number of phone #2 (in this case '2003'), and presses the Send key.

Step 466 indicates the subsequent message traffic between phone #1, and phone #2. Phone #1 first sends a 'Voice Message Storage Request' command to phone #2. Phone #2 then sends a 'Voice Message Storage Request' command to the voice mail device.

In a first alternative following step 466, the voice mail device sends a 'Call Connected' message to phone to phone #1, and a voice data (the "greeting") to phone #1, in step 468*a*.

In a second alternative following step 466, the voice mail device sends a 'Call-connected' message to phone #2, which then sends a 'Call-connected' message to phone #1, in step 468*b*. Also, in step 468*b*, the voice mail device sends a voice data (the "greeting") directly to phone #2, which then sends a voice data greeting to phone #1.

At phone #1, the user hears the "greeting" on speaker, in step 470. In step 472, the user records the voice message.

In a first alternative following step 472, phone #1 sends the voice message recorded by the user directly to the voice mail device, in step 474*a*.

In a second alternative following step 472, phone #1 sends the voice message to phone #2, which in turn sends the message to the voice mail device, in step 474*b*. In step 476*a*, phone #1 sends a 'Call-Disconnect' message to the voice mail device. In step 476*b*, phone #1 sends the 'Call Disconnect' command to phone #2, which then sends the 'Call Disconnect' command to the voice mail device.

In step 478, the display indicates the message has been sent and, in step 480, the voice mail device sends a 'Voice Message Available' command to phone #2, resulting in the message indicator 67 illuminating at phone #2.

Figure 20:
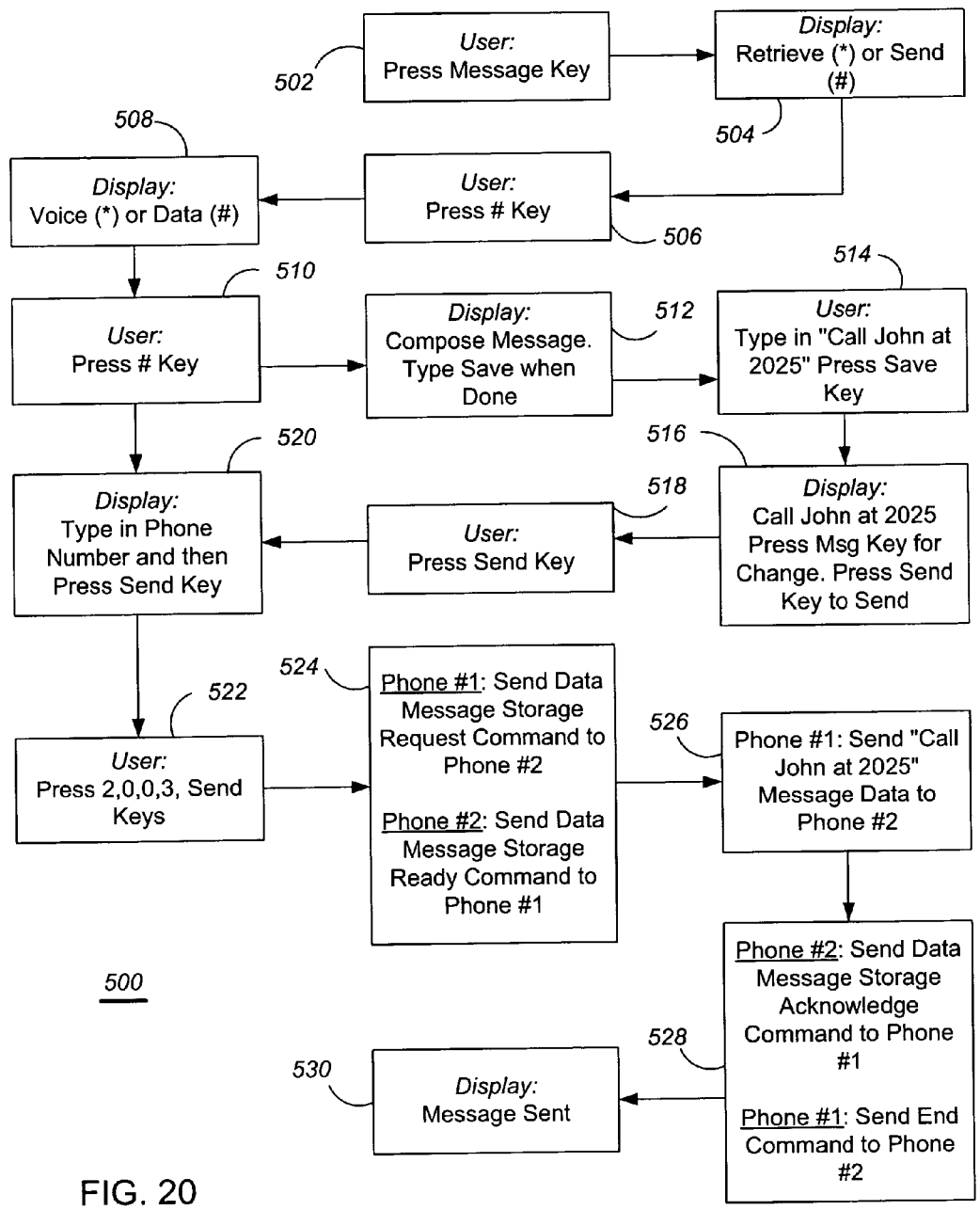
FIG. 20 shows a flow chart illustrating the process of transmitting a character data message in accordance with an embodiment of the present invention.

FIG. 20 shows a flow chart 500 illustrating the process of transmitting a character data message, in accordance with an embodiment of the present invention. In this process, the user on phone #1 leaves a data (or character) message for the user at phone #2 without ringing phone #2. In step 502, the user at phone #1 presses the Message key 66*e*. In step 504, the display 62 at phone #1 prompts "Retrieve (*) or Send (#)". In step 506, the user presses the (#) key, making the choice to send a message. The display, in step 508, then prompts "Voice (*) or Data (#)". The user presses the (#) key to select data, in step 510. In step 512, the display prompts the user to type in the data message and press Save 66*a*. In step 514, the user types in the message "Call John at 2025" and presses the Save key. In step 516, the display indicates the message just entered, followed by instructions to press the Message key 66*e* to change the message or press the Send key 66*d* to send. In step 518, the user presses the Send key. The display then prompts the user for the destination phone number, in step 520. In step 522, the user types in the phone number of phone #2 (in this case 2003) and presses Send key.

In step 524, phone #1 sends a 'Data Message Storage Request' command to phone #2 which then sends a 'Data Message Storage Ready' command back to phone #1. In step 526, phone #1 sends the data message to phone #2. In step 528, phone #2 sends a 'Data Message Storage Acknowledge' command to phone #1 which sends an 'End' command to phone #2. In step 530, phone #1 display indicates the message has been sent, and the message indicator 67 illuminated at phone #2.

Figure 21:
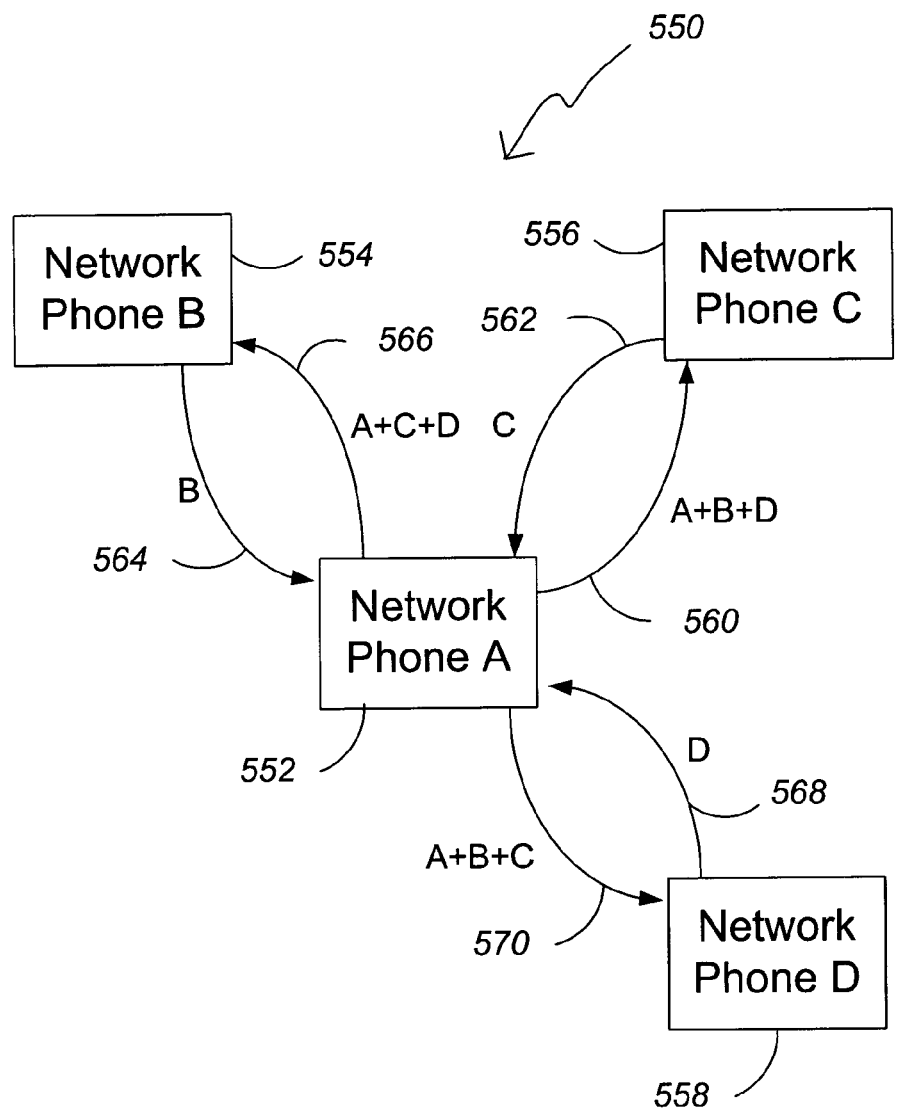
FIG. 21 shows a flow chart illustrating the process of communicating between network telephones during a conference call in accordance with an embodiment of the present invention.

FIG. 21 shows a flow chart 550 illustrating the process of communicating between network telephones during a conference call, in accordance with an embodiment of the present invention. In this example, network phone A 552 sets up a conference call between network phone B 554, network phone C 556, and network phone D 558. Voice data traffic from network phone B is sent to phone A via path 564, and voice data traffic from all the other phones in the conference call is routed to phone B through network phone A via path 566. Similarly, voice data traffic from phone C is routed to phone A via path 562, and voice data traffic from all the other phones in the conference call are routed to phone C through network phone A via path 560. Voice data traffic from phone D is routed to phone A via path 568, and voice data traffic from all the other phones in the conference call are routed to phone D through network phone A via path 570.

Figures 22A, 22B:
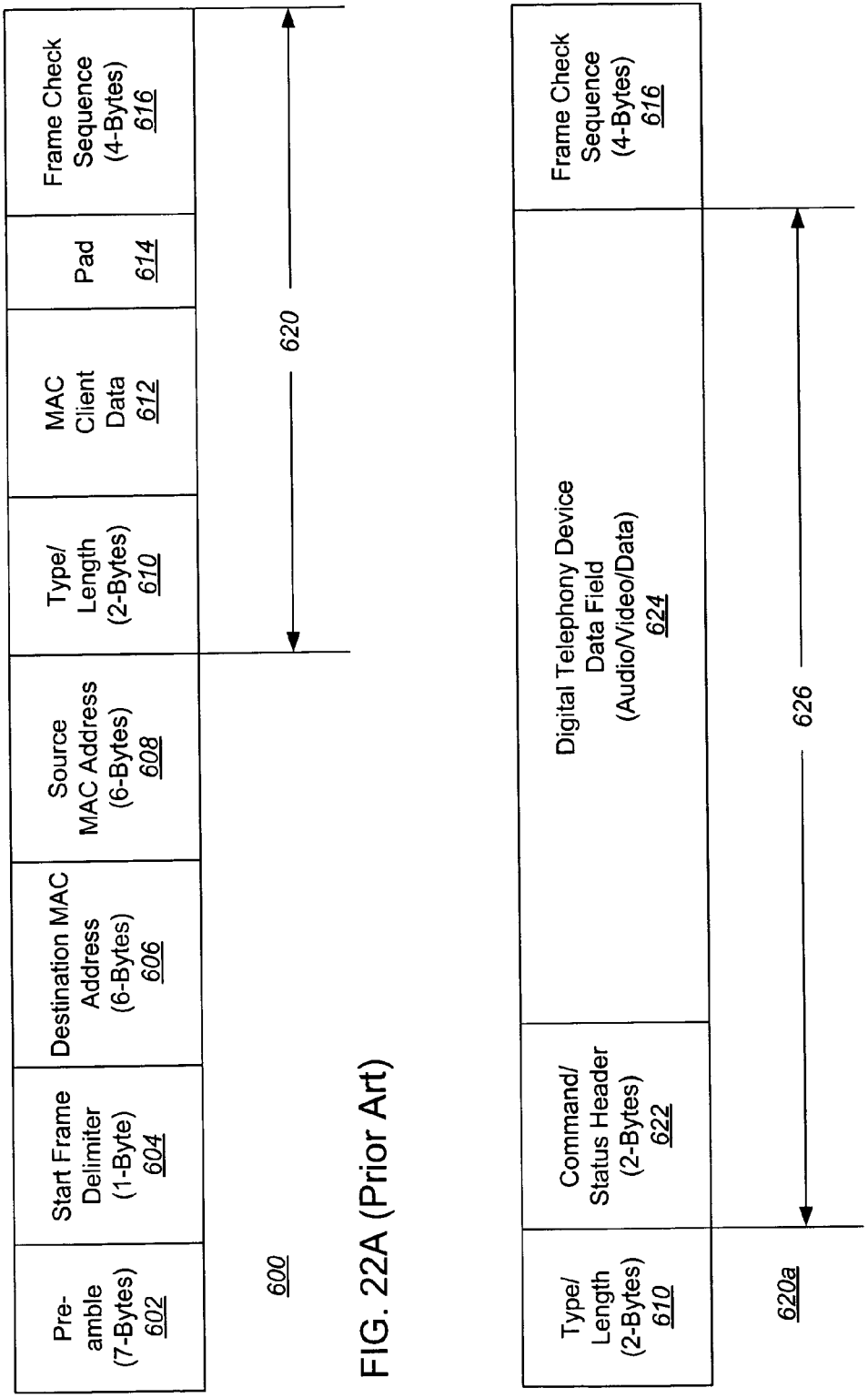
FIG. 22A shows a diagram illustrating the prior art structure of an Ethernet data transmission frame.
FIG. 22B shows a diagram illustrating a segment of the data transmission frame of FIG. 22A for a Type 1 Command in accordance with an embodiment of the present invention.

FIG. 22A shows a diagram 600 illustrating the prior art structure of an Ethernet data transmission frame. The protocol and data structure are in accordance with the IEEE 802.3 standard, and represent how digital information is transmitted from one device to another in an Ethernet LAN system. Because the transmission of data in an Ethernet system is basically serial in nature, the data transmission frame contains information, arranged in a sequential fashion, about the destination device identity and address, the source device identity and address, the data to be transmitted, and buffer information to identify the start and end of the frame.

The start of the data frame begins with a preamble 602 of 7 bytes representing a sequence of 56 bits having alternating 1 and 0 values that are used for synchronization. They serve to give components in the network time to detect the presence of a signal, and prepare to read the signal before the frame data arrives. Following the preamble 602 is a 1-byte segment called a start frame delimiter 604, which is a sequence of 8 bits '10101011' indicating the start of the frame. The start frame delimiter 604 is followed by the destination Media Access Control (MAC) address 606 and the source MAC address 608. The destination MAC address field 606 identifies the station that are to receive the frame. The source MAC address identifies the station that originates the frame. The IEEE 802.3 standard permits these address fields to be either 2-bytes or 6-bytes in length, but most current Ethernet implementations use 6-byte addresses. A destination address may specify either an "individual address" for a single station, or a "multicast address" for a group of stations. A destination address of all 1 bits refers to all stations on the LAN and is called a "broadcast address". The type/length field 610 is used to indicate the nature of the MAC client protocol, or the length of data in the subsequent MAC client data field 612. If the value of this field 610 is less than or equal to 1500, then the type/length field 610 indicates the number of bytes in the MAC client data field 612. If the value of this field is greater than or equal to 1536, then the type/length field 610 indicates the nature of the MAC client protocol (protocol type). The MAC client data field 612 contains the data to be transferred from the source station to the destination station or stations. The maximum size of this field is 1500 bytes. If the size of this field is less than 46 bytes, the use of the subsequent "Pad" field 614 is necessary to bring the frame to size up to the minimum length. A minimum Ethernet frame size is 64 bytes counting from the destination MAC Address field 606 through the frame check sequence field 616. The frame check sequence field 616 contains a 4-byte cyclical redundancy check (CRC) value used for error checking. When a source station assembles a MAC frame, it performs a CRC calculation on all the bits in the frame from the destination MAC address 606 through the pad field 614 (that is, all the fields except the preamble 602, start frame delimiter 604 and frame check sequence 616). The source station stores the values in this field and transmits it as part of the frame. When the frame is received by the destination station, it performs an identical check. If the calculated value does not match the value in this field, the destination station assumes an error has occurred during transmission and discards the frame.

While the present invention utilizes the format and protocol for communication in Ethernet LAN systems, in accordance with prior art established by the IEEE 802.3 standards, a new coding structure is established to enable operation of the network phones on an Ethernet LAN. Compatibility with the IEEE 802.3 protocol is maintained to assure that the network phones are compatible with and do not disrupt any existing devices connected to an Ethernet LAN system, as has been previously described in FIGS. 6–11, and FIGS. 15–17.

The network phone system described herein utilizes two basic data frame configurations as a basis for communication between network phone system components. A Type 1 (and 1A) frame is primarily utilized for transmitting voice or character data. A Type 2 frame is primarily utilized for transmitting commands. The distinguishing characteristics of each of the frame configurations are programmed into the fields 620 shown in FIG. 22A.

FIG. 22B shows a diagram illustrating a segment 620*a* of the data transmission frame of FIG. 22A for a Type 1 Command in accordance with an embodiment of the present invention. The Type 1 frame is primarily utilized for transmitting voice or character data (MAC Client data 612) equal to or greater than 46 bytes. Field 622 contains the command/status headers. Details are shown in Table 2. Field 624 contains the payload data, which is equal to or greater than 44 bytes for the Type 1 frame. The data contained in fields 612 and 614 of FIG. 22A is contained in field 626 of FIG. 22B. Information (coding) contained in field 626 is specific to the network phone embodiments of the present invention.

Table 2 contains the format and bit code information for the command status header field 622 in a Type 1 Command data frame. The command/status header includes two bytes of information, shown in the first and second columns labeled Byte 1 and Byte 2. Byte 1 codes are given by entries in the $2^{nd}$ through sixth rows. Byte 2 codes (Command/Status Codes) are shown in Table 4.

TABLE 2

| Byte 1 | Byte 2 | Description |
|---|---|---|
| xxxx:xxxx | yyyy:yyyy | Binary Bit Code, Command/Status xxxx:xxxx:yyyy:yyyy |
| ____:xxx_ | | accessory |
| ____:000_ | | network phone |
| ____:001_ | | USB port |
| ____:010_ to ____:111_ | | reserved |
| ____:____x | | count bit = 0, payload is ≥ 46 bytes for Type 1 frame |
| | yyyy:yyyy | Command/Status Code. See Table 4. |

Figure 22C:
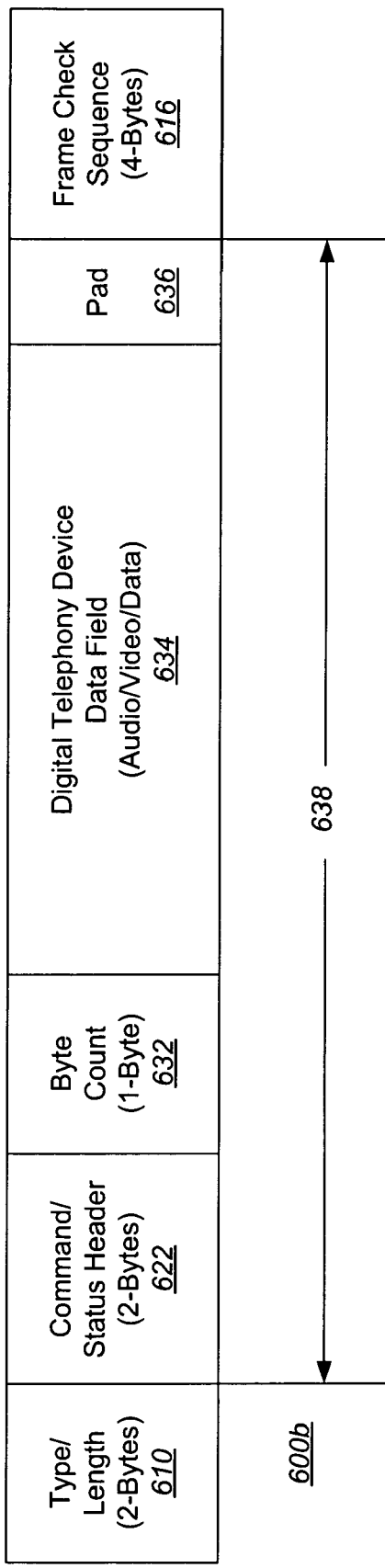
FIG. 22C shows a diagram illustrating a segment of the data transmission frame of FIG. 22A for a Type 1A Command in accordance with an embodiment of the present invention.

FIG. 22C shows a diagram illustrating a segment 620b of the data transmission frame of FIG. 22A for a Type 1A Command, in accordance with an embodiment of the present invention. The Type 1A frame is primarily utilized for transmitting voice or character data (MAC Client data 612) less than 46 bytes. Field 622 contains the command/status headers, as in the Type 1 frame. An additional field 632 is added to this frame to distinguish the important control and payload data from the pad in field 636. Details are shown in Table 3. Field 634 contains the payload data, which will be less than 43 bytes. The pad field 636 contains filler bytes of non-relevant information to bring the total length of field 638 to 46 bytes.

TABLE 3

| Byte 1 Command/Status | Byte 2 Command/ Status | Byte Count | Description |
|---|---|---|---|
| xxxx:xxxx | yyyy:yyyy | zzzz:zzzz | Binary Bit Code, Command/Status (2 bytes) xxxx:xxxx yyyy:yyyy |
| ____:xxx_ | | | accessory |
| ____:000_ | | | network phone |
| ____:001_ | | | USB port |
| ____:010_ to | | | reserved |
| ____:111_ | | | |
| ____:____x | | | count bit = 1, payload is < 46 bytes for Type 1A frame |
| | yyyy:yyyy | | Command Code. See Table 4. |
| | | zzzz:zzzz | Byte count |

Table 3 contains the format and bit code information for the command/status header field 622 and the Byte Count field 632 in a Type 1A Command data frame of FIG. 22C. The command/status header includes two bytes of information, shown in the first and second columns labeled Byte 1 and Byte 2. Byte 1 codes are given by entries in the $2^{nd}$ through sixth rows. Byte 2 codes are shown in Table 4. This table contains an additional column labeled 'Byte Count', which is the information contained in field 632, a single byte of information of value 0–43 that indicates the value in fields 634. The Byte Count is required because, without it, a device would be unable to distinguish the boundary between relevant data and pad bits. The Byte Count is not required for a Type 1 frame because there is no pad required; all data in the MAC Client field is relevant.

Figure 22D:
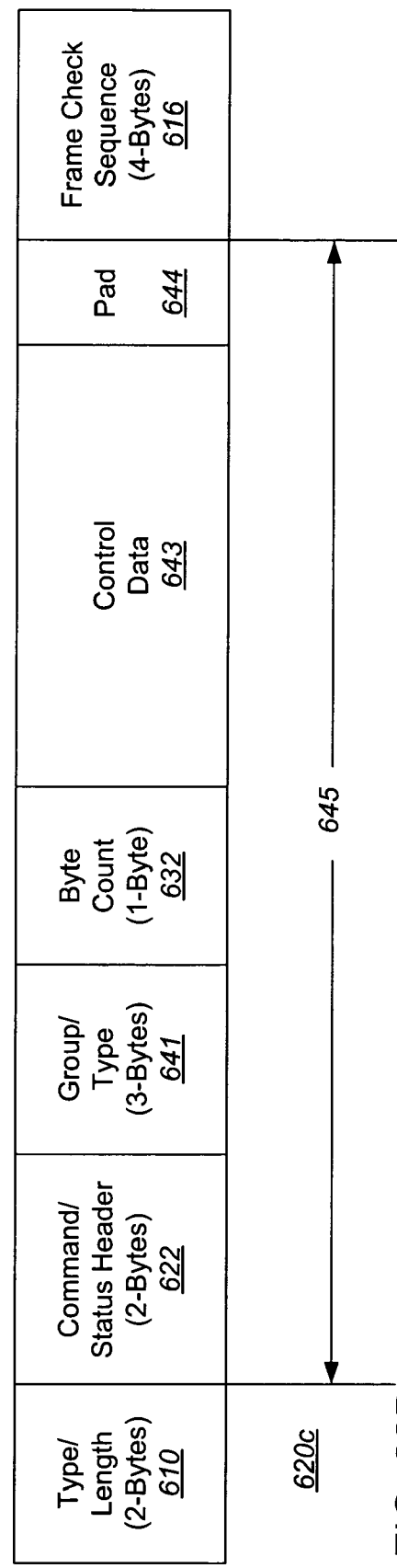
FIG. 22D shows a diagram illustrating a segment of the data transmission frame of FIG. 22A for a Type 2 Command in accordance with an embodiment of the present invention.

FIG. 22D is a diagram illustrating a segment 620c of the data transmission frame of FIG. 22A for a Type 2 Command, in accordance with an embodiment of the present invention. Type 2 commands are utilized primarily to transmit signaling or control and command data. The structure of fields 645 of FIG. 22D is the same as the structure of fields 638 of the previous FIG. 22C, except for the addition of the Group/Type field 641. The Command/Status header field 622 remains as described in Tables 2 and 3. The count bit equals 0 in Table 2 when the Control Data field 643 is greater than or equal to 40 bytes, and the count bit equals 1 in Table 3 when the Control Data field is less than 40 bytes. The Byte Count field 632 serves the same purpose as in the Type 1A command frame described above. When the Control Data field 643 is greater than or equal to 40 bytes, the Byte Count field 632 contains a value of 00. The pad field 644 serves the same purpose as that described in the Type 1A command frame, and contains non-relevant filler information only when Control Data field length is less than 40 bytes.

Table 4 shows the Command/Status codes in hexadecimal format of byte 2 as shown in column 2 of Tables 2 and 3. The entries in the table follow the form code:description, where 'code' is the second byte of the two byte hexadecimal number entered in field 622 of previous FIGS. 22B, 22C and 22D. Further explanation of the entries follows.

TABLE 4

00: Voice Data
01: Character Data (ASCII Data)
02: DTMF Data
03: Video Data
04: Hex Data
05-0F: Reserved
10: Ring (Initiate Call)
11: Ring Transfer
12: Call Ring Back
13: Ring Tone Status (normal ring)
14: Ring while Busy Tone Status
15: Phone Off-hook Status
16: Phone Busy
17: Call Connected
18: Call Transfer
19: Reserved
1A: Call Disconnected (End Command)
1B: Attention (Link) Request
1C: Attention (Link) Acknowledge
1D: Command End
1E: Command Acknowledge
1F: Reserved
20: Phone Number Tryout (broadcast)
21: Phone Number Broadcast
22: Phone Name Broadcast
23: Reserved
24: Reserved
25: Phone Number Already Exists
26: Phone Directory Request
27: Broadcast Phone Directory Request
28: Phone Directory Broadcast
29: Phone Directory Transmit
2A: Phone Directory Received
2B: Reserved
2C: Reserved
2D: Phone Set Inventory Request Broadcast
2E: Device Tally Broadcast
2F: Device Group/Type Request
30: Device Group/Type Status
31: Device Group/Type Configure
32: Device Group/Type (Broadcast by Non Ethernet Phone)
33: Reserved
34: Reserved
35: Data Message Storage Request
36: Voice Message Storage Request
37: Data Message Storage Acknowledge
38: Reserved
39: Retrieve Data Message
3A: Retrieve Voice Message
3B: Retrieve Next Data Message
3C: Retrieve Next Voice Message
3D: Retrieve Previous Data Message TABLE 4-continued 3E: Retrieve Previous Voice Message
3F: Retrieve Data Message N
40: Retrieve Voice Message N
41: Reserved
42: Reserved
43: Data Message Available
44: Voice Message Available
45: Delete Current Data Message
46: Delete Current Voice Message
47: Delete All Data Messages
48: Delete All Voice Messages
49: Reserved
4A: Reserved
4B: Data Message Deleted
4C: Voice Message Deleted
4D: Data Mail Box Empty
4E: Voice Mail Box Empty
4F: Data Mail Box Full
50: Voice Mail Box Full
51: Data Message Ready
52: Reserved
53: Password Request
54: Password Entry
55: Password OK
56: Password not OK
57: Reserved
58: Reserved
59: Remote Call Pickup
5A: Program Call Forward
5B: Paging
5C: Reserved
5D: Reserved
5E: Reserved
5F: Time Transmit
60: Date Transmit
61: Reserved
62: Call Log Request
63: Call Park Retrieve
64: Device Polling
65: Bridge Feature Program
66: Device Activity Request
67: Device Activity Report
68: Device Account Open
69: Device Account Close
6A-DF: Reserved
E0: Retrieve Firmware Version
E1: Retrieve Hardware Version
E2: Reserved
E3: Reserved
E4: Firmware Version/Revision Number
E5: Hardware Version/Revision Number
E6: Reserved
E7: Reserved
E8: Reserved
E9: Transmit Data Loop Back
EA: Echo Data Loop Back
EB: Command Error Status
EC: Command Does not Exist
ED: Request
EE: Acknowledge
EF: Reserved
F0: Firmware Update Download Broadcast
F1: Firmware Update Download Request
F2: Firmware Update Download Transmit
F3: Firmware Download Acknowledge
F4: Key Map Download Request
F5: Key Map Download
F6-FF: Reserved For Type 1, 1A 00: Voice Data. Voice Data sent/received by Network Telephone Device. The Network Telephone Device Data Field contains Digital Audio Data (Voice).

01: Character Data. Character (ASCII) Data sent/received by Network Telephone Device. The Network Telephone Device Data Field contains ASCII Data.

02: DTMF Data. Data sent/received by Network Telephone Device. The Network Telephone Device Data Field contains DTMF Data or Key pad Data. Refer to Table 1 for DTMF and Key pad values.

03: Video Data. Data sent/received by Network Telephone Device. The Network Telephone Device Data Field contains Video Data. Used by a USB Network Telephone Video Input Device such Digital Camera or Camera Recorder.

04: Hex Data. Hex Data sent/received by Network Telephone Device. The Network Telephone Device Data Field contains Hex Data.

05–0F: Reserved.

For Type 2

10: Ring Command. Ring sent by Network Telephone Source Device. The Control Data field contains its phone number, name.

11: Ring Transfer Command. Command sent by Network Telephone Source Device to alert the calling device so it transfers its current Ring to a third party. The Control Data field contains MAC Address, Phone number, Name of the third party 12: Call Ring Back. Sent to Network Telephone Destination Phone to instruct it to call back the Network Telephone Source Device as soon as the user of the Destination Phone is off the phone (on-hook).

13: Ring Tone Status. Ring Tone Status sent back by Network Telephone Called Phone. The Control Data field contains its Phone Number, Name.

14: Ring while Busy. Ring while Busy Status sent by Network Telephone Called Phone. The Control Data field contains its Phone Number, Name.

15: Phone Off-hook. Sent by Network Telephone Called Phone that it is Off-hook. The Control Data field contains its Phone Number, Name.

16: Phone Busy. Busy Status sent by Network Telephone Called Phone. The Control Data field contains its Phone Number, Name.

17: Call Connected. The Call is Connected (goes off-hook) by the Called Device. This will signal the start of the Call Connection.

18: Call Transfer. The current Call is transferred to a third party. The Control Data field contains the MAC Address Phone Number, Name of the third party.

19: Reserved.

1A: Call Disconnected. The current Call is disconnected (goes from off-hook to on-hook).

1B: Attention Request. Request the Attention of the Called Device. Used to start a Link or Path to the Called Device.

1C: Attention Acknowledge. Inform the Caller Device that a Link or Connection has been established.

1D: Command End. Inform the Called Device that the current command is terminated.

1E: Command Acknowledge. Inform the Called Device that the current command is acknowledged.

1F: Reserved.

20: Phone Number Tryout (broadcast). Sent by the Network Telephone Source Phone to all Network Telephone Devices with its phone number in its Data Field when it is first hooked up to the LAN network. The Network Telephone Source Phone waits for some 'time-out' period to make sure that no same number exists in the network and sends out the broadcast message one more time to be absolutely sure that it can use the number. If there is a 'Number Already Exists Response' received, then it waits for the 'Directory Transmit' command from the same responding Network Telephone Phone.

21: Phone Number Broadcast. Sent by the Network Telephone Source Phone with its Number to the rest of other Network Telephone Devices in the network so they can store the number in their look-up tables (LUTs) for Number Dialing.

22: Phone Name Broadcast. Sent by the Network Telephone Phone so other Network Devices can update their LUTs for Name Dialing.

23: Reserved.

24: Reserved.

25: Phone Number Already Exists. Sent by Network Telephone Source Phone to indicate that its phone number matches the number of the Network Telephone Destination Phone.

26: Phone Directory Request. Sent by the Network Telephone Device or User to another Network Telephone Device so the user can update the Phone Directory of the his Device. A user who manually configures his phone with a new number uses this command to update the Phone Directory of his phone. Network Telephone Trunk Line Card/Digital Attendant or similar device can use this command to update its Phone Directory.

27: Broadcast Phone Directory Request. Sent by the Network Telephone Trunk Line Card/Digital Attendant to update its Directory or by the Network Telephone Phone when it first tries out its phone number but does not receive any Directory Transmit Command from other device. The Control Data byte determines the t or time count (each count=10 ms; 0–1=10 ms, 2=20 ms, 3=30 ms, . . . n=(30×n) ms. For 100 Mbit/s Ethernet system, the count=2 minimum. For 10 Mbits/s Ethernet system, the count=20 minimum) in milliseconds for the response time of the 'Phone Directory Broadcast' command. (See next command below)

28: Phone Directory Broadcast. Control Data Field should be as follows: Group/Type, MAC Address, Phone Number, Name (if any), Group/Type, MAC Address, Phone Number, Name (if any) of n devices. This Command is sent by the Network Telephone Source Device in response to a 'Phone Directory Request Broadcast' command (Command 27). This command should be executed only once from a single device to prevent the network from being flooded (since all Phone Directories are identical). In other words, only one device executes this command and the others do not repeat the command when they receive this command from the network. The following formula (n−1)×t applies, where: n is the order number of phone number (from lowest to highest or 1 to N where N=Number of Phone Sets); t, the time in milliseconds (example 30 milliseconds), determines which device should execute this command; and [(n−1)×t] is time out period before a device can issue this command. Device with the order phone number equal to 1 (n=1, number 1) will issue this command right away since its time-out period is 0 ms. If, for some reason, device number 1 is not present, then the device with n=2 and t=30 ms has a 30 ms time out before it can issue this command. Larger timeout times are computed for higher order numbers.

29: Phone Directory Transmit. This command is sent in response to the 'Phone Directory Request' command (26). Control Data Field should be as follows: Group/Type, MAC Address, Phone Number, Name (if any), Group/Type, MAC Address, Phone Number, Name (if any) of n devices.

2A: Phone Directory Received. This Status lets the other Device know that its Phone Directory has been received.

2B: Reserved.

2C: Reserved.

2D: Phone Set Inventory Request Broadcast. The Broadcast Command is to request the presence of all the Network Telephone Devices (LAN Phone Sets) in the network. This command is optional and used only to reconcile the Presence of all the Phone Devices with the LUT because some devices may be no longer in service (removed). The Control Data byte determines the t or time (t greater than 0; default minimum 30 ms) in milliseconds for the response of the Phone Directory Broadcast command. (See commands 27 & 2E below)

2E: Device Tally Broadcast. The command is in response to the Phone Set Inventory Request Broadcast above. Each Phone Set should wait for the [(n−1) * t] time out period to expire before issue this command. The formula allows each device to execute this command in an orderly manner and every one of them will have the chance to execute this command. Control Data Field should be as follows: Group/Type, MAC Address, Phone Number, Name (if any).

2F: Device Group/Type Request. Used to request the Device Group/Type of the Network Phone.

30: Device Group/Type Status. This Status is used in response to the Device Group/Type Request Command.

31: Device Group/Type Configure. Sent to Network Destination Phone to configure its Group/Type. Used by the Administrator to configure the Group/Type of the Network Destination device.

32: Device Group/Type. The Broadcast Command is for Non Network Phone Devices such as Mail Box, PSTN Line Card, or similar devices so all the Network Telephone Devices can use its MAC Address to build up their LUTs.

Following is an example of the Network Telephone Trunk Line Card broadcasting the 'Device Type' command in an LAN Phone System where users have to dial digit 9 (access code) first in order to get access to the outside call (Dial digit 9 then follows by the telephone number):

0132 000012 01 09

0132←- - - Device Type Command (Command Header)

000012←- - - Trunk Card (Group Type)

01←- - - 1 byte follows (Byte Count)

09←- - - Digit 9 (for Access Code to Trunk Line Card)

33: Reserved.

34: Reserved.

35: Data Message Storage Request. Request to the Network Telephone Destination Device for Data Message Storage. If the control data field is non-blank, then it is for $3^{rd}$ part network phone device. The control field contains the MAC address, phone number of third party data message storage request if any.

36: Voice Message Storage Request. Request to the Network Telephone Destination Device for Voice Message Storage. If the control data field is non-blank, then it is for $3^{rd}$ part network phone device. The control field contains the MAC address, phone number of third party voice message storage request, if any.

37: Data Message Storage Acknowledge. Send to the Network Telephone Destination Device for 'Voice Message Storage' acknowledgement.

38: Reserved

39: Retrieve Data Message. The Network Telephone Source Phone is requesting the Data Message from Network Telephone Voice Mail Device/Phone.

3A: Retrieve Voice Message. The Network Telephone Source Phone is requesting the Voice Message from Network Telephone Voice Mail Device/Phone.

3B: Retrieve Next Data Message. The Network Telephone Source Phone is requesting the next Data Message from Network Telephone Voice Mail Device/Phone.

3C: Retrieve Next Voice Message. The Network Telephone Source Phone is requesting the next Voice Message from Network Telephone Voice Mail Device/Phone.

3D: Retrieve Previous Data Message. The Network Telephone Source Phone is requesting the previous Data Message from Network Telephone Voice Mail Device/Phone.

3E: Retrieve Previous Voice Message. The Network Telephone Source Phone is requesting the previous Voice Message from Network Telephone Voice Mail Device/Phone.

3F: Retrieve Data Message N. The Network Telephone Source Phone is requesting the Data Message Number (N=1 to n) from Network Telephone Voice Mail Device/Phone.

40: Retrieve Voice Message N. The Network Telephone Source Phone is requesting the Voice Message Number (N=1 to n) from Network Telephone Voice Mail Device/Phone.

41: Reserved.

42: Reserved.

43: Data Message Available. The Network Telephone Source Device (i.e. Voice Mail) informs the Network Telephone Destination Phone that a Data Message is Available in its Mail Box.

44: Voice Message Available. The Network Telephone Source Device (i.e. Voice Mail) informs the Destination Phone that a Voice Message is Available in its Mail Box.

45: Delete Current Data Message. The Network Telephone Source Device requests to the Network Telephone Destination Device (Voice Mail/Phone) that its Current Data Message is to be deleted in its Mail Box.

46: Delete Current Voice Message. The Network Telephone Source Device requests to the Network Telephone Destination Device (Voice Mail/Phone) that its Current Voice Message is to be deleted in its Mail Box.

47: Delete All Data Messages. The Network Telephone Source Device requests to the Network Telephone Destination Device (Voice Mail/Phone) that all of its Data Messages are to be deleted in the Mail Box.

48: Delete All Voice Messages. The Network Telephone Source Device requests to the Network Telephone Destination Device (Voice Mail/Phone) that all of its Voice Messages are to be deleted in the Mail Box.

49: Reserved.

4A: Reserved.

4B: Data Message Deleted. Sent out to inform the Network Telephone Received Phone that the current Data Message is already Deleted.

4C: Voice Message Deleted. Sent out to inform the Network Telephone Received Phone that the current Voice Message is already Deleted.

4D: Data Mail Box Empty. Sent out to inform the Network Telephone Received Phone that its Data Box is Empty.

4E: Voice Mail Box Empty. Sent out to inform the Network Telephone Received Phone that its Voice Box is Empty.

4F: Data Mail Box Full. Sent out to inform the Network Telephone Received Phone that its Data Mail Box is Full.

50: Voice Mail Box Full. Sent out to inform the Network Telephone Received Phone that its Voice Mail Box is Full.

51: Data Message Ready. Informs the Network Telephone Caller Phone that it is ready to accept the Data Message.

52: Reserved.

53: Password Request. Sent to Network Telephone Destination Phone for its Password.

54: Password Entry. Send to Network Telephone Destination Phone with its Password.

55: Password OK Send to Network Telephone Destination Phone to Inform that the Password is OK 56: Password not OK. Send to Network Telephone Destination Phone to Inform that the Password is not OK 57: Reserved.

58: Reserved.

59: Remote Call Pickup. Sent by the Network Telephone Source Phone to a Ringing Network Telephone Destination Phone so the user is able to pick up the call. The Control Data field contains its phone number.

5A: Program Call Forward. Send to the Network Telephone Destination Phone so the Network Telephone Destination Phone will forward all Calls to the third party Phone. The phone number is part of the Network Phone Data Field.

5B: Paging. Send to the Network Telephone Destination Phone (without ringing it first) the Voice Data (Audio) Message.

5C: Reserved.

5D: Reserved.

5E: Reserved.

5F: Time Transmit. Send to the Network Telephone Destination Phone the Time of Day.

60: Date Transmit. Send to the Network Telephone Destination Phone the Month, Day and Year.

61: Reserved.

62: Call Log Request. Send to the Network Telephone Destination Phone for Call Log Information.

63: Call Park Retrieve. Send to the Network Telephone Destination Phone (whose call is parked) for Call Park Retrieval. Upon receiving this command, the called device will transfer the call to the Caller and goes to idle (on-hook).

64: Device Polling. Used by the Trunk Line Card/Attendant to poll each Network Phone device every few seconds so it knows if the device is still present or not and its related status. This command is optional.

65: Bridge Feature Program. Send to the Network Telephone Destination Phones for Bridge Feature Programming. The duration of the bridge feature is determined by the count in the two bytes in the Control Data field. The count decrements every minute and this feature will expire when it reaches zero. The Device programmed with this feature will allow other callers to call in for Conference Meeting, . . . Callers calling in will be asked for correct password and only then will be allowed to connect to this device. When the Bridge Feature expires, the Phone will resort back to its normal Group/Type Feature.

66: Device Activity Request. Send to the Network Telephone Destination Phone for its Activity Information. It is used for Administrating and Accounting Purposes.

67: Device Activity Report. Send to the Network Telephone Destination Device its Activity Information such as call duration, call time, destination number, . . .

68: Device Account Open. Assign the account to the Network Telephone Destination Device for Billing and Accounting purposes.

69: Device Account Close. Close the account to the Network Telephone Destination Device.

6A–DF: Reserved

E0: Retrieve Firmware Version. Retrieve from the Network Telephone Destination Device its Firmware Version Number.

E1: Retrieve Hardware Version. Retrieve from the Network Telephone Destination Device its Hardware Version Number.

E2: Reserved.

E3: Reserved.

E4: Firmware Version/Revision Number. Version/Revision Number of the Current Firmware.

E5: Hardware Version/Revision Number. Version/Revision Number of the Hardware.

E6: Reserved.

E7: Reserved.

E8: Reserved.

E9: Transmit Data Loop Back. Used to Send Loop Back Data to an Network Telephone Destination Device. The Ethernet Control Data field contains the Loop Back Data. It is used mainly for Debugging Purpose.

EA: Echo Data Loop Back. Used to Echo Loop Back Data to an Network Telephone Destination Device. The Ethernet Control Data field contains the Loop Back Data. It is used mainly for Debugging Purpose.

EB: Command Error Status. Used to inform the Network Telephone Destination Device of its Command Error Status EC: Command Does not Exist. Used to inform the Network Telephone Destination Device that its Command does not Exist.

ED: Request. Used to Send a Request to a Network Telephone Destination Device. It is used mainly for Debugging Purpose.

aaaa. The code segment aaaa:aaaa represents the Type code, and is shown in the third column in Table 5. The code segment bbbb represents the Priority code. The code segment cccc represents the Group code, and is shown, along with the Priority code in column 2 of Table 5. The code segment dddd represents the Paging code, and is shown in the first column of Table 5.

TABLE 5

| :Page | Group:Priority | Type | Code | Description |
|---|---|---|---|---|
| eeee:dddd | cccc:bbbb | aaaa:aaaa | | |
| | | 00000000 | BO | Inter-Building Only |
| | | 00000001 | LC | Local Call Allowed |
| | | 00000010 | DC | Long Distance Call Allowed |
| | | 00000011 | IC | International Call Allowed |
| | | 00000110 | MC | Microphone for listening only |
| | | 00000111 | SP | Speaker Phone for Paging only |
| | | 00001xxx | spare | Spare |
| | | 00010000 | FM | Fax Machine |
| | | 00010001 | VM | Voice Mail Device |
| | | 00010010 | TC | Trunk Line Card/Digital Attendan |
| | | 00010011 | VC | VPN Line Card |
| | | 00010100 | | |
| | | 00010101 | USB | USB Device |
| | | 00010110 | USB | USB Video Input Device |
| | | 00010111 | USB | USB Video output Device |
| | | 00011000 | USB | USB Scanner Device |
| | | 00011001 | USB | USB Printer Device |
| | _____:0000 | | NP | No Priority |
| | _____:0001 | | P0 | Priority 0 Lowest |
| | _____:001x | | P1 | Priority 1 |
| | _____:01xx | | P2 | Priority 2 |
| | _____:1xxx | | P3 | Priority 3 Highest |
| | 0000:_____ | | DL | Direct Line |
| | 0001:_____ | | G1 | Group 1 |
| | 0010:_____ | | G2 | Group 2 |
| | 0100:_____ | | G3 | Group 3 |
| | 1000:_____ | | G4 | Group 4 |
| _____:0000 | | | Pg0 | Individual Paging Only |
| _____:0001 | | | Pg1 | Group 1 Paging |
| _____:0010 | | | Pg2 | Group 2 Paging |
| _____:0100 | | | Pg3 | Group 3 Paging |
| _____:1000 | | | Pg4 | Group 4 Paging |
| 0000:_____ | | | | Reserved |

EE: Acknowledge. Used to Acknowledge the Request Command. It is used mainly for Debugging Purpose.

EF: Reserved

F0: Firmware Update Download Broadcast. Broadcast to all Network Telephone Devices their Updated Firmware Program.

F1: Firmware Update Download Request. Sent to the Network Telephone Destination Device for its Updated Firmware Program.

F2: Firmware Update Download Transmit. Sent to the Network Telephone Destination Device its Updated Firmware Program.

F3: Firmware Download Acknowledge. Sent to the Network Telephone Destination Device that it has received its Firmware Program.

F4: Key Map Download Request. Sent to the Network Telephone Destination Device for its Updated Key Map.

F5: Key Map Download. Sent to the Network Telephone Destination Device its Updated Key Map.

F6–FF: Reserved

Table 5 shows the Group/Type information (field 641 of FIG. 22D) for various embodiments of the present invention. The Group/Type information is composed of three bytes of information, 24 bits total in binary. The three bytes can be represented in binary form as eeee:dddd:cccc:bbbb:aaaa:

Explanation of the entries in of the Table 5 above follows:

Type:

BO: Network Phone Calls allowed taking place only within the Company Building, for example, phones located in Reception Lobby area.

LC: Local Call only for phones located in such area as the Lab where more than one person would be using the phones and no long distance is allowed.

DC: Long Distance Call allowed such as individual phones where the user needs to make long distance calls very often.

IC: International Calls allowed such as people in marketing department whose phones have the need for such service.

MC: Microphone Type or the Phone is for listening only. Should not be implemented for Ethic and Legal Reasons.

SP: Speakerphone is used for Paging only in areas such as Cafeteria, Lab, Warehouse,. The Caller dials its number and can start speaking as soon as it makes the connection. If there is a Paging message going on, a Busy Tone will alert the user so he/she can use it later.

FM: Standard Fax Machine.

VM: Voice Mail Device. This could be PC where Voice & Data Messages are stored and retrieved. The Retrieve & Transmit Driver is implemented by its Software Application.

TC: Trunk Line Card/Digital Attendant. The Hardware Device can reside in a PC or Stand Alone one. It allows the Network Telephone Devices to communicate to the PSTN.

VC: VPN Line Card. The Hardware Device can reside in a PC or Stand Alone one. It allows the Network Telephone Devices to communicate to the Data Network USB: Universal Serial Interface.

Priority:

NP: No priority.

Pn: Any external incoming call will be transmitted by the Attendant (with Extension Option) to the phone with the highest Priority first. Only when it is busy then it will be routed to the next phone. P0 has the lowest priority and P3 the highest. This feature applies only when there are less phone numbers assigned by the Central Office (Phone Company) than the number of phone sets.

Group:

DL: Direct Line indicates that an incoming call will be directed to the phone with the matched number.

G1, G2, G3, G4: Group Line means an incoming call will be directed to the first available phone in the group (since they use one common telephone number). Only when all the phones in the group are used then busy will tone generated. Groups can be overlapped when more than 1 bit is set. When a phone have group overlap feature it will not be rung until one of its group of phone lines are totally busy. Phones with Group Features still can support Direct Line call. Phone with Direct Line Feature will not support Group. Examples of Group Line Phones are in Sale, Customer Support, Warehouse, . . . where only one common Phone Number (group) is needed.

Page:

Pg1, Pg2, Pg3 and Pg4: Paging is applied only for Speaker Phone(s). When Paging happens, every one of the Speakerphones with the same Group Paging bit turned on will be transmitted with the same Paging Command.

Figure 23:
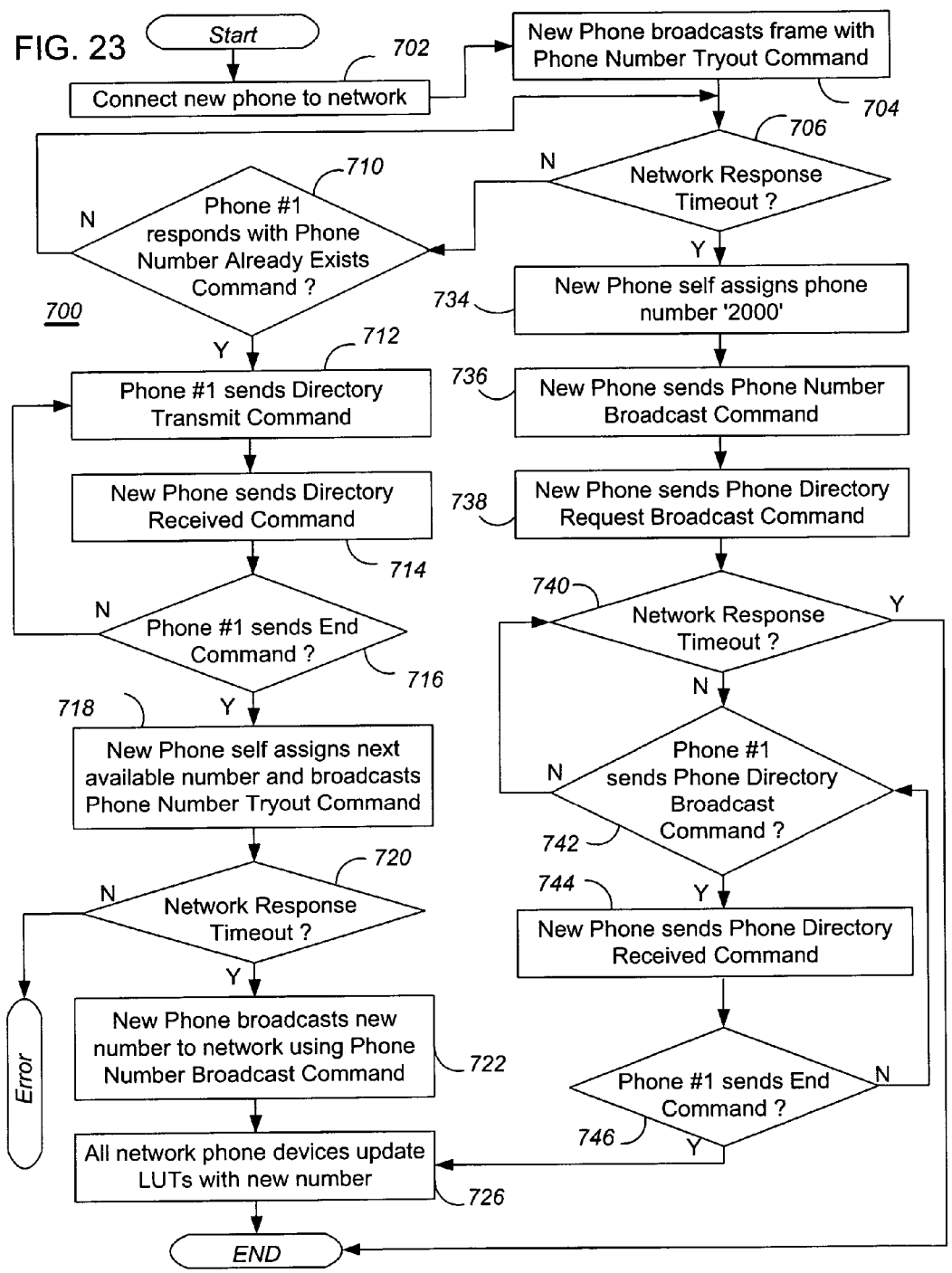
FIG. 23 shows a flow chart illustrating the process of configuring telephones added to the network in accordance with an embodiment of the present invention.

FIG. 23 shows a flow chart 700 illustrating the process of configuring a telephone that is added to the network in accordance with an embodiment of the present invention. In step 702, a new phone is connected to the network and, in step 704 assigns phone number 2000 to itself. In step 706, the phone broadcasts over the network a 'Phone Number Tryout' command with an initial number of '2000'. In step 708, the newly connected phone waits for a response from the network. If there is a network response timeout, as determined in step 708 (meaning that there is no response during the timeout period), then, in step 736, broadcasts a 'Phone Number Broadcast' command over the network, after which the newly connected phone sends a 'Phone Directory Request Broadcast' command, in step 738 and waits for a response. If a network response timeout occurs, then the newly connected phone is the only one in the network. A response received during the network response timeout, in step 740, contains the phone directory of all existing phones sent from phone #1, in step 742. The newly connected phone then acknowledges the message containing the directory by sending a 'Phone Directory Received' command, in step 744, and the process completes with the receipt of an 'End' command from phone #1, in step 746. Otherwise, phone #1 again sends a 'Directory Broadcast' command, in step 742. All network phone devices update their LUTs in step 726.

If there is a response during the timeout period, as determined in step 710, then the newly connected phone is not the only phone connected to the network. At least one other phone is connected to the network and of these, one of them is the phone that was first connected to the network. That phone, designated Phone #1, responds to the 'Phone Number Tryout' command with a 'Phone Number Already Number Exists' message, because the number broadcast in the 'Phone Number Tryout' command, i.e., 2000, is the number adopted by the phone first connected to the network. Phone #1, in step 712, next sends out a 'Directory Transmit Command', which includes a directory of numbers for all existing phones on the network, and the newly connected phone responds, in step 714, with the 'Directory Received' command. In step 716, the new phone receives the complete directory when phone #1 sends the 'End' command. Otherwise, phone #1 again sends a 'Directory Transmit Command', in step 712.

The newly connected phone now adopts the next available (unassigned) number in the directory, in step 718, and broadcasts a 'Phone Number Tryout' command again with the adopted number over the network, to determine whether there is a conflict with another phone. If there is no conflicting number, as determined in step 720, then the newly connected phone broadcasts, in step 722, a 'Phone Number Transmit' command that includes the adopted number, to the network. Following this, in step 726, each phone device on the network updates a look-up table (LUT) in that device with the new number. If the adopted number is a conflicting number, as determined in step 720, then there is a network error that needs to be investigated and the process terminates.

Figure 24:
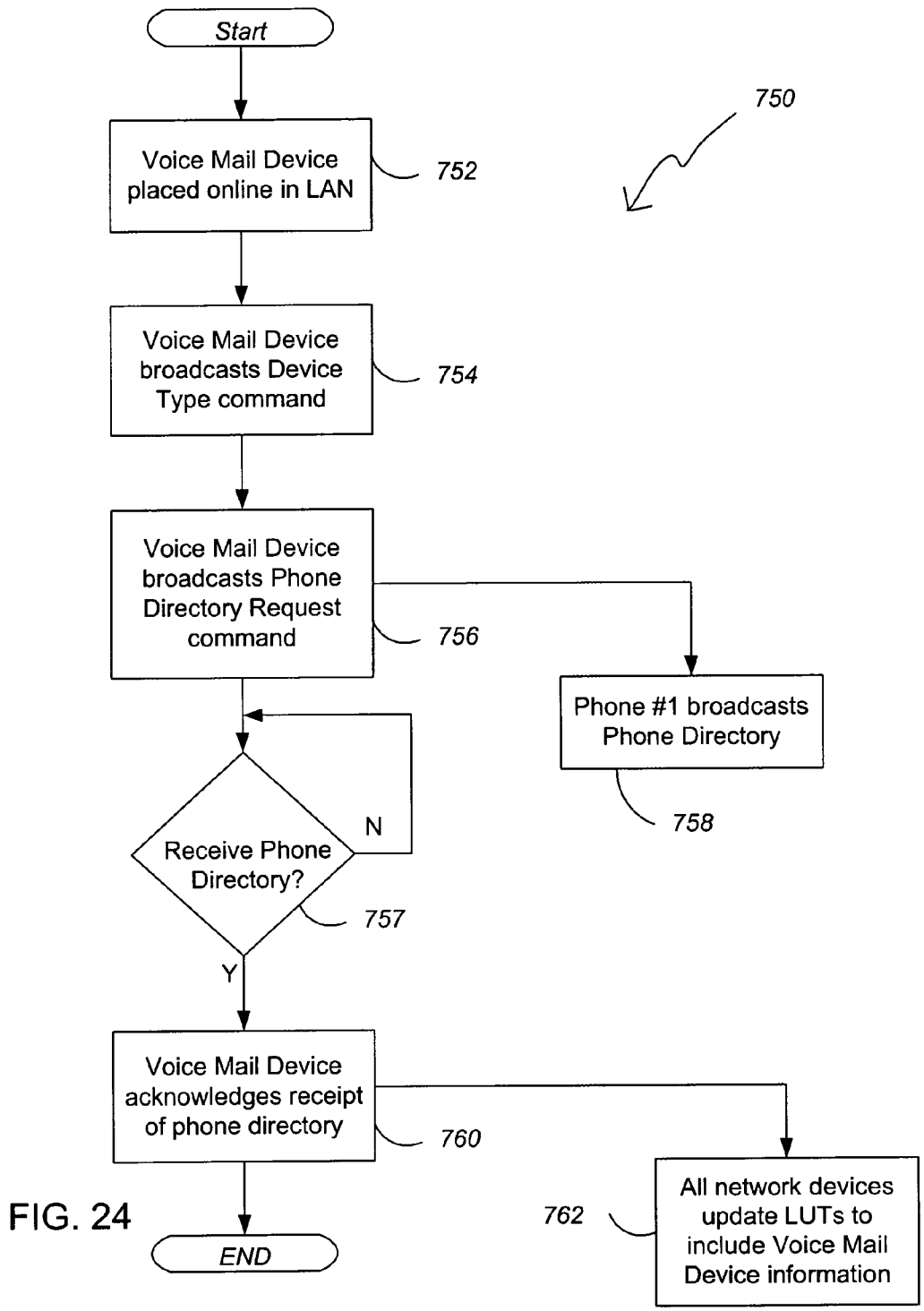
FIG. 24 shows a flow chart illustrating the process of configuring a Voice Mail Device added to the network, in accordance with an embodiment of the present invention.

FIG. 24 shows a flow chart 750 illustrating the process of configuring a Voice Mail Device added to the network, in accordance with an embodiment of the present invention. This process is similar to that described above for adding new phones. In this process, phone #1 must be previously installed and operational. Starting in step 752, a Voice Mail device is placed online in the network. In step 754, the Voice Mail Device broadcasts the 'Device Type' command and the 'Phone Directory Request' command, in step 756 and waits in steps 757 and 759 for a response. In response, in step 758, phone #1 broadcasts the phone directory of numbers. The Voice Mail Device acknowledges receipt of the phone directory, in step 760, and all network devices update their LUTs to include the Voice Mail Device information, in step 762.

Figure 25:
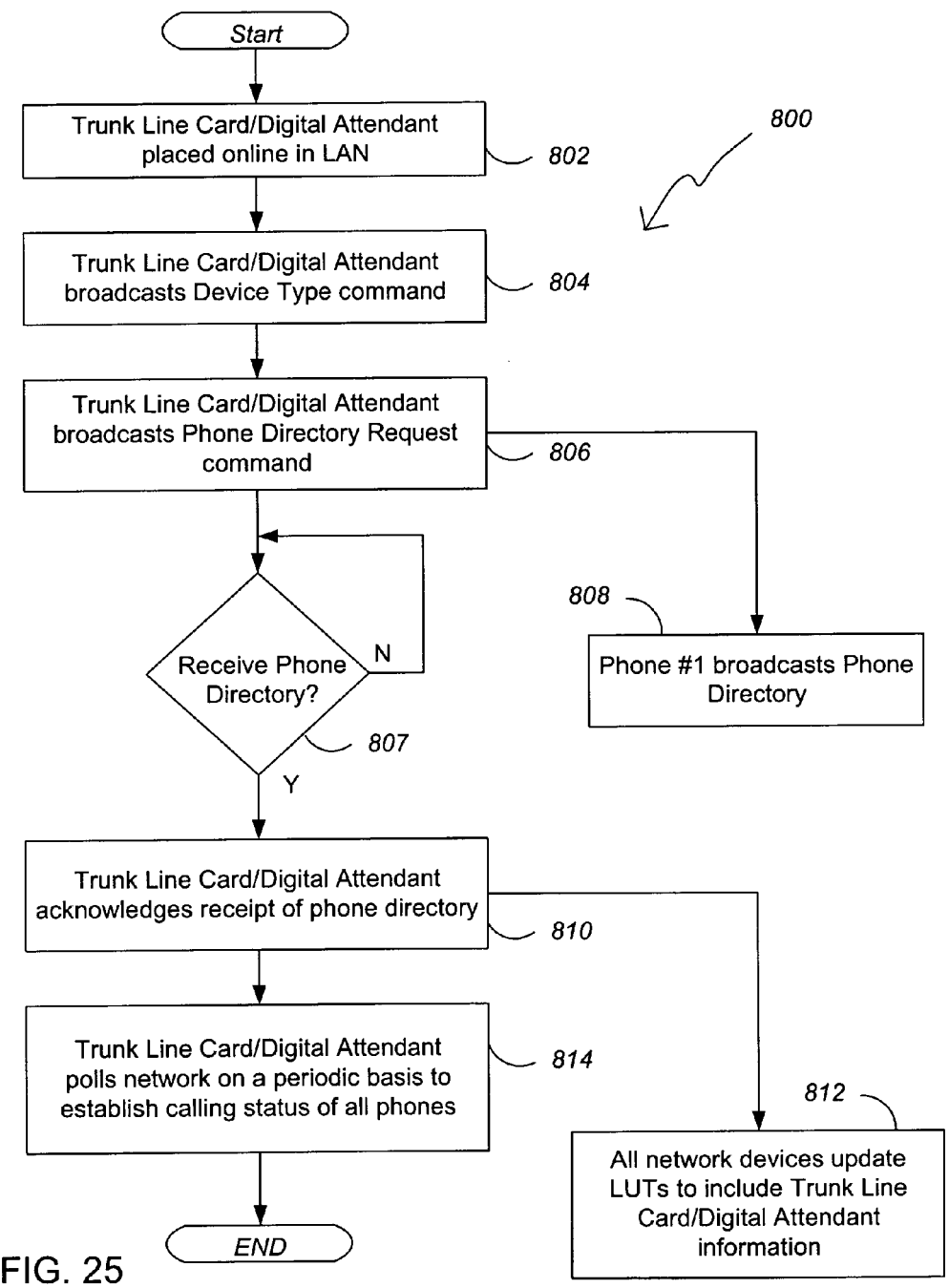
FIG. 25 shows a flow chart illustrating the process of configuring a Trunk Line Card/Digital Attendant that is added to the network, in accordance with an embodiment of the present invention.

FIG. 25 shows a flow chart 800 illustrating the process of configuring a Trunk Line Card/Digital Attendant that is added to the network, in accordance with an embodiment of the present invention. Phone #1 must be installed and operational. In step 802, the Trunk Line Card/Digital Attendant is placed online in the network and in step 804, the Attendant broadcasts a 'Device Type' command, in step 804, followed by a 'Phone Directory Request' command, in step 806. In step 808, phone #1 broadcasts the directory of phone numbers, in response to the 'Phone Directory Request' command. The Trunk Line Card/Digital Attendant acknowledges receipt of the phone directory, in step 810, and all network devices update their LUTs to include the Trunk Line Card/Digital Attendant information, in step 812. The Trunk Line Card/Digital Attendant polls the network on a periodic basis to establish the calling status of all phones, in step 814.

Figure 26:
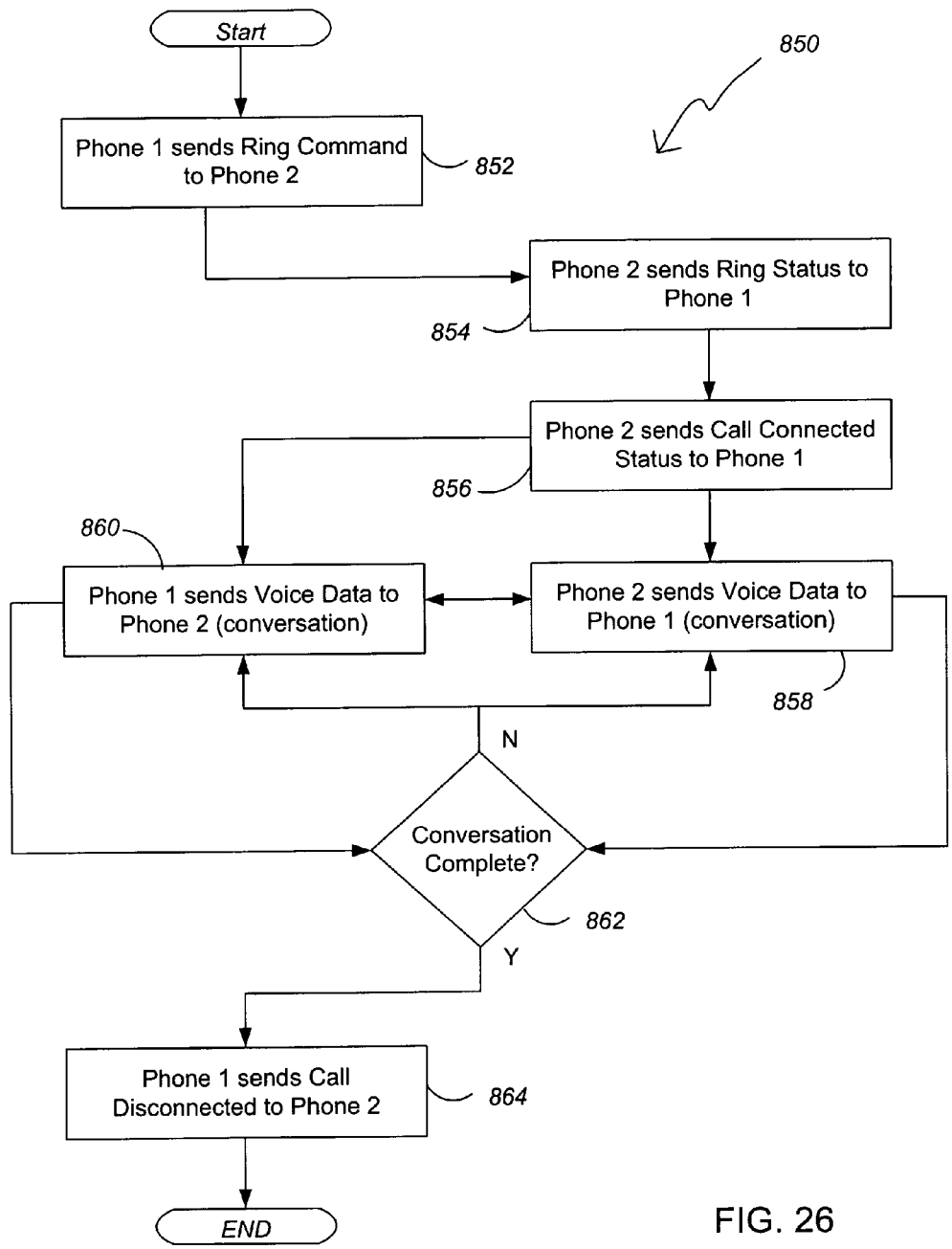
FIG. 26 shows a flow chart illustrating the process occurring during a phone call between two network phones, in accordance with an embodiment of the present invention.

FIG. 26 shows a flow chart 850 illustrating the process occurring during a phone call between two network phones, in accordance with an embodiment of the present invention. The call is initiated, in step 852, when phone 1 sends a 'Ring Command' to phone 2. In response, phone 2 sends a 'Ring Status' message to phone 1, in step 854. After the call is answered, phone 2 sends a 'Call Connected Status' message to phone 1, in step 856, following which, phones 1 and 2 exchange voice data (the conversation), in step 858 and step 860. Steps 858 and 860 repeat while the conversation continues. When the conversation is completed, as determined in step 862, phone 1 sends a 'Call Disconnect' command to phone 2, in step 864. It is also possible to have phone 2 terminate the conversation by sending a 'Call Disconnect' command to phone 2 in like fashion.

Figure 27:
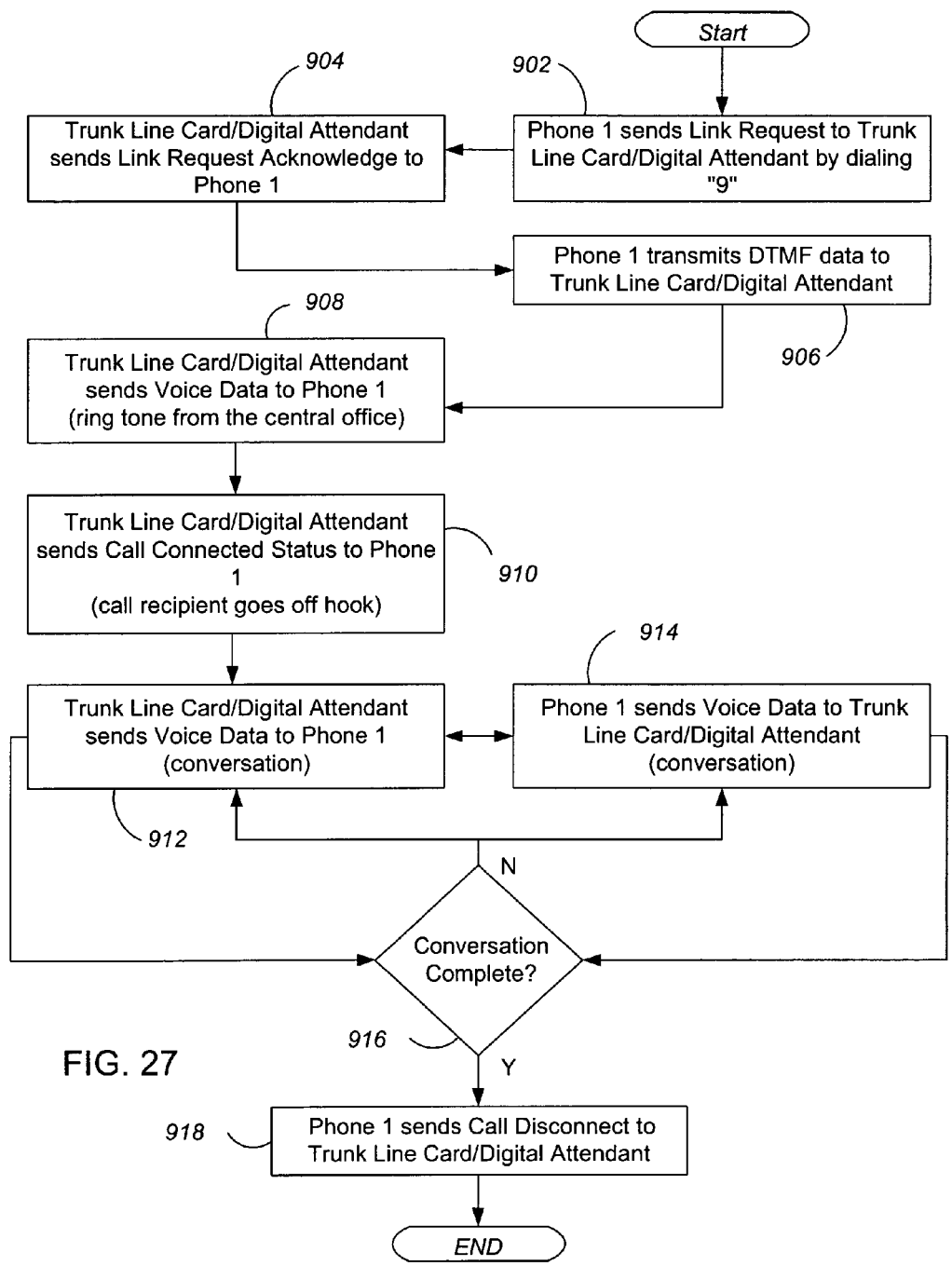
FIG. 27 shows flow chart illustrating the process of completing an outside a phone call from a network phone, in accordance with an embodiment of the present invention.

FIG. 27 shows flow chart 900 illustrating the process of completing an outside phone call from a network phone, in accordance with an embodiment of the present invention. In this process, the user (phone 1) makes an outside call from a network phone. The process begins at step 902 with phone 1 sending a 'Link Request' (code IB in Table 4) by dialing "9" or some other character programmed to provide outside line access. The Trunk Line Card acknowledges the request by sending a 'Link Request Acknowledge' to phone 1, in step 904. Phone 1 next transmits to the Trunk Line Card/Digital Attendant, in step 906, a DTMF (Dual Tone Multi-Frequency) message, which is used by the Trunk Line card/Digital Attendant to connect to the outside phone number in the PSTN (see FIG. 11, item 208). The Trunk Line Card/Digital Attendant sends to phone 1 a ring tone that originated from the central office, in step 908. When the call is completed by the recipient going 'off-hook', the Trunk Line Card sends a 'Call Connected' status to phone 1, in step 910. The phone conversation between phone 1 and the outside caller, via the Trunk Line Card, occurs in steps 912 and 914. When the conversation is complete, as determined in step 916, phone 1 sends a 'Call Disconnect' message, in step 918, to the Trunk Line Card/Digital Assistant (the outside caller), or visa-versa, if the outside caller terminated the call.

Figure 28A:
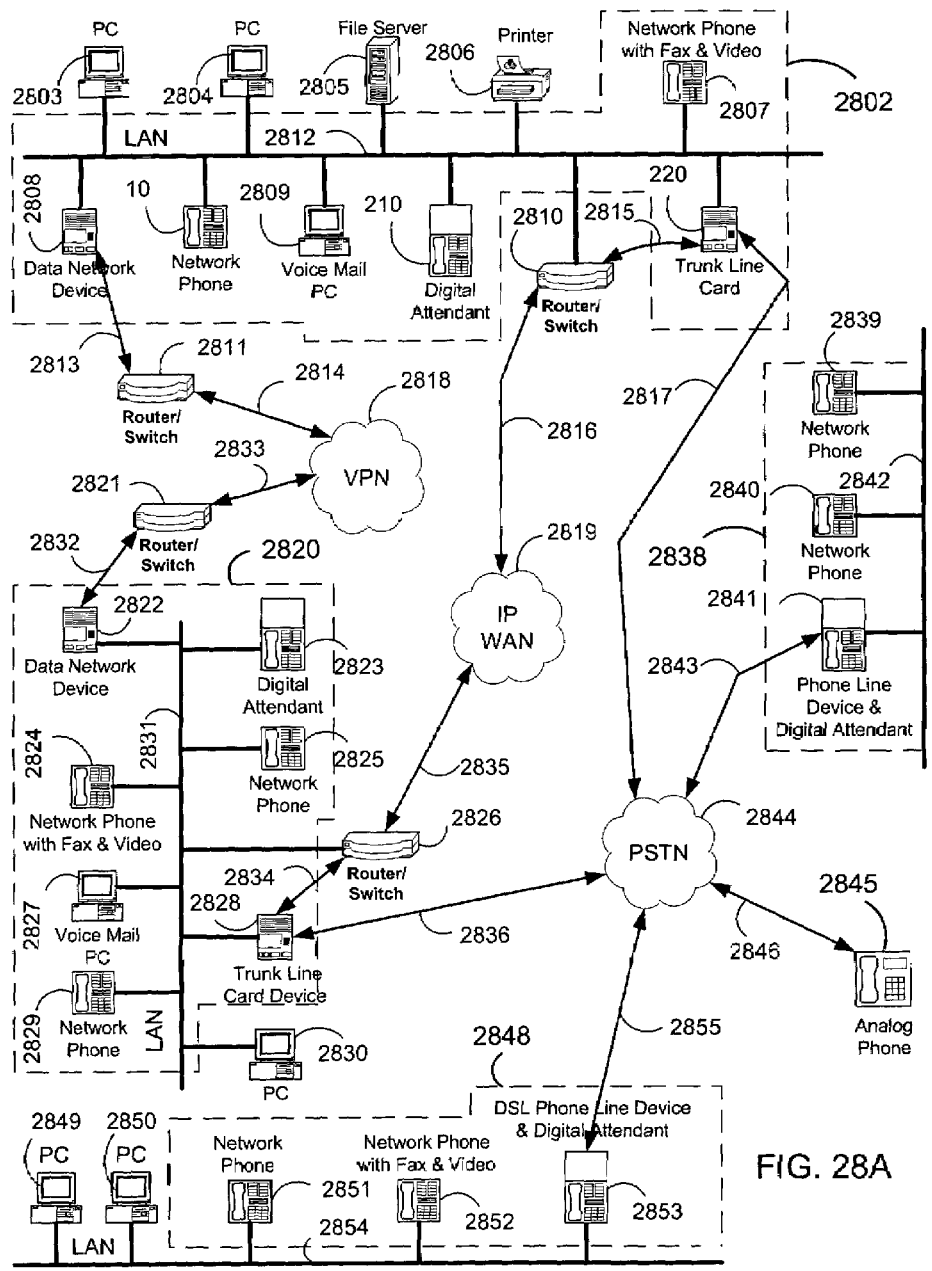
FIGS. 28A and 28B are system block diagrams of exemplary network telephone systems which include multiple network phone devices in accordance with an embodiment of the present invention.

FIG. 28A is a system block diagram of exemplary network telephone systems 2802, 2820, 2838 and 2848, which include network phone devices (also referred to as network telephones, netphones, phone devices or simply phones or devices), communicating with one another, in accordance with the present invention.

Network phone system 2802 illustrates various network phone devices such as: Network phone with fax and video accessories 2807, data network device 2808, network phone 10, voice mail PC 2809, digital attendant 210 and trunk line card 220 coupling to LAN connection 2812, and coexisting with other network related devices such as PCs 2803, 2804, file server 2805, network printer 2806 and routers/switches 2810 & 2811. Communication between devices within network 2802 is through LAN connection 2812 (for simplicity, network hubs & switches are not shown). LAN connection 2812 is wired, wireless or can be combination of both wired and wireless. System 2802 also shows that it has connections to the outside world with links to the Public Switched Telephone Network (PSTN) 2844, Virtual Private Network (VPN) 2818, and IP 2819 networks. VPN network 2818 can be a dedicated leased line, frame relay/ATM links, private IP, or POTS (Plain Old Telephone System) services, such as ISDN (Integrated Digital Service Network) and xDSL (Digital Subscriber Line), where its users can make long distance calls at lower cost via the data network device 2808. The data network device 2808, in turn connects to router/switch 2811. For external calls, system 2802 users can also use the trunk line card device 220, via connection link 2817, to connect to the PSTN 2844 network. The trunk line card device 220 can also optionally route phone calls over IP to the router/switch 2810, through the LAN connection 2812, or through a separate connection 2815 to connect to the world-wide-web IP network 2819. Router/switch 2810, which couples to LAN 2812 also routes data from PCs 2803 and 2804 to the IP network 2819 and vice versa.

Similarly, network phone system 2820 has within it similar network phone devices such as: data network device 2822, digital attendant 2823, network phone with fax and video 2824, network phones 2825, 2829, voice mail device 2827 and trunk line card device 2828. Communication between devices within network 2820 is through LAN connection 2831, which can be wired, wireless, or a combination of both wired and wireless. The trunk line card device 2828 allows network phone devices in network 2820 to make calls to the PSTN 2844 or routes IP calls through the router/switch 2826. Router/switch 2826, which couples to LAN 2831 also routes data from PCs 2830 to the IP network 2819 and vice versa. Data network device 2822 allows network phone devices in network 2820 to make calls through VPN 2818 via router/switch 2821.

Systems 2838 and 2848 have analog connections, 2843 and 2855 respectively. The connection can be a dial up Modem (FIG. 33), xDSL (FIG. 34), coax cable (FIG. 35), or ISDN (FIG. 36).

Phone line device & digital attendant 2841 provides the PSTN 2844 connection to network phones 2839 and 2840. DSL phone line device & digital attendant 2853 provides the PSTN 2844 connection to network phones 2851 and 2852. It also provides the DSL data connection to PCs 2849 and 2850.

POTS (plain old telephone system) phone 2845 is also coupled to the PSTN 2844 and hence capable of communicating with the network phone devices of Network Phone Systems 2802, 2820, 2838, and 2848.

Figure 28B:
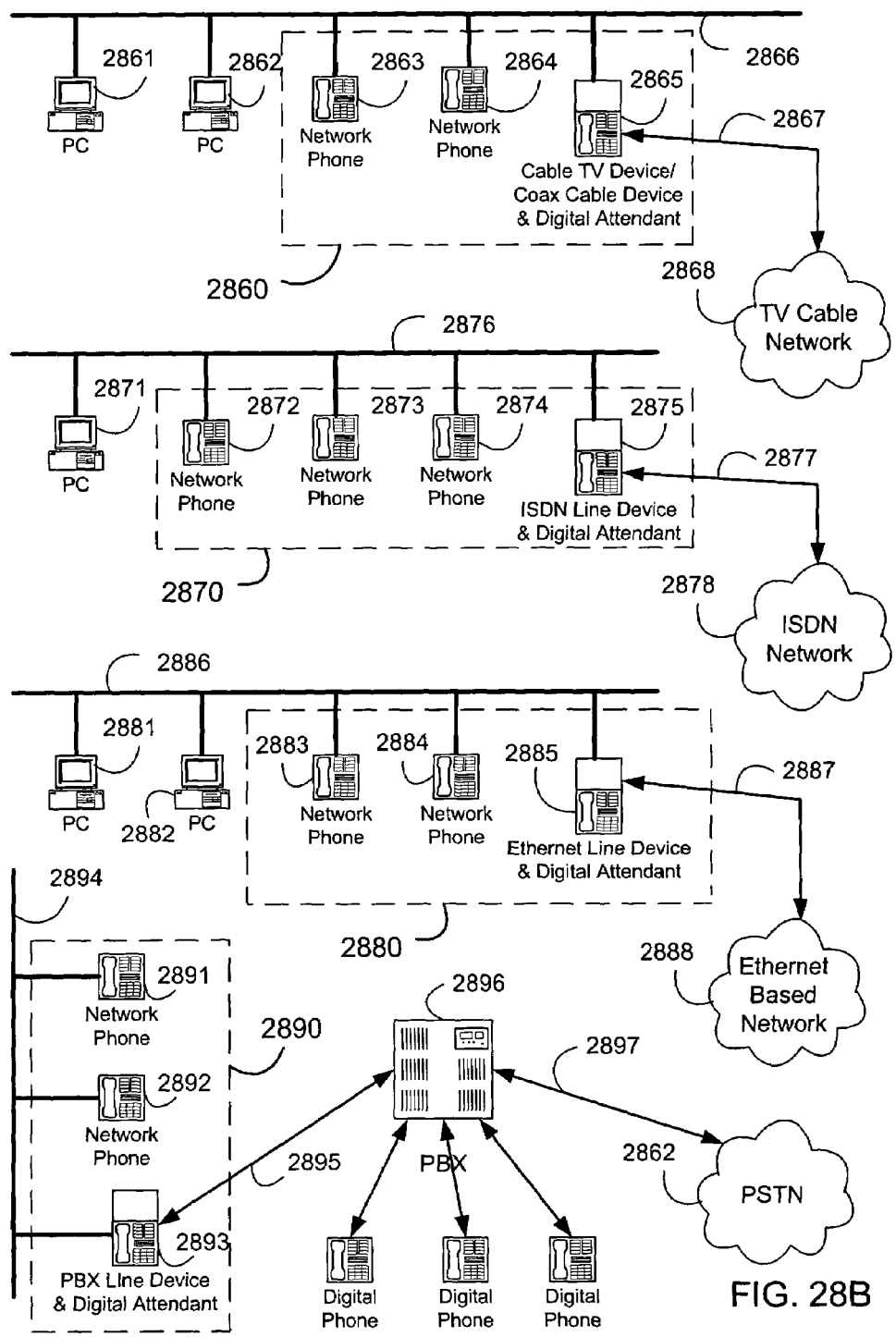

FIG. 28B is a system block diagram of exemplary network telephone systems 2860, 2870, 2880, and 2890, which include network phone devices communicating with one another, and interfacing to various external line connections, in accordance with an embodiment of the present invention.

Network telephone system 2860 is externally connected to TV Cable Network 2868 through coax cable connection 2867. System 2860 also includes multiple network phones 2863 and 2864. Cable TV device/coax cable device & digital attendant 2865 allows external voice communication between network phones 2863 and 2864 to the TV cable network 2868 via connection 2867, and also facilitates the data communication between PCs 2861 & 2862 with the TV cable network. Internal communication between various network phones and PCs are via LAN connection 2866, which can be wired or wireless or combination of both wired and wireless.

In network telephone system 2870, the external connection to the premise is through ISDN connection 2877, and includes network phones 2872, 2873 and 2874. ISDN line device & digital attendant 2875 allows external voice communication between network phones 2872, 2873, and 2874 to the ISDN network 2878 via connection 2877, and also facilitates the data communication between PC 2871 with the ISDN network. Internal communication between various network phones and PCs are via LAN connection 2876, which can be wired, wireless, or combination of both wired and wireless.

In network telephone system 2880, the external connection to the premise is through Ethernet connection 2887, and includes network phones 2883 and 2884. Ethernet line device & digital attendant 2885 allows external voice communication between network phones 2883 and 2884 to the Ethernet network 2888 via connection 2887, and also facilitates the data communication between PCs 2881 and 2882 with the Ethernet network 2888. Internal communication between various network phones and PCs are via LAN connection 2886, which can be wired, wireless, or combination of both wired and wireless.

Network telephone system 2890 is connected to PBX 2896 and acts as telephone subgroup of 2896, and includes network phones 2891 and 2892. PBX line device & digital attendant 2893 allows voice communication between network phones 2891 and 2892 to the PBX 2896 via connection 2895. Internal communication between various network phones and optional PCs are via LAN connection 2894, which can be wired, wireless, or combination of both wired and wireless.

The exemplary network phone systems of FIGS. 28A and 28B illustrate operations in the various communication infrastructure environments (VPN, TCP/IP, PSTN, xDSL, Cable, ISDN, Ethernet line, PBX) with the appropriate interface devices 2808, 220, 2822, 2828, 2841, 2853, 2865, 2875, 2885 and 2893.

Figure 29:
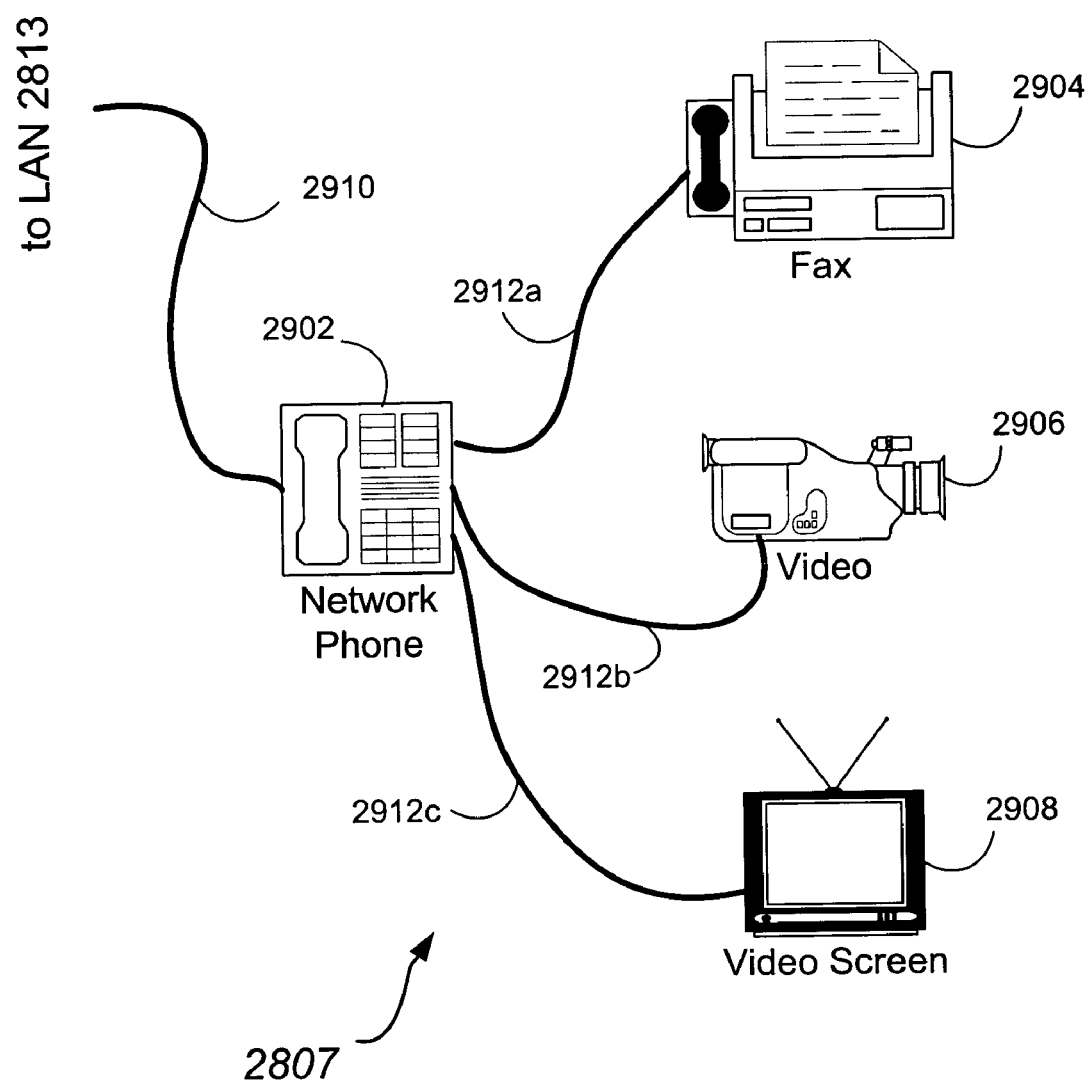
FIG. 29 shows a network phone with its fax and video accessory devices in accordance with an embodiment of the present invention.

FIG. 29 shows a network phone system 2807 which includes fax and video accessory devices, in accordance with an embodiment of the present invention. Network phone device 2902 is shown coupled to fax 2904, video input 2906 (camera) and video output 2908 (video screen). In this example, connections 2912a, 2912b and 2912c are USB. Connection 2910 is Ethernet and can be wired or wireless. This configuration allows video teleconference to take place, where audio (voice) and video (image) use one single connection 2910 for communication.

Figure 30:
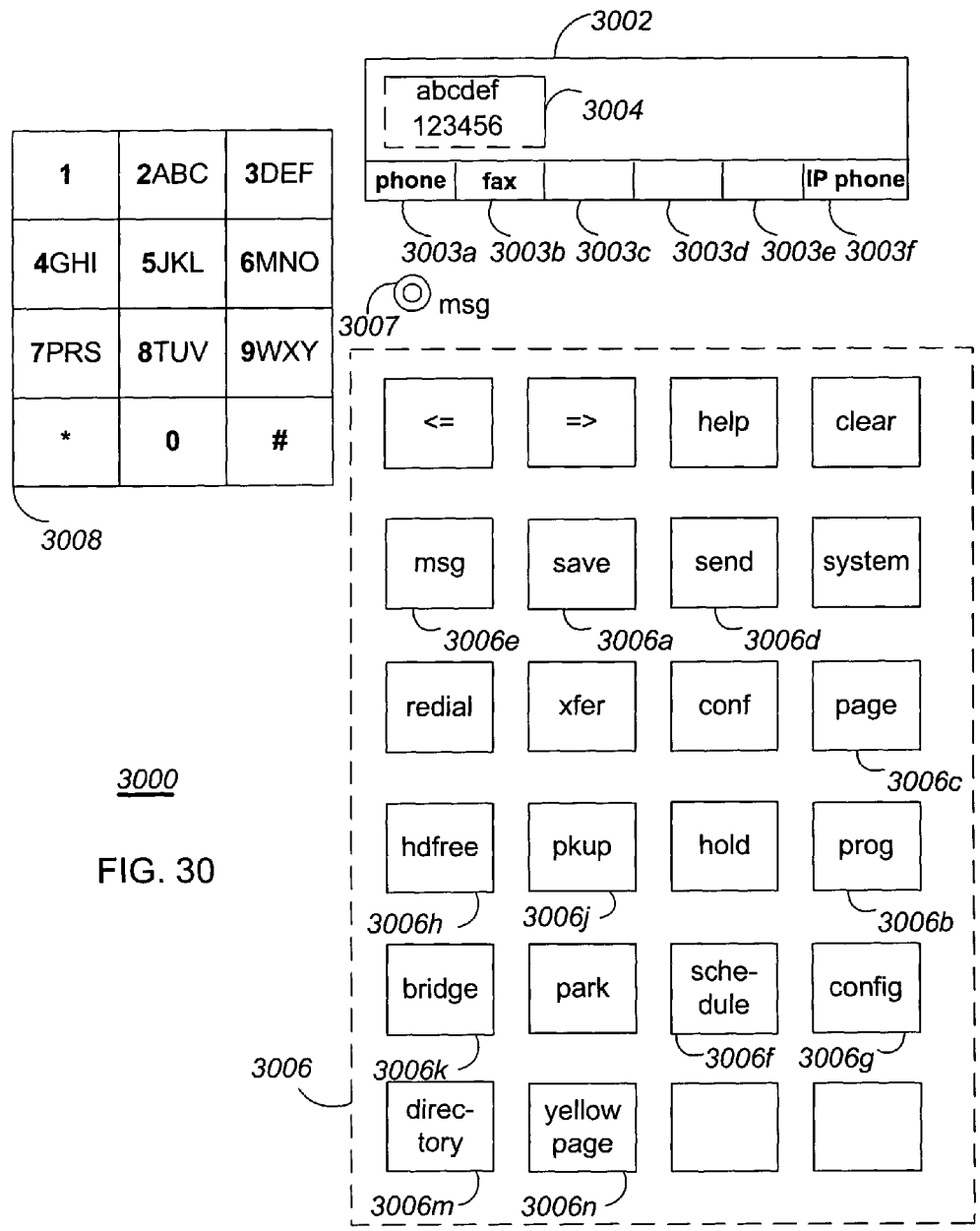
FIG. 30 shows an exemplary layout of the keypad and display of a network telephone device in accordance with an embodiment of the present invention.

FIG. 30 shows an exemplary layout 3000 of the keypad and display 3002 of a network phone device, in accordance with an embodiment of the present invention (old version FIG. 4A). The keypad includes keys 3006, and 3008. Keys 3006 are programmable function keys. Keys 3003a–3003f are touch-screen LCD displays, which change or lead to more functions, and indicate different menu screen on display 3002 when pushed. Table 6 shows another version of Table 1 with additional keys schedule, config, directory, and yellow-pages added.

The directory key 3006m can be used to retrieve a phone number stored locally, i.e., within the network, while the yellow-page key 3006n can be used to retrieve a phone number from online phone directory(s) via an external Internet connection as shown in FIGS. 33–37. Users can use keypads 3006 and 3008, or an optional attached keyboard to search by name, business type and/or location, and the resulting information viewed via display 3002. An optional larger display screen provides full page display together with arrow keys and scroll control.

Figure 31A:
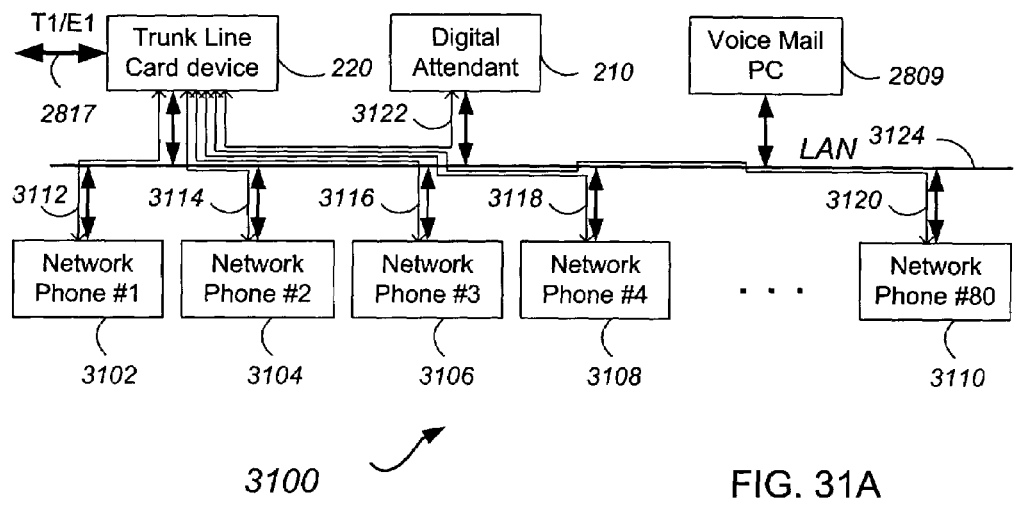
FIG. 31A shows a network phone system with trunk line card and digital attendant as two separate devices in accordance with an embodiment of the present invention.

FIG. 31A shows an exemplary network phone system 3100 wherein trunk line card device and digital attendant are two separate devices, in accordance with an embodiment of the present invention. Trunk line card device 220 is connected to the outside world through T1/E1 connection 2817. Digital attendant 210 can either be automatic where an audio voice guides incoming callers though a maze of calling menu or be answered by a human operator when a call comes in. Both trunk line card device 220 and digital attendant 210 can be stand alone devices or incorporated into other equipments. Assume that system 3100 in FIG. 31A has 80 phone sets and has been allocated 81 telephone numbers by the phone company. The phone numbers are 555-2000 to 555-2080 of which main number 555-2000 is assigned to the digital attendant 210. The next number 555-2001 corresponds to phone #1 3102; next number 555-2002 to phone #2 3104; next number 555-2003 to phone #3 3106; next number 555-2004 to phone #4 3108, so forth and finally number 555-2080 to phone #80 3110. When an outside caller dials number 555-2001 to system 3100, the call is initiated and connected by the trunk line card 220, via path 3112 to phone #1. When the caller dials 555-2002, then he/she is connected by the trunk line card 220 to phone #2 through path 3114. When the caller dials 555-2003, he/she is connected by the trunk line card 220 to phone #3 through path 3116. When the caller dials 555-2004, he/she is connected by the trunk line card 220 to phone #4 through path 3118. When the caller dials 555-2080, he/she is connected by the trunk line card 220 to phone #80 through path 3120.

TABLE 6

| Numeric Key Description (ref 3008) | Control Key Value, Hex | Function Key Description 66 | Control Key Value, Hex | Variable Key Description (ref 3003a-f) | Control Key Value, Hex |
|---|---|---|---|---|---|
| 1 | 01 | > | 10 | A | 30 |
| 2 | 02 | < | 11 | B | 31 |
| 3 | 03 | help | 12 | C | 32 |
| 4 | 04 | clear | 13 | D | 33 |
| 5 | 05 | msg (ref 3006e) | 14 | E | 34 |
| 6 | 06 | save (ref 3006a) | 15 | F | 35 |
| 7 | 07 | send (ref 3006d) | 16 | | |
| 8 | 08 | brdcast | 17 | | |
| 9 | 09 | redial | 18 | | |
| 0 | 0A | xfer | 19 | | |
| * | 0B | conf | 1A | | |
| # | 0C | page (ref 3006c) | 1B | | |
| spare | 00 | hdfree (ref 3006h) | 1C | | |
| | | pkup (ref 3006j) | 1D | | |
| | | Hold | 1E | | |
| | | Prog (ref 3006b) | 1F | | |
| | | Bridge (ref 3006k) | 20 | | |
| | | Park | 21 | | |
| | | Schedule (ref 3006f) | 22 | | |
| | | Config (ref 3006g) | 23 | | |
| | | Directory (ref 3006m) | 24 | | |
| | | Yellow Pages (ref 3006n) | 25 | | |

When the caller dials the main number, 555-2000, the trunk line card device 220 connects the caller to the digital attendant 210 through path 3122. When the caller reaches the digital attendant 210, he/she will be asked (by an automatic attendant) to dial an extension or by a human operator for an extension to reach the right phone; i.e. phone extension "2001" for phone #1, extension "2002" for phone #2 and so forth, and the call is then transferred to the appropriate phone, after the digital attendant 210 receives the last digit of the extension number. Internal communication between digital attendant 210 and phones #1 to #80 takes place via LAN connection 3124, which can be wired, wireless, or combination of both wired and wireless.

Referring to FIGS. 31A and 22A, internal communication does not require the intervention of either the trunk line card device 220, or the digital attendant 210. For internal communication, each phone device contains a lookup table (LUT) which includes phone numbers, names & MAC addresses, device type, access code, and where phone numbers of each device are translated into MAC by the source phone when its user dials the phone number (or name) of the destination phone. The translated MAC address is put into the destination MAC address field 606 along with control or voice data into packet data field 620 and the whole Ethernet packet field 600 is sent to the destination phone.

For external PSTN 2844 outgoing calls, when caller dials the access code "9" (or any access code programmed by the trunk line card device), the phone translates it into the trunk line card device 220 (see FIG. 28A) MAC address, since all outgoing calls go through the trunk line card device. The trunk line card device 220, in turn decodes what is in the received packets into appropriate formats understood by the external telephone network (PSTN). For external PSTN incoming calls, the trunk line card device translates the phone numbers into MAC address of the correspondent phone using its LUT, converts ring voltage levels into ring command packets, audio voltage into audio data packets, and sends them to the intended destination phone.

Referring also to FIG. 28A, for external VPN 2818 outgoing calls, when caller dials a different access code, such as "8" (or any programmed access code to distinguish it from "9"), the phone translates it into the data network device 2808 MAC address since all VPN outgoing calls go through the data network device. The data network device 2808, in turn decodes what is in the received packets into appropriate formats understood by the VPN network. For external VPN incoming calls, the data network device translates the phone numbers into MAC address of the correspondent phone using its LUT, converts ring voltage levels (or ring command from ATM, TCP/IP or any interface format) into ring command packets, audio voltage (or audio data from ATM, TCP/IP, or any interface format) into audio data packets and sends them to the intended destination phone.

Table 7 presents the content of the LUT (look up table) of a network phone. When the user of phone #1 (2nd entry) dials extension "2003" to ring phone #3 (4th entry), phone #1 uses the LUT in its memory to translate or look up extension "2003" (phone #3's extension) into 00-0A-E6-41-C0-49 (phone #3's MAC addresses), as shown in Table 7. It then assembles the ring command packet into data field 620 (see also FIG. 22A), puts phone #3's MAC addresses (00-0A-E6-41-C0-49) into the destination MAC address field 606 and the whole Ethernet packet field 600 is sent out to destination phone #3. Table 7 also shows access codes "9" and "8" are required for internal phones to dial out to trunk line card device and data network device respectively.

Table 8 presents the content of the LUT (look up table) of a trunk line card device 220 or data network device 2808. It looks similar to the one of the network phone except one additional feature: external phone number. The external phone numbers are phone number allocated by the phone company to its customers. For instance, a ten-number allocation, starting at phone number 800-555-2000 is from 800-555-2000 to 800-555-2009. A fifty-number allocation is from 800-555-2000 to 800-555-2049. A one thousand-number is 800-555-2xxx (xxx is 000-999). Each external phone number is mapped directly to each phone, and thus routed by the trunk line card device 220 when there is an external incoming call from the outside into the network. The internal phone number (extension) is preferably the subset of the external number (the extensions match the least significant digits of the external phone numbers), so the trunk line card device does not need to keep two separate sets of number in its LUT. For instance; if the external phone number 555-1000 is assigned to a network phone system, and 100 phone numbers are allocated (555-1000 to 555-1099), then a four-digit internal phone numbers (extensions) are: "1000" to "1099". The five-digit internal phone numbers (extensions) are: "5-1000" to "5-1099". Another example; external phone numbers are: 555-6100 to 555-6199, then the three-digit extensions should be: 100 to 199, the four-digit extensions: "6100" to "6199" and the five-digit extensions: "5-6100" to "5-6199".

TABLE 7

| MAC Addresses | Phone Number | Type |
| --- | --- | --- |
| 00-0A-E6-41-48-E1 | 2000 | Digital Attendant |
| 00-0A-E6-41-C8-D1 | 2001 | Phone (Phone #1) |
| 00-0A-E6-41-C0-B0 | 2002 | Phone (Phone #2) |
| 00-0A-E6-41-C0-49 | 2003 | Phone (Phone #3) |
| . | | |
| . | | |
| 00-0A-E6-41-C0-C0 | 2080 | Phone (Phone #80) |
| 00-0A-E6-54-CE-A2 | 9 | Trunk Line Card Device |
| 00-0A-E6-54-CE-A9 | 8 | Data Network Device |

TABLE 8

| MAC Addresses Internal/External | Phone Number | Type |
| --- | --- | --- |
| 00-0A-E6-41-48-E1 | 2000/555-2000 | Digital Attendant |
| 00-0A-E6-41-C8-D1 | 2001/555-2001 | Phone (Phone #1) |
| 00-0A-E6-41-C0-B0 | 2002/555-2002 | Phone (Phone #2) |
| 00-0A-E6-41-C0-49 | 2003/555-2003 | Phone (Phone #3) |
| . | | |
| . | | |
| 00-0A-E6-41-C0-C0 | 2080/555-2080 | Phone (Phone #80) |
| 00-0A-E6-54-CE-A2 | 9 | Trunk Line Card Device |
| 00-0A-E6-54-CE-A9 | 8 | Data Network Device |

Figure 31B:
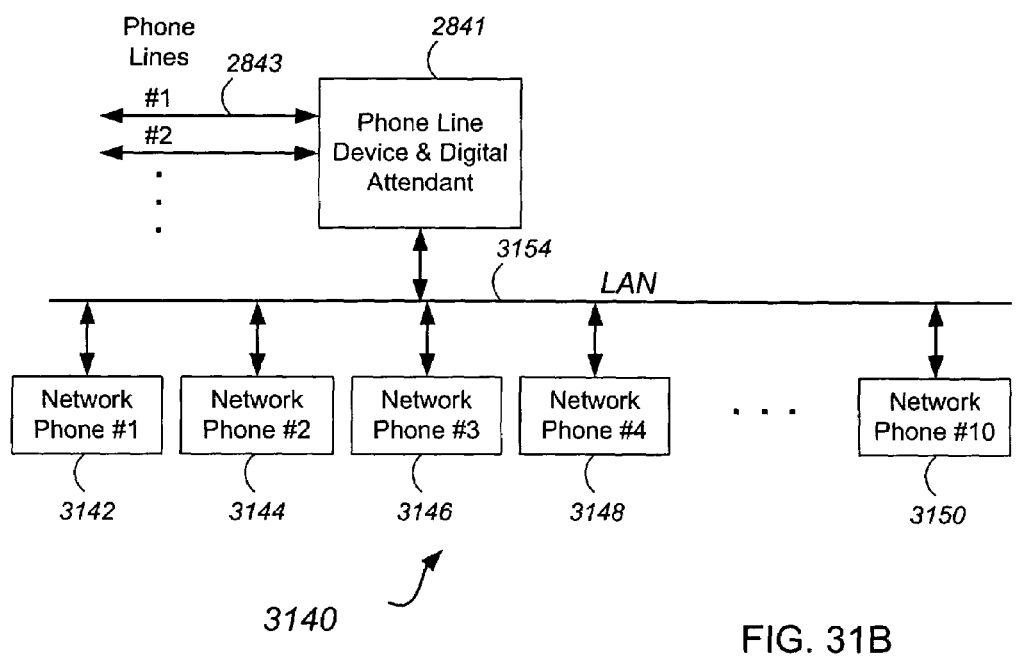
FIG. 31B shows a network phone system with phone line device and digital attendant as one single device in accordance with an embodiment of the present invention.

FIG. 31B shows a network phone system 3140 with phone line device and digital attendant 2841 as one single device, in accordance with an embodiment of the present invention. Network phone system 3140 can have one single external line 2843 or multiple lines. System 3140 is more compact and contains few phone sets and requires only one, or a few external lines. This type of system is for small business or home use. FIG. 33 to FIG. 38 are examples of external line device & digital attendant function as one single device. The external line device & digital attendant can be a stand alone device or incorporated into other equipments. Assume that system 3140 has 10 phone sets, only 2 lines, and two numbers (555-2000 and 555-2001), and therefore, at most, only two external conversations can take place at a time. Phone line device & digital attendant answered when either number 555-2000 or 555-2001 is dialed by the outside caller. The call is then directed by the digital attendant, when extension "1001" is dialed, to phone #1 3142; extension "1002" to phone #2 3144; extension "1003" to phone #3 3146; extension "1004" to phone #4 3148, and so forth or; extension "1010" to phone #10 3150.

In the case where eleven (555-2000 to 555-2010) numbers are allocated to system 3140, then each number can be mapped directly into each phone; number 555-2000 to phone line device & digital attendant 2841, number 555-2001 to phone #1 3142, number 555-2002 to phone #2 3144, number 555-2003 to phone #3 3146, number 555-2004 to phone #4 3148, and so forth, and finally number 555-2010 to phone #10 3150. The external caller, then can reach phone #1 by dialing 555-2001, phone #2 by dialing 555-2002, phone #3 by dialing 555-2003, phone #4 by dialing 555-2004, and so forth and finally, phone #10 by dialing 555-2010.

Figure 31C:
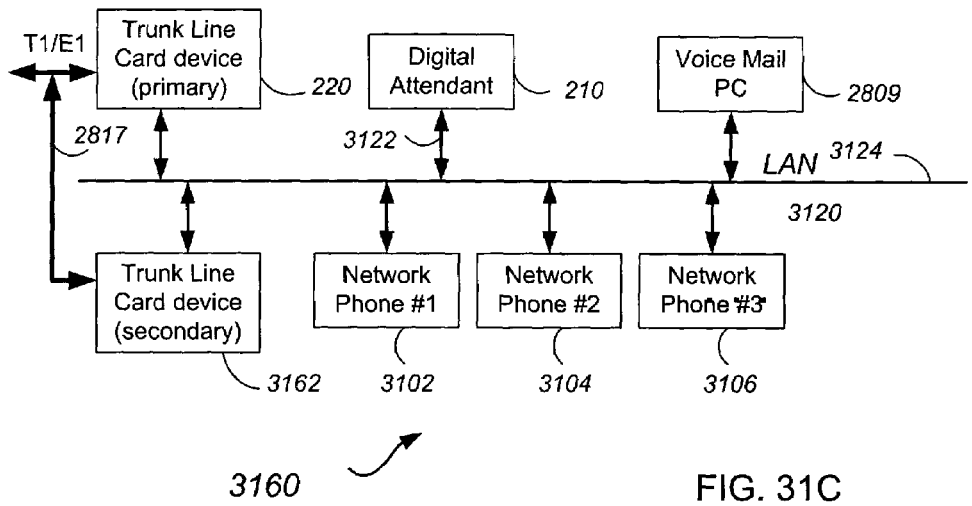
FIG. 31C shows a network phone system with redundant trunk line cards and a separate digital attendant in accordance with an embodiment of the present invention.

FIG. 31C shows a network phone system 3160 with a primary trunk line card device 220 and a secondary truck line card device 3162 coupled to a separate digital attendant 210 in accordance with the invention. Functional redundancy of the devices 220 and 3162 increases the reliability of the network phone system 3160. Fail-over can be programmed into system 3160.

Figure 31D:
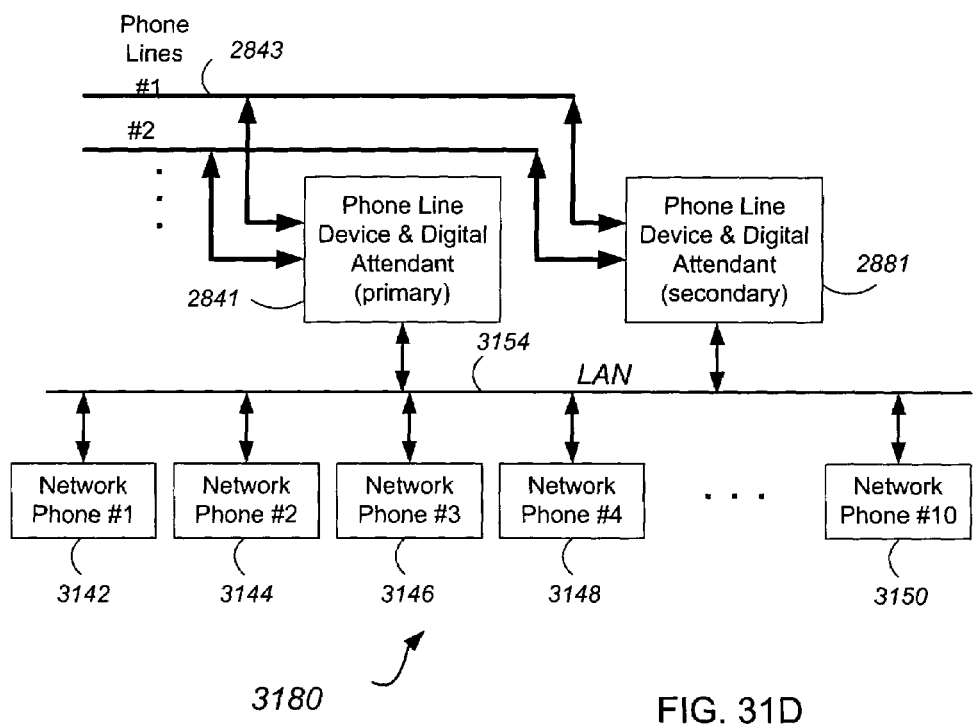
FIG. 31D shows a network phone system with redundant combined phone line device and digital attendant in accordance with an embodiment of the present invention.

FIG. 31D shows a network phone system 3180 with primary and secondary combined phone line device and digital attendant 2841, 2881 in accordance with the present invention. Redundant phone line devices and digital attendants 2841, 2881 increases the reliability of system 3180 by providing fail-over capability.

Figure 32:
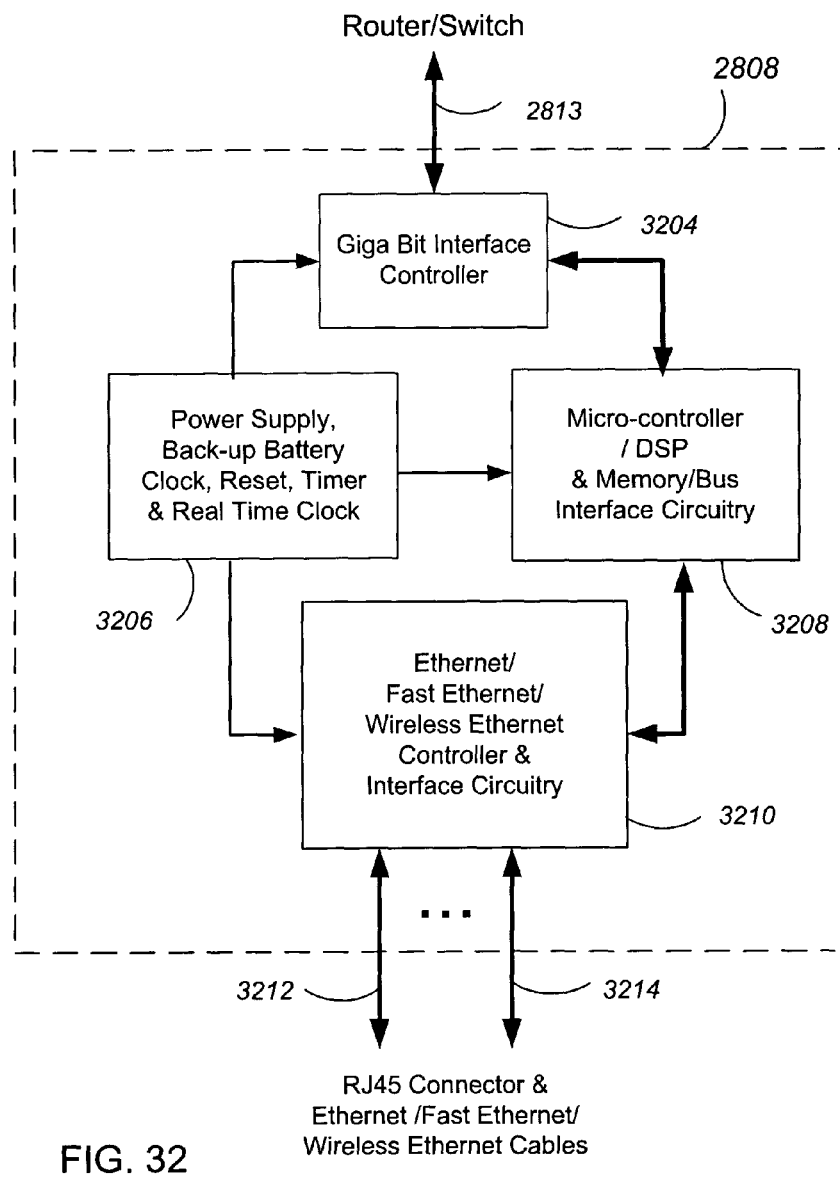
FIG. 32 shows a functional block diagram of a data network device in accordance with an embodiment of the present invention.

FIG. 32 shows a functional block diagram of a Data Network Device 2808, in accordance with an embodiment of the present invention. This embodiment provides for connection to VPN (Virtual Private Network) via connection 2813, but may be configured for other dedicated private leased line (such as: analog phone line(s), T3/E3, OC-1) or any high speed wired or fiber optic connection (not shown). The interface to connection 2813, which in this case is the Giga-bit optical connection, is module 3204, a GBIC (Giga-Bit Interface Controller). Commercial examples of controller 3204 include Finisar FTR-1519 Extended GBIC Transceiver Module. Module 2808 provides functions of translating Ethernet format packets into/out of; be it ATM, TCP/IP or whatever formats understandable by the data networks. Modules 3206, 3208, and 3210 have similar function as modules 226, 228, and 230 of FIG. 12A respectively. Ethernet controller 3210 provides one or more connections 3212 . . . 3214 for connecting netphones and/or PCs.

FIGS. 33 to 38 illustrate several embodiments of the invention which provide a telephony interface, a network interface and a local area network (LAN). The telephony interface provides connectivity between a netphone and an external telephone network such as a PSTN telephone system. The network interface provides connectivity between a computer (PC) and an external computer network such as the Internet. The local area network, such as an Ethernet-based wired and/or wireless LAN, provides inter-connectivity between the netphone, the computer, the telephony interface and the network interface.

Figure 33:
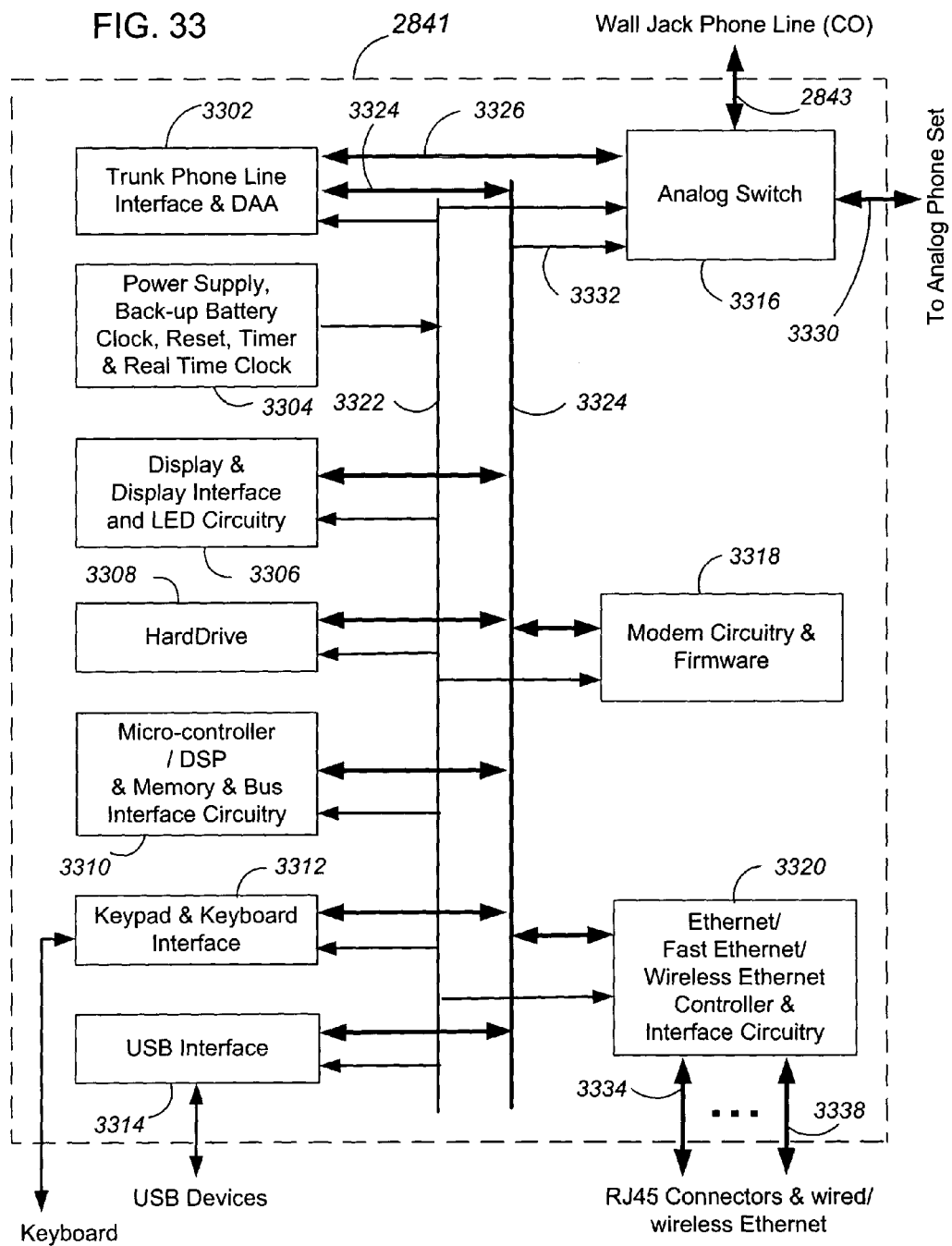
FIG. 33 shows a functional block diagram of a phone line device & digital attendant with dial-up Internet connection interfacing to central office phone line(s) in accordance with an embodiment of the present invention.

FIG. 33 shows a block diagram of a phone line device & digital attendant 2841 with the dial-up Internet connection, in accordance with an embodiment of the present invention. The circuitry is similar to the embodiment illustrated in FIG. 12B, but adds additional features as well. The phone line device & digital attendant 2841 contains additional features such as Modem circuitry and firmware 3318, in order to allow PC Internet connection through regular phone line 2843. Module 3318 is to condition (modulate & demodulate) Internet data (computer data) to/from PC connecting to RJ45 connection 3334. Module 2841 also can contain hard-drive 3308, which can function as a voice mail storage device along with multiple RJ45 connections 3334, supporting wired/wireless protocols, and therefore, offers a complete simple ready to use of voice and data network solution for home or small business. IP phone feature (see key 3003*f* of FIG. 30) optionally allows a user the choice of making either a regular phone call (through PSTN), or voice over IP call, of which the ISP (Internet Service Provider) has to provide the quality and delivery of the connection. When this is the case then, its Ethernet voice packet data is translated into the VoIP (voice over IP) format and conditioned by Modem circuitry 3318 or vice versa for incoming IP data. Analog switch 3316, which is controlled by the CPU through 3332, normally remains closed so data flow is between paths 2843 and 3326. In the absence of power due to power black-out and back-up battery not working, the connection between 2843 and 3330 facilitates the use of regular analog phone set for emergency purposes. Ethernet controller 3320 provides one or more connections 3334 . . . 3338 for connecting netphones and/or PCs.

Figure 34:
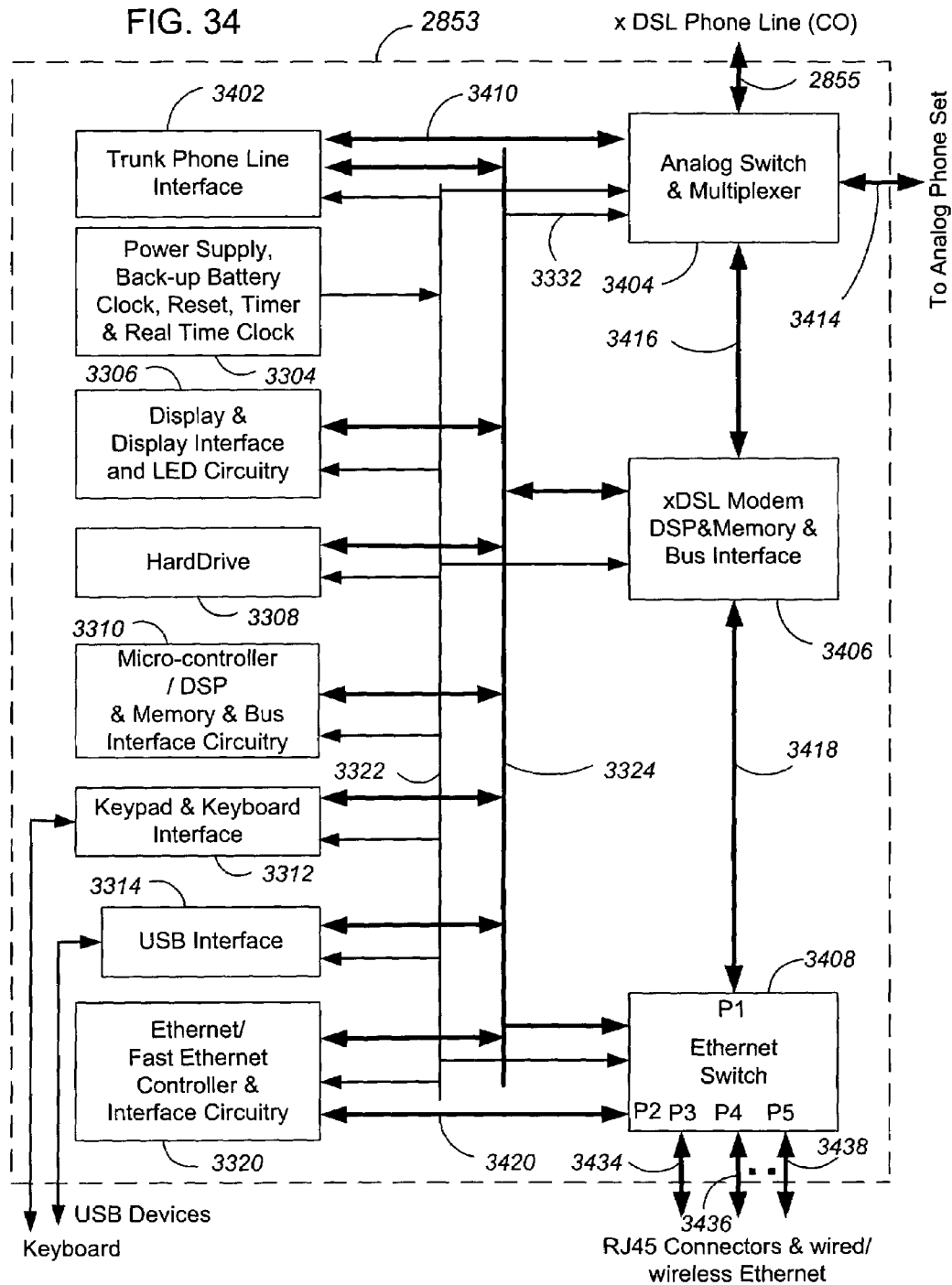
FIG. 34 shows a functional block diagram of an xDSL line device & digital attendant interfacing to xDSL line in accordance with an embodiment of the present invention.

FIG. 34 shows a block diagram of an xDSL Line Device & Digital Attendant 2853 interfacing to an xDSL line, in accordance with an embodiment of the present invention. The circuitry is similar to the embodiment illustrated in FIG. 33, but different in term of interfacing to xDSL line through the xDSL Modem module 3406, which has its own DSP, memory and bus interface. Switch 3408 allows Internet data between RJ45 connection 3434 through P1 (3418) of 3408 and xDSL module 3406. It also allows voice data between RJ45 connection 3434 through P2 (3420) of 3408 and Ethernet controller 3320. Three-way analog switch & multiplexer 3404, which is controlled by the CPU 3310 through 3332 bus, normally provides two paths: 3410 to/from 2855 (voice data) and 3416 to/from 2855 (PC data). Connection 2855 and 3414 provides the same emergency purpose in the use of a regular analog phone set, in case of power outage and back-up battery not functioning. Ethernet switch 3408 provides one or more connections 3434 . . . 3438 for connecting netphones and/or PCs.

Figure 35:
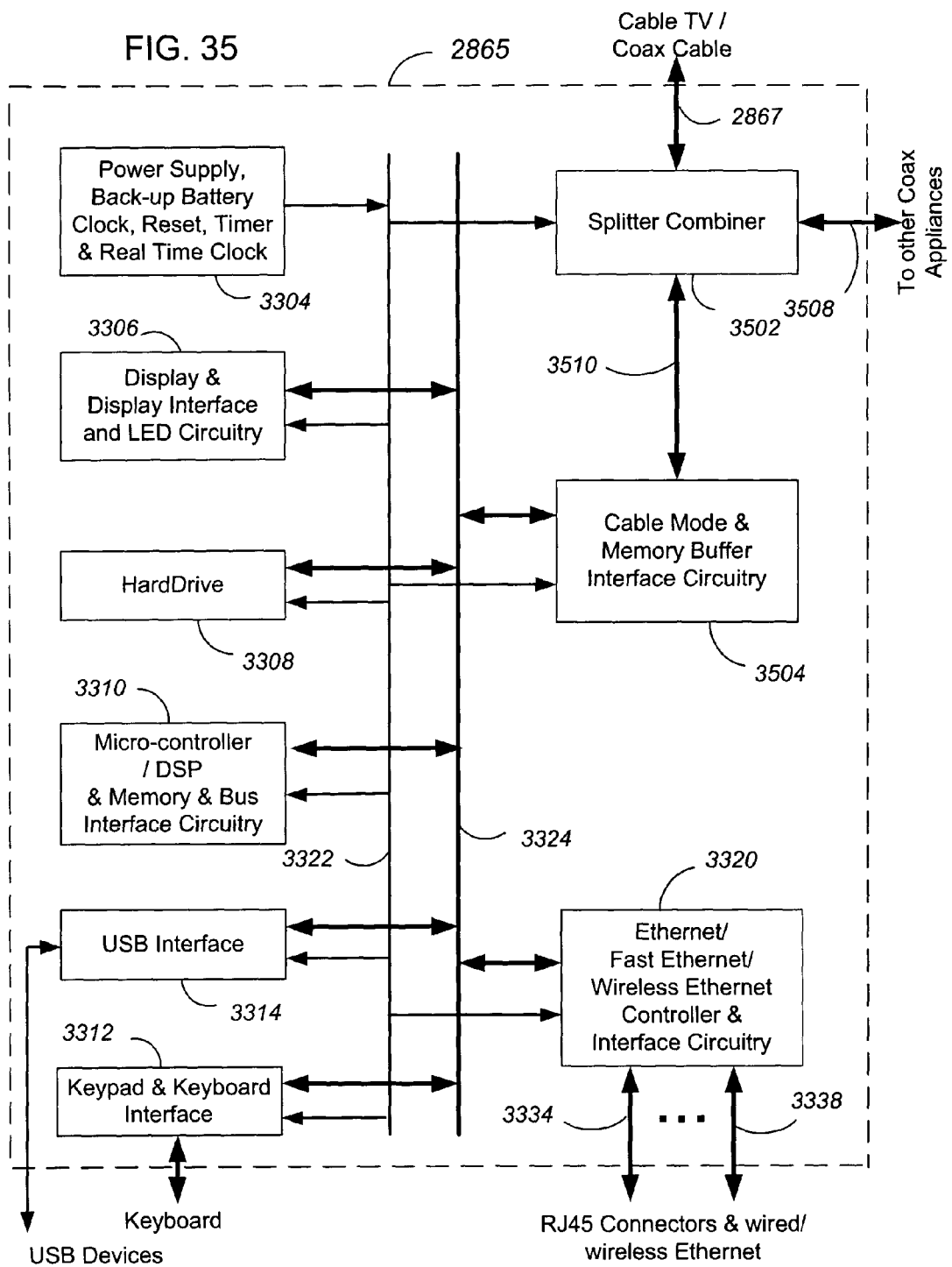
FIG. 35 shows a functional block diagram of a cable TV/coax cable device & digital attendant interfacing to cable TV/coax cable in accordance with an embodiment of the present invention.
Figure 36:
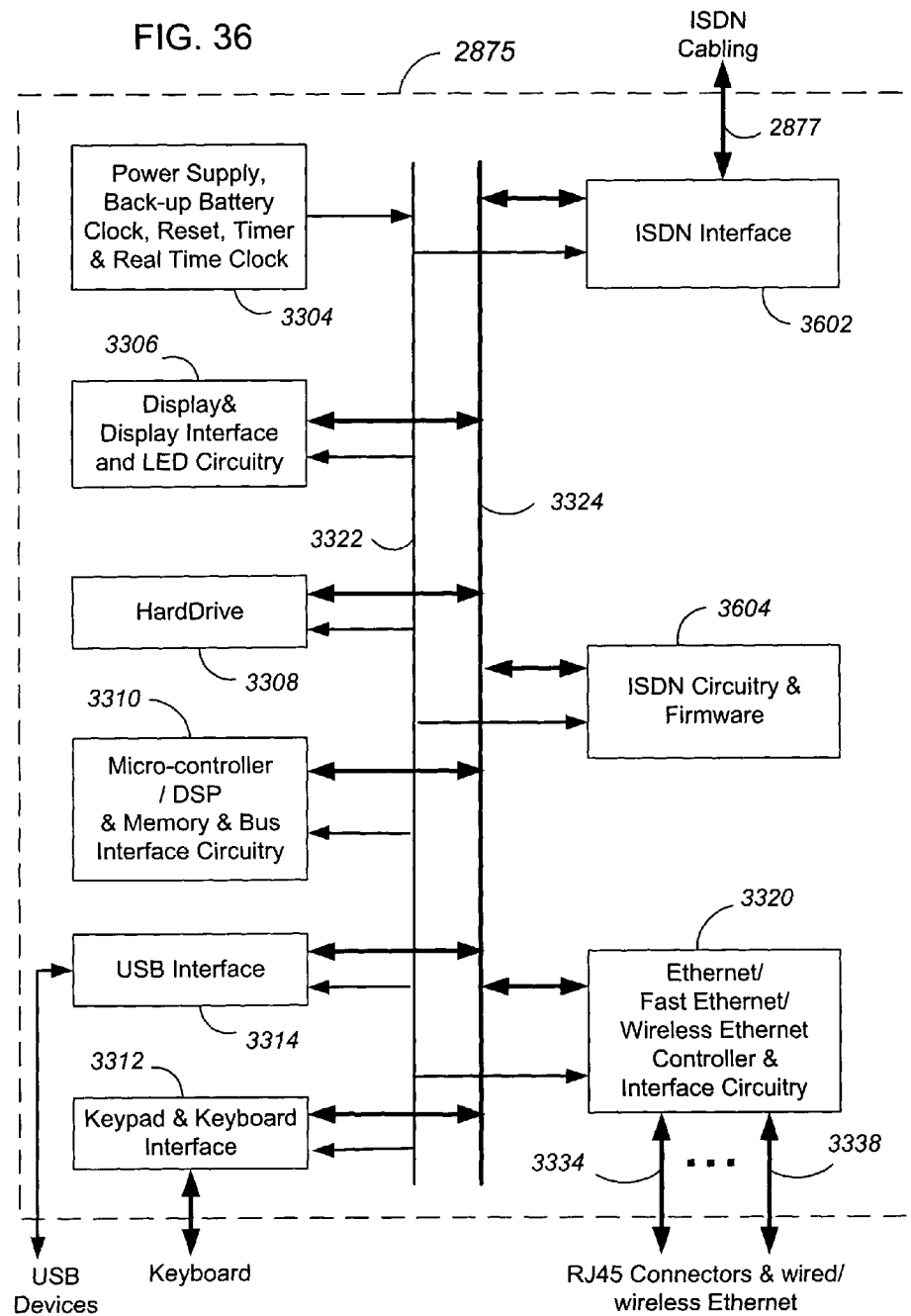
FIG. 36 shows a functional block diagram of an ISDN line device & digital attendant interfacing to ISDN line in accordance with an embodiment of the present invention.

FIG. 35 shows a block diagram of a cable TV/coax cable Device & Digital Attendant 2865 interfacing to cable TV coax cable, in accordance with an embodiment of the present invention. The circuitry is similar to the embodiment illustrated in FIG. 34, but different in terms of interfacing to TV coax cable through module 3504. The cable modem circuitry 3504 accepts packet data from module 3310 (voice & PC data) into its memory buffer and modulates them into base-band analog signal specified for coax cable 2867. On the receiving end, an incoming analog signal, which carries a large number of information channels (TV channels), has one information channel that is within the receiving band of 3504. The analog is then demodulated into packet data and read out by the CPU for processing into voice data or PC data based on their header IDs. Ethernet controller 3320 provides one or more connections 3334 . . . 3338 for connecting netphones and/or PCs.

FIG. 36 shows a block diagram of an ISDN Line Device & Digital Attendant 2875 interfacing to ISDN line through module 3604, in accordance with an embodiment of the present invention. The circuitry is similar to the embodiment illustrated in FIG. 33, but different in term of interfacing to an ISDN line. Ethernet controller 3320 provides one or more connections 3334 . . . 3338 for connecting netphones and/or PCs.

Figure 37:
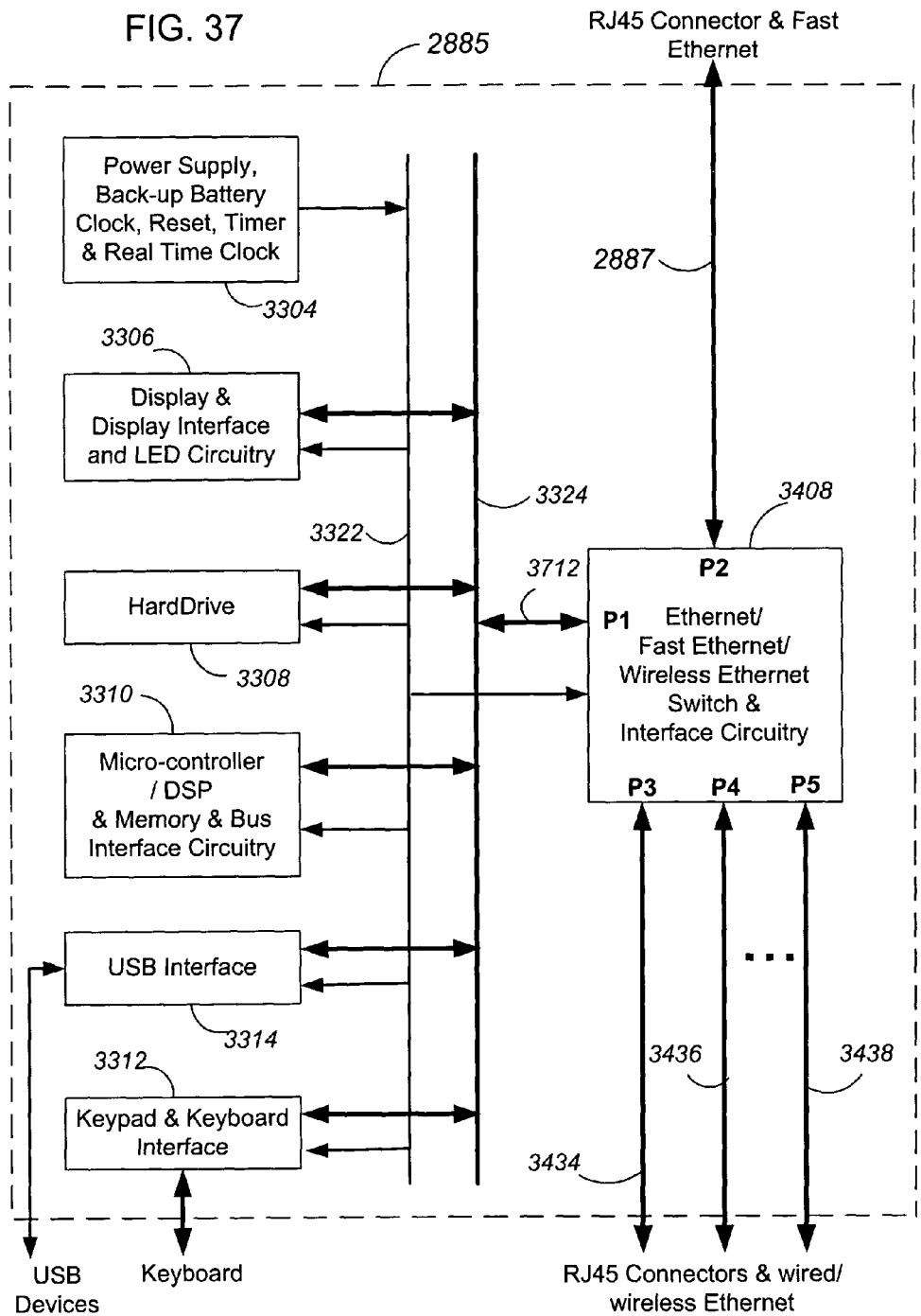
FIG. 37 shows a functional block diagram of an Ethernet line device & digital attendant interfacing to Fast Ethernet line in accordance with an embodiment of the present invention.

FIG. 37 shows a block diagram of an Ethernet Line Device & Digital Attendant 2885 interfacing to Fast Ethernet connection 2887 through Ethernet switch 3408, in accordance with an embodiment of the present invention. In this example, connection 2887 is a 10/100 Mbit Ethernet connection, but Ethernet Line Device & Digital Attendant 2885 may be configured for Gigabit Ethernet such as 1-Gigabit or 10-Gigabit Ethernet or 10-Gigabit fiber channel. Commercial examples of Ethernet switch 3408 include the Galileo GT-48330 Bridge and the Intel Phys LXT9761. Internal communication between network phone devices takes place within Ethernet busses 3434, 3436, and 3438 coupled to controller 3408. Internal calls and broadcast commands originating from devices connecting to Ethernet bus 3434 will go to devices connecting to busses 3434, 3436, and 3438, but not to connection 2887 nor to connection 3712. Likewise internal calls and broadcast commands originating from devices connecting to Ethernet bus 3436 will go to devices connecting to busses 3434, 3436 and 3438, but not to connection 2887 nor to connection 3712. Internal calls and broadcast commands originating from devices connecting to Ethernet bus 3438 will go to devices connecting to busses 3434, 3436 and 3438, but not to connection 2887 nor to connection 3712. External calls from Ethernet busses 3434, 3436, and 3438 are routed to connection 2887. Incoming calls from external devices from Ethernet connection 2887 are routed to busses 3434, 3436, and/or 3438. In other words, module 3408 isolates all internal calls (activities) from external devices connecting to Ethernet connection 2887, and the link of Ethernet connection 2887 to/from busses 3434, 3436, and/or 3438 are for external calls.

Figure 38:
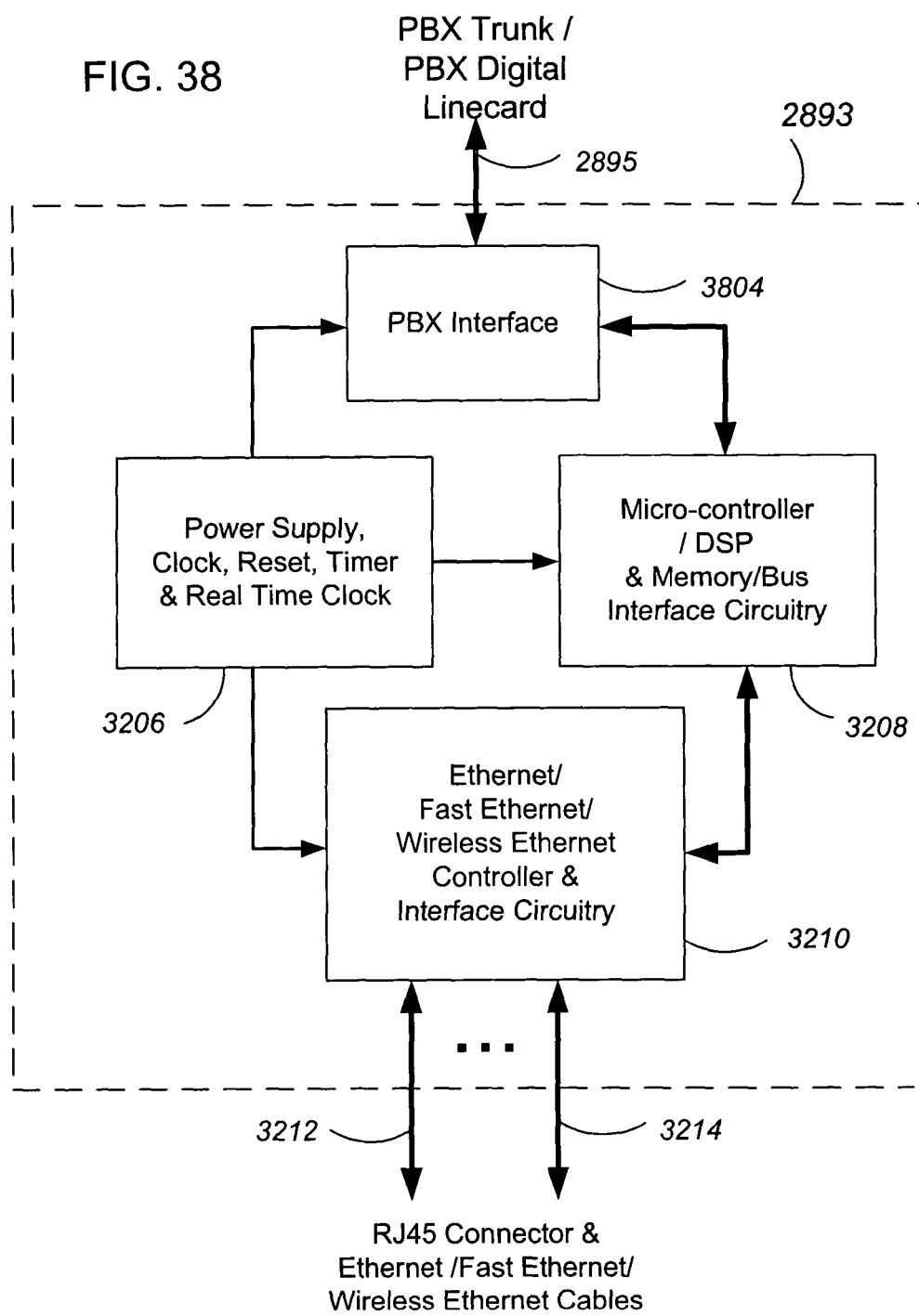
FIG. 38 shows a functional block diagram of a PBX trunk line device interfacing to a PBX system in accordance with an embodiment of the present invention.

FIG. 38 shows a functional block diagram of a PBX Trunk Device 2893, in accordance with an embodiment of the present invention. This embodiment provides for connection to PBX (Private Branch Exchange), which in this example, is a TDM (Time Division Multiplex) interface 2895. In this setup, the network phone system acts like a telephone subset of the PBX and the number of active lines (network phone system to PBX) are limited by the PBX digital line card device. Module 2893 provides all hardware/software functions of translating packet switching into circuit switching or vice versa between the network phone devices and PBX. Ethernet controller 3210 provides one or more connections 3212 . . . 3214 for connecting netphones and/or PCs Note that depending on the user needs, the various Ethernet busses coupled to the respective Ethernet controllers and switches 3210, 3320 and 3408 of the various embodiments described above can also be point to point connections, and can either be wired or wireless.

Figure 39:
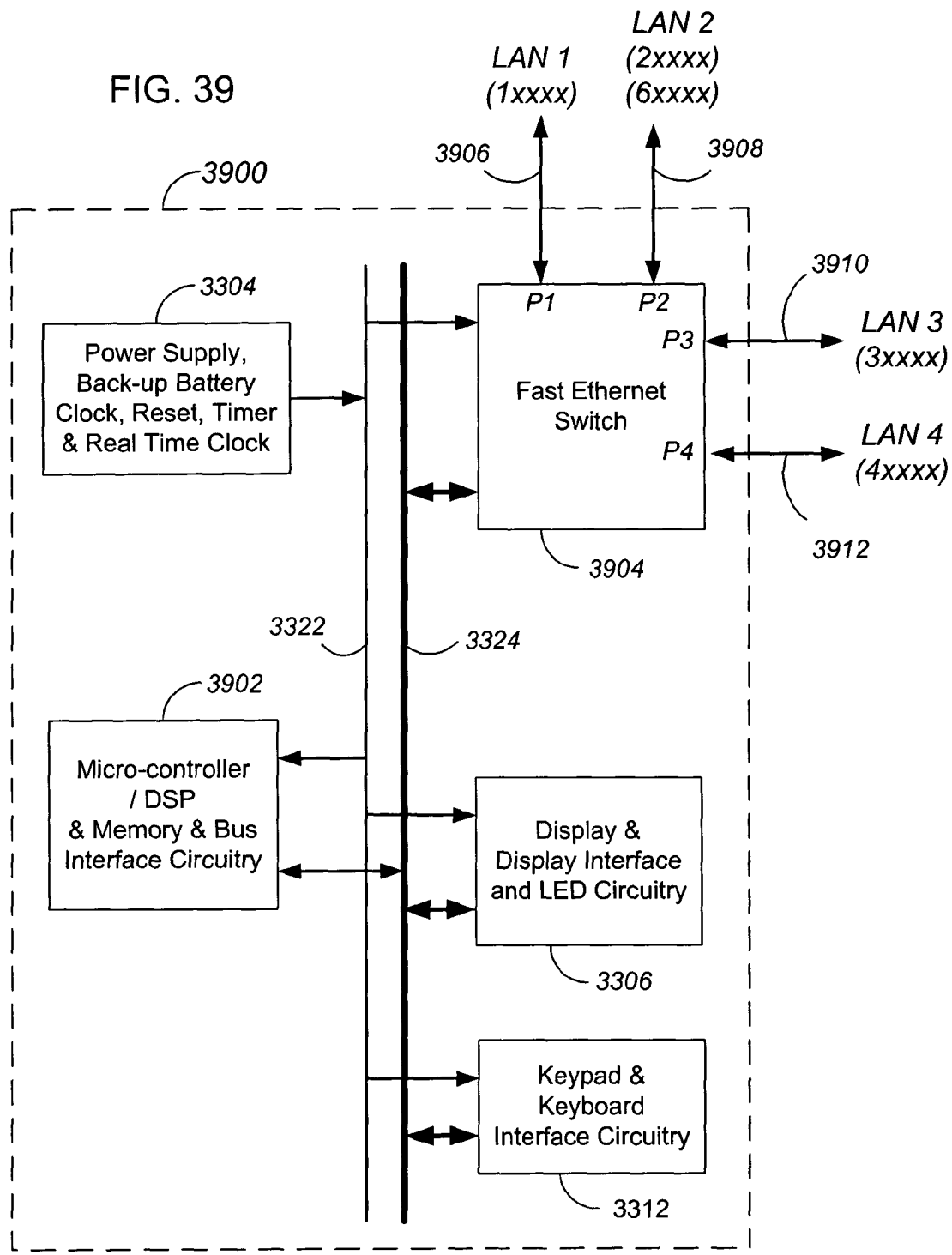
FIG. 39 shows a functional block diagram of a network phone number router coupled to multiple LAN networks in accordance with an embodiment of the present invention.

FIG. 39 shows a functional block diagram of a Network Phone Number Router 3900 coupled to multiple LAN networks, in accordance with an embodiment of the present invention. Device 3900 can have fewer numbers of modules and narrow its function of just routing calls, in this example, between networks LAN 1–LAN 4. A more powerful CPU such as ARM7 S3C4510X01 is more preferable for phone number router 3900, since it requires more processing power. Fast Ethernet switch module 3904 does the routing of calls between Ethernet connection LAN 1 3906 to/from either Ethernet connections LAN 2 3908, LAN 3 3910 and/or LAN 4 3912. Likewise, it routes calls between Ethernet connection LAN 2 to/from either Ethernet connections LAN 1, LAN 3, and/or LAN 4. The routing also occurs between LAN 3 to/from LAN 1, LAN 2 and/or LAN 4, and so does between LAN 4 to/from LAN 1, LAN 2 and/or LAN 3. One example of devices used by Module 3904 are the Galileo GT-48330 Bridge and the Intel Phys LXT9761. Network phone number router 3900 informs all network phones coupling to LAN 1 3906 that all calls to numbers, in this example, such as: 2xxxx, 3xxxx, 4xxxx and 6xxxx, should be forwarded to Ethernet port P1 of Ethernet switch 3904. When the calls get to port P1, they will be routed accordingly (2xxxx & 6xxxx to LAN 2, 3xxxx to LAN 3 and 4xxxx to LAN4). Likewise router 3900 also informs all phone devices in LAN 2 3908 that all calls to numbers such as: 1xxxx, 3xxxx and 4xxxx should be forwarded to Ethernet port P2 of switch 3904. When the calls get to port P2, they will be routed accordingly (1xxxx to LAN 1, 3xxxx to LAN 3 and 4xxxx to LAN 4). Likewise router 3900 also informs all phone devices in LAN 3 3910 that all calls to numbers such as: 1xxxx, 2xxxx, 4xxxx and 6xxxx should be forwarded to Ethernet port P3 of switch 3904. When the calls get to port P3, they will be routed accordingly (1xxxx to LAN 1, 2xxxx & 6xxxx to LAN 2 and 4xxxx to LAN 4). Likewise router 3900 also informs all phone devices in LAN 4 3912 that all calls to numbers such as: 1xxxx, 2xxxx, 3xxxx and 6xxxx should be forwarded to Ethernet port P4 of switch 3904. When the calls get to port P4, they will be routed accordingly (1xxxx to LAN 1, 2xxxx & 6xxxx to LAN 2 and 3xxxx to LAN 3). When router 3900 is first placed online into one the LAN network (i.e. LAN 1), it builds up its directory of the LAN 1 network similar to the steps taken in FIG. 45 and FIG. 46. Router 3900 also keeps track on any new device coming online by monitoring and receiving the "phone number broadcast command" from the new device, as shown in steps 4220 and 4226 of FIG. 42A and updating its LUT, as shown is step 4222 of FIG. 42A. Next, when connecting to another LAN network (LAN 2), router 3900 informs by broadcasting the Device Type Command to all devices in LAN 2 along with phone number such as 1xxxx of LAN 1 (in its data field). The network phone devices support "x . . . " number system such as 1xxxx where xxxx indicates the range from 10000 to 19999. Router 3900 also informs by broadcasting the device type command to all devices in LAN 1 along with phone number such as 2xxxx and 6xxxx of LAN 2.

Figure 40:
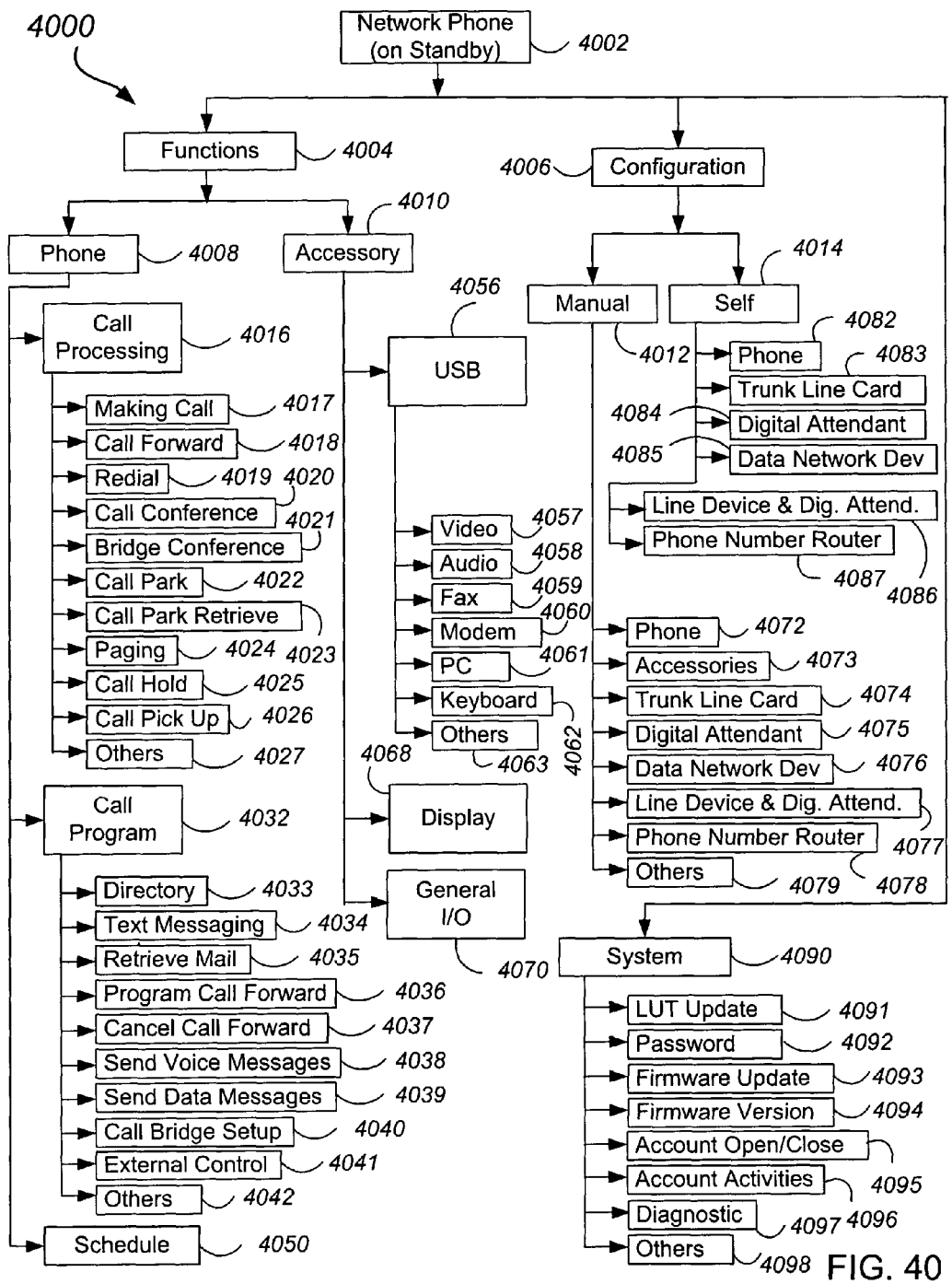
FIG. 40 shows a hierarchical block diagram illustrating all firmware modules of a network phone device in accordance with an embodiment of the present invention.

FIG. 40 shows an exemplary hierarchical functional block diagram 4000, illustrating the operation of a network phone device, e.g., network phone 10, in accordance with an embodiment of the present invention. In block 4002, the network phone device is idle, i.e. in standby mode. Netphone functionality includes functions 4004, configuration 4006, and system 4090. Netphone functions module 4004 includes phone functions 4008 and accessory functions 4010. Netphone configuration module 4006 includes manual configuration 4012 and self-configuration 4014. Manual configuration 4012 allows an administrator or user to configure network phone devices and the respective accessories manually. Self-configuration 4014 lets the device configure itself without user's intervention. System functions 4090 include LUT update, firmware version number, firmware update, caller cost accounting activities, and diagnostic purposes.

In some embodiments of the netphone, the function blocks illustrated by FIG. 40 are implemented using firmware. However these netphone functions can also be implemented using hardware, firmware and/or software or combinations thereof. A description of function blocks of FIG. 40 follows.

Call Processing 4016 include 11 sub-functions described below.
  Making call 4017: Making phone call connection
  Call forward 4018: Forward current call to another number or accept call forwarded by another phone.
  Redial 4019: Redial the last phone number
  Call conference 4020: Connecting the current call with another phone for three ways or more conversation.
  Bridge conference 4021: Dial in for bridge conference call
  Call Park 4022: Park current call
  Call Park Retrieve 4023: Retrieve parked call.
  Paging 4024: Page another phone number
  Call hold 4025: Put current call on hold
  Call pick up 4026: Pick up a ring phone from another extension
  Others 4027: Future functions Call Program 4032 include 10 sub-functions described below.
  Directory 4033: Phone name and number directory entry and recall.
  Text messaging 4034: For example alerting caller why you are not at your phone such as "out to lunch" when caller rings your phone.
  Retrieve Mail 4035: Retrieve one's voice mail
  Program call forward 4036: Forward all calls to another phone.
  Cancel call forward 4037: Cancel call forward
  Send voice messages 4038: Allow user to send a voice mail without ringing the destination phone.
  Send data messages 4039: Allow user to send a data message without ringing the destination phone.
  Call bridge setup 4040: Set up call bridge conference
  External control 4041: Allow external phone to have control over network phone and use it as a remote phone. (See FIG. 54 and description below).
  Others 4042: Future uses Schedule 4050. (See FIG. 55 and description below)

USB 4056 includes 7 sub-functions described below.
  Video 4057: Video accessory function.
  Audio 4058: Audio accessory function.
  Fax 4059: Fax accessory function.
  Modem 4060: Modem accessory function such as credit card reader function.
  PC 4061: PC accessory function.
  Keyboard 4062: Keyboard accessory function.
  Others 4063: Other accessories Display 4068: Phone device display
General I/O 4070: General purpose network phone I/O accessory devices Manual 4012: Manual configuration of network phone devices
  Phone 4072: Network phone configuration
  Accessories 4073: Network phone accessory device configuration
  Trunk line card 4074: Trunk line card configuration
  Digital attendant 4075: Digital attendant configuration
  Data network device 4076: Data network device configuration
  Line device & digital attendant 4077: Line device & digital attendant configuration.
  Phone number router 4078: Phone number router configuration.
  Others 4079: Other future configurations Self 4014: Self-configuration of network phone devices.
  Phone 4082: Network phone self-configuration
  Trunk line card 4083: Trunk line card self-configuration
  Digital attendant 4084: Digital attendant self-configuration
  Data network device 4085: Data network device self-configuration
  Line device & digital attendant 4086: Line device & digital attendant self-configuration.
  Phone number router 4087: Phone number router self-configuration.

System 4090: Phone device system related functions
  LUT update 4091: Update LUT by the network phone device/user
  Password 4092: User's password entry and verification
  Firmware update 4093: Receive and program updated version of new firmware
  Firmware version 4094: Firmware version number
  Account open/close 4095: Create account for new user and close account of current user.
  Account activities 4096: Call cost accounting activities requested by administrator
  Diagnostic 4097: Firmware self-diagnostic
  Others 4098: Future usage.

Figure 41:
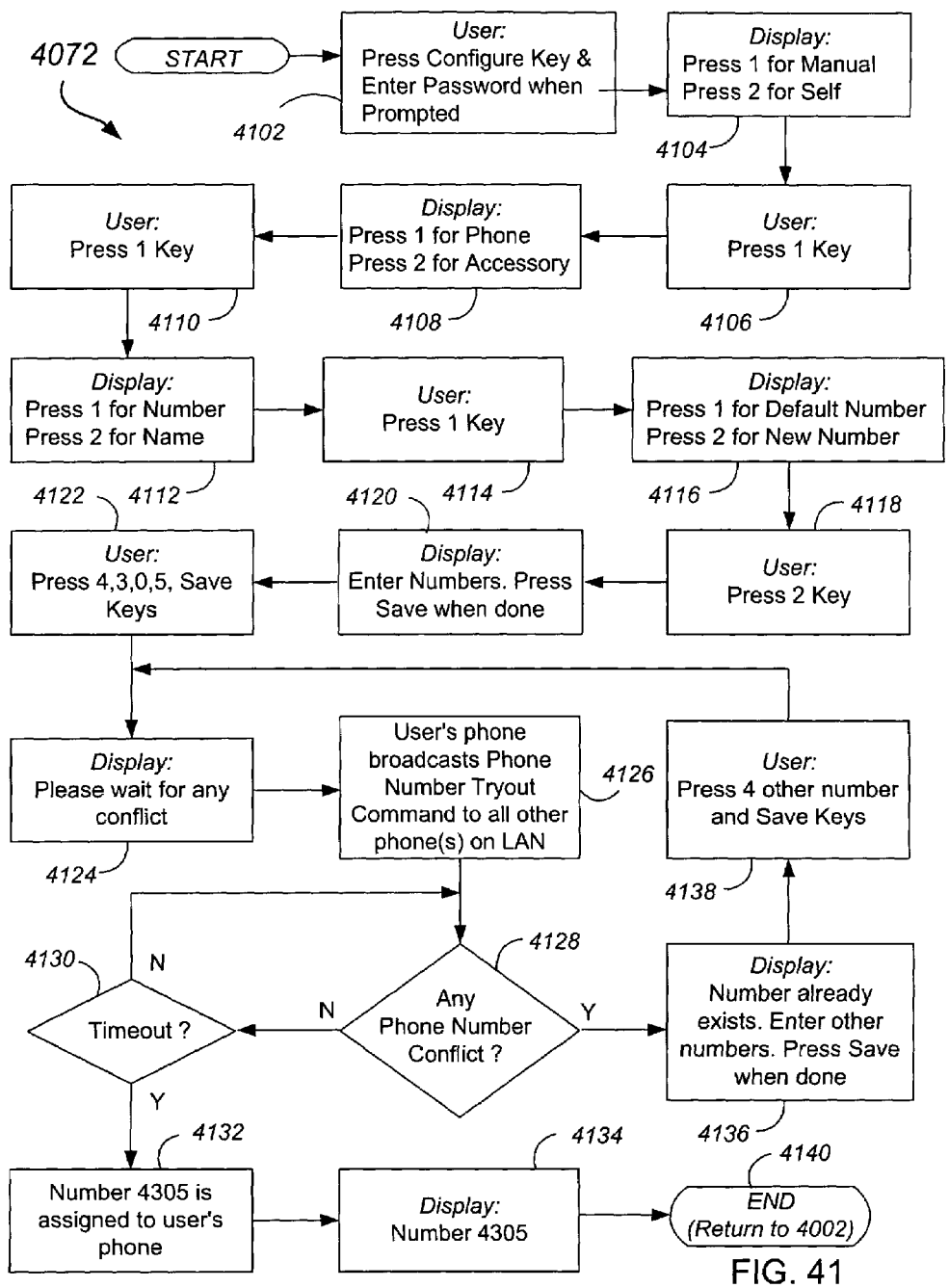
FIG. 41 shows a flow chart illustrating the process for manually configuring a phone number to the network phone device in accordance with an embodiment of the present invention.

FIG. 41 shows a flow chart 4072 illustrating an exemplary configuration of a phone number for a network phone, e.g., network phone 10 of FIG. 28A, in accordance with an embodiment of the present invention. In this process, the user manually configures a particular phone extension number "4305" into the user's extension by starting at step 4102 by pressing the Configure key 3006g and entering the password if prompted. In some embodiments, all the phone devices in the same network have the same password to prevent unwanted phone devices from intentionally/unintentionally gaining entry into and/or configuring the network. This makes the network phone system more secure especially if a portion of the network is wireless.

In the next step 4104, the phone display 3002 indicates a choice of Manual ("1" key) or Self ("2" key) Configuration. In step 4106, the user presses the "1" key for manual selection. In step 4108, the display asks if it is for the phone or accessory configuration. In step 4110, the user presses the "1" key to program the phone. In step 4112, the display asks to pick number or name choice. In step 4114, the user presses "1" the number choice. In step 4116, the display asks if the user wants to use the default number or enter brand-new number. In step 4118, the user presses the "2" key so he/she can enter new number. In step 4120, the display prompts the user to enter the numbers and press the Save key 3006a in FIG. 30, when completed. In step 4122, the user presses the "4, 3, 0, 5" keys followed by the Save key. In step 4124, the display instructs the user to wait while the phone checks for phone number conflicts elsewhere on the LAN.

In step 4126, the network phone sends out the 'Phone Number Tryout' command to all other network phone devices on the LAN and waits the password verification to take place. If there is no password verification request from an existing phone in the network, this phone is the first phone attempting to connect to the LAN and hence the extension number "4305" can be assigned to the user. If there is a password verification request and the password is not accepted by the phone making the password verification request, then the phone making the password verification request is probably connected to a neighboring LAN and this phone is the first phone attempting to connect to the LAN and extension number "4305" can be assigned to the user. Otherwise, in steps 4128 and 4130, the network phone is waiting for the response from other network phones. If no other phone responds with "Phone Number Exists" command within the timeout period, extension number "4305" is assigned to the user, in step 4132. All other devices will update their look up tables (LUTs) with the new number, such as shown in step 4222, in FIG. 42A. The number will be displayed on the user's phone, in step 4134. Finally the phone goes to idle state as indicated by step 4140. If there is any phone number conflict, then the "phone number already exists message" is shown by the display, in step 4136. The user then enters different phone numbers, in step 4138, and the process starts again, at step 4124. Eventually, a non-conflicting phone number is accepted and steps 4132 and 4134 will reflect the newly assigned and displayed phone number.

Figure 42A:
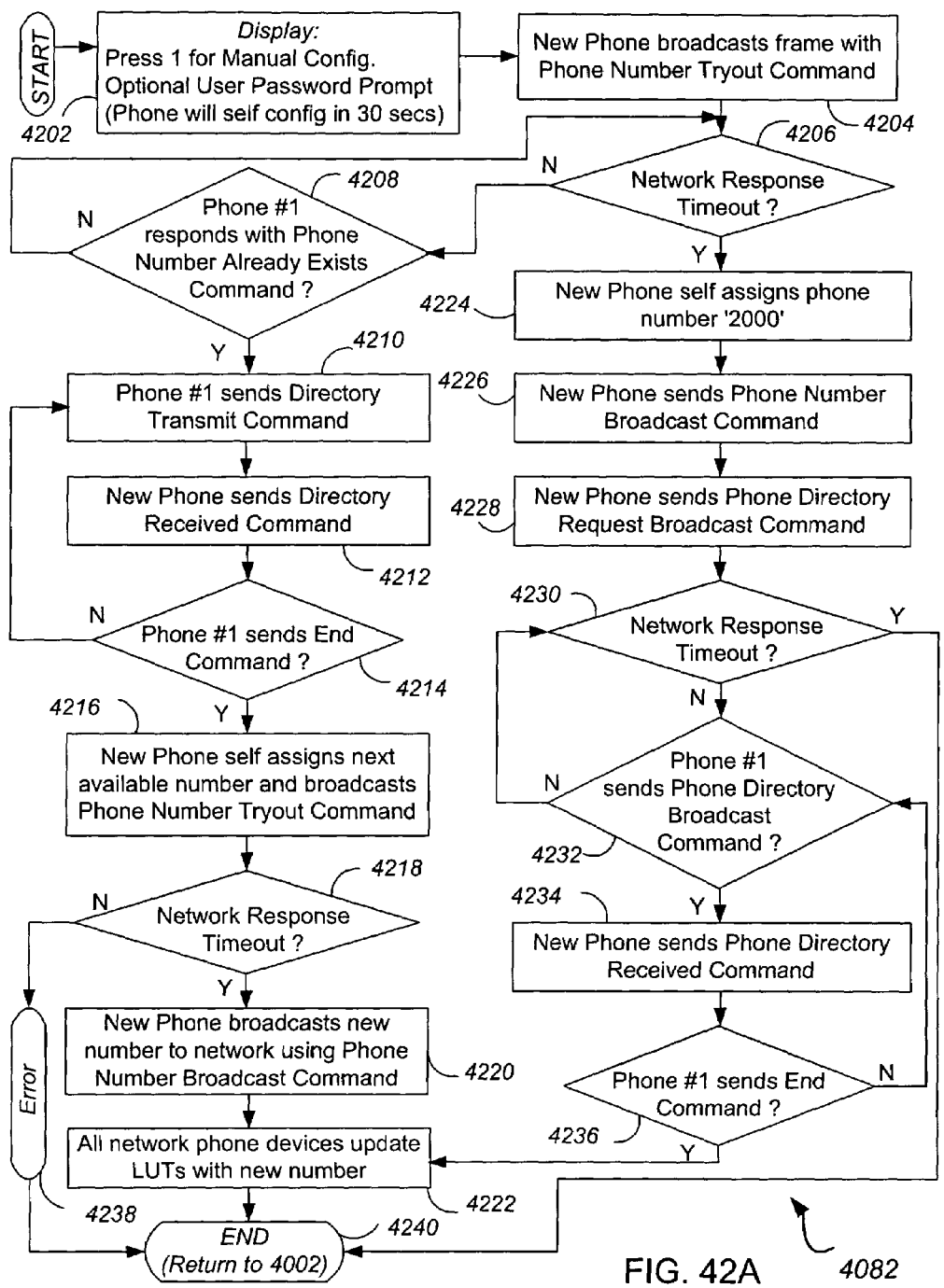
FIG. 42A shows a flow chart illustrating the process of self-configuring a network phone added to the network in accordance with an embodiment of the present invention.

FIG. 42A shows a flow chart 4082 illustrating the process of configuring a phone, e.g., network phone 10 of FIG. 28A, attempting to connect to the network, in accordance with an embodiment of the present invention. In step 4202, a new phone is connected to the network. The user enters the password if prompted and phone will self configure in 30 seconds. After 30 second time-out, while key "1" is not pressed, in step 4204, the phone broadcasts over the network a 'Phone Number Tryout' command with an initial number of "2000" (default number in memory) and waits the password verification. In step 4206, the newly connected phone waits for a response from the network. If there is a network response timeout, as determined in step 4206 (meaning that there is no response during the timeout period, no password request or password does not verify), then, in step 4224, the newly connected phone assigns the number "2000" to itself. In step 4226, the newly connected phone broadcasts a 'Phone Number Broadcast' command over the network, after which it sends a 'Phone Directory Request Broadcast' command, in step 4228 and waits for a response, in step 4230. Also in step 4228, if there is no password verification, the phone goes directly to step 4240 since it is the first device attempting to connect to the network. If a network response timeout occurs, then the newly connected phone is the first phone in the network (there are may be voice mail or trunk line card device). A response received during the network response timeout, in step 4230, contains the phone directory of all existing phones sent from phone #1 (digital attendant or phone with the extension number having the lowest value), in step 4232. The newly connected phone then acknowledges the message containing the directory by sending a 'Phone Directory Received' command, in step 4234, and the process completes with the receipt of an 'End' command from phone #1, in step 4236. Otherwise, phone #1 again sends a 'Directory Broadcast' command, in step 4232. All network phone devices update their LUTs, in step 4222.

If there is a response during the timeout period after password verification, as determined in step 4208, then the newly connected phone is not the first phone attempting to connect to the network. At least one other phone is connected to the network, and of these, one of them is the phone that was first connected to the network. That phone, designated Phone #1 (or digital attendant), responds to the 'Phone Number Tryout' command with a 'Phone Number Already Number Exists' message, because the number broadcast in the 'Phone Number Tryout' command, i.e., extension "2000", is the number adopted by the phone (or digital attendant) first connected to the network. Phone #1 (or digital attendant), in step 4210, next sends out a 'Directory Transmit Command', which includes a directory of numbers for all existing phones on the network, and the newly connected phone responds, in step 4212, with the 'Directory Received' command. In step 4214, the new phone receives the complete directory when phone #1 sends the 'End' command. Otherwise, phone #1 (or digital attendant) again sends a 'Directory Transmit Command', in step 4210.

The newly connected phone now adopts the next available (unassigned) number in the directory, in step 4216, and broadcasts a 'Phone Number Tryout' command again with the adopted number over the network, to determine whether there is a conflict with another phone. If there is no conflicting number, as determined in step 4218, then the newly connected phone broadcasts, in step 4220, a 'Phone Number Transmit' command that includes the adopted number, to the network. Following this, in step 4222, each phone device on the network updates the look-up table (LUT) in that device with the new number. If the adopted number is a conflicting number, as determined in step 4218, then there is a network error, in step 4238 (shown in display), that needs to be investigated and the process terminates.

Figure 42B:
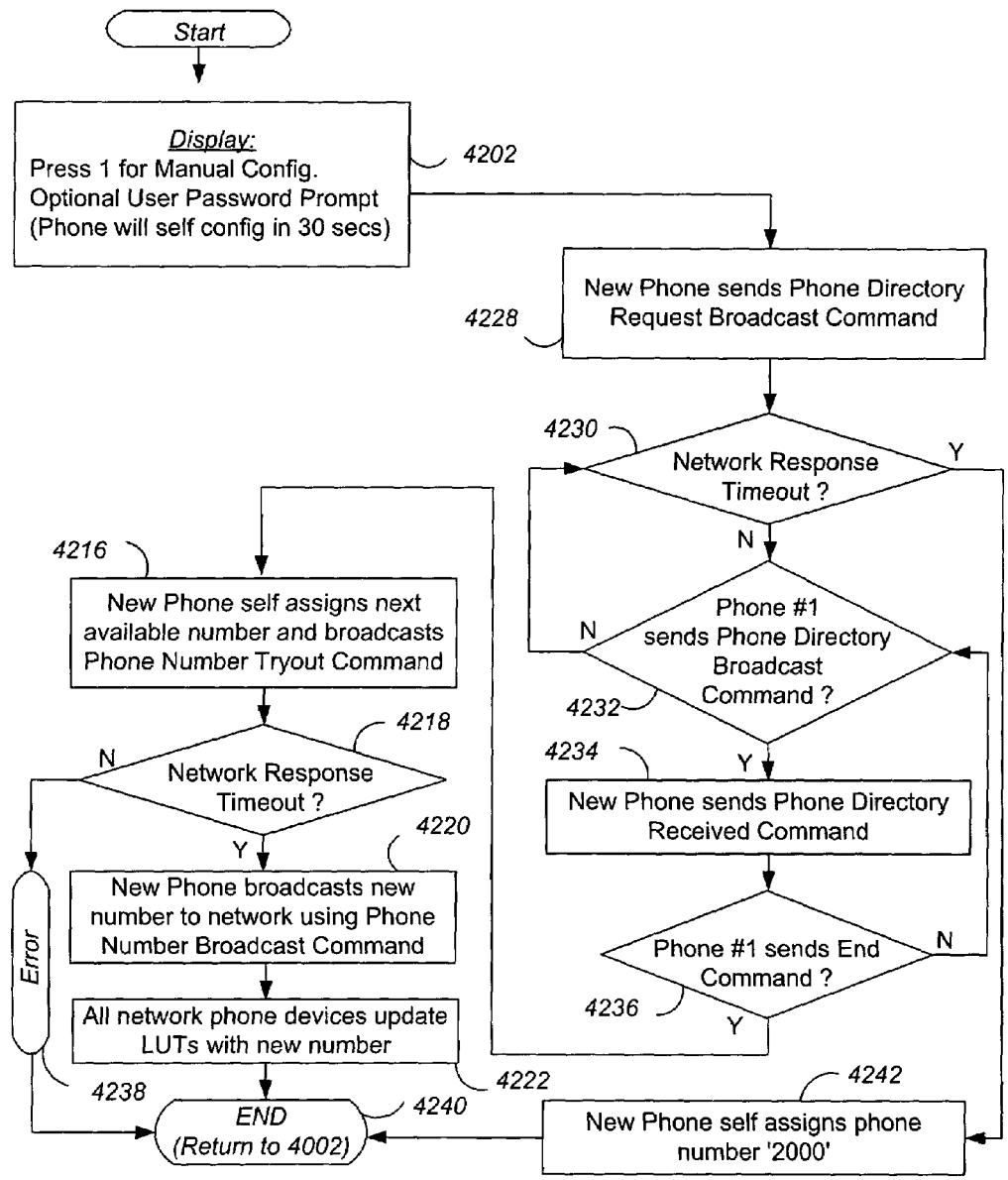
FIG. 42B shows a flow chart illustrating another process of self-configuring a network phone added to the network in accordance with an embodiment of the present invention.

FIG. 42B shows a flow chart 4082 illustrating another process of configuring a network phone, e.g., phone 10 of FIG. 28A, attempting to connect to the network, in accordance with an embodiment of the present invention. FIG. 42B shows a shorter way of configuring a telephone by itself by eliminating steps 4204, 4206, 4224 and 4226 and thus steps 4208, 4210, 4212 and 4214 are no longer needed. The new phone configures itself, by skipping to step 4228, after starting at step 4202, and broadcasting 'the phone directory request' to all devices, in step 4228. The phone also waits for a password verification request, in step 4228. If there is no password request command from any device(s) in the network(s) or password does not match, then the phone goes directly to step 4242 since it is the first phone attempting to connect to the network. Otherwise, the new phone then waits for the response from phone #1 or digital attendant (phone with the extension number having the lowest value), in step 4230. If there is any phone, then phone #1 or digital attendant (whichever whose phone has the lowest value) sends the phone directory to the new phone, in step 4232 and the new phone acknowledges it, in step 4234. When the new phone receives the whole phone directory, as determined in step 4236, it assigns itself the next available (unassigned) phone number in the phone directory and broadcasts the phone number tryout command, in step 4216. It then waits for the response from other devices in the network, in step 4218. If there is no response, then it broadcasts its newly acquired phone number in step 4220, and all the network devices update their LUTs, in step 4222.

Password verification is generally not needed in a wired Ethernet network unless the administrator is concerned about the illegal use of his/her network. In the wireless network, password verification can be important since network phone devices can be intentionally or accidentally configured into the system if network hubs/switches are within their operating vicinity. Password request is issued by phone #1 (phone or digital attendant whose phone number having the lowest value). The trunk line card device is the next device to issue the password command if there is no phone #1 connected to the network.

Figure 43:
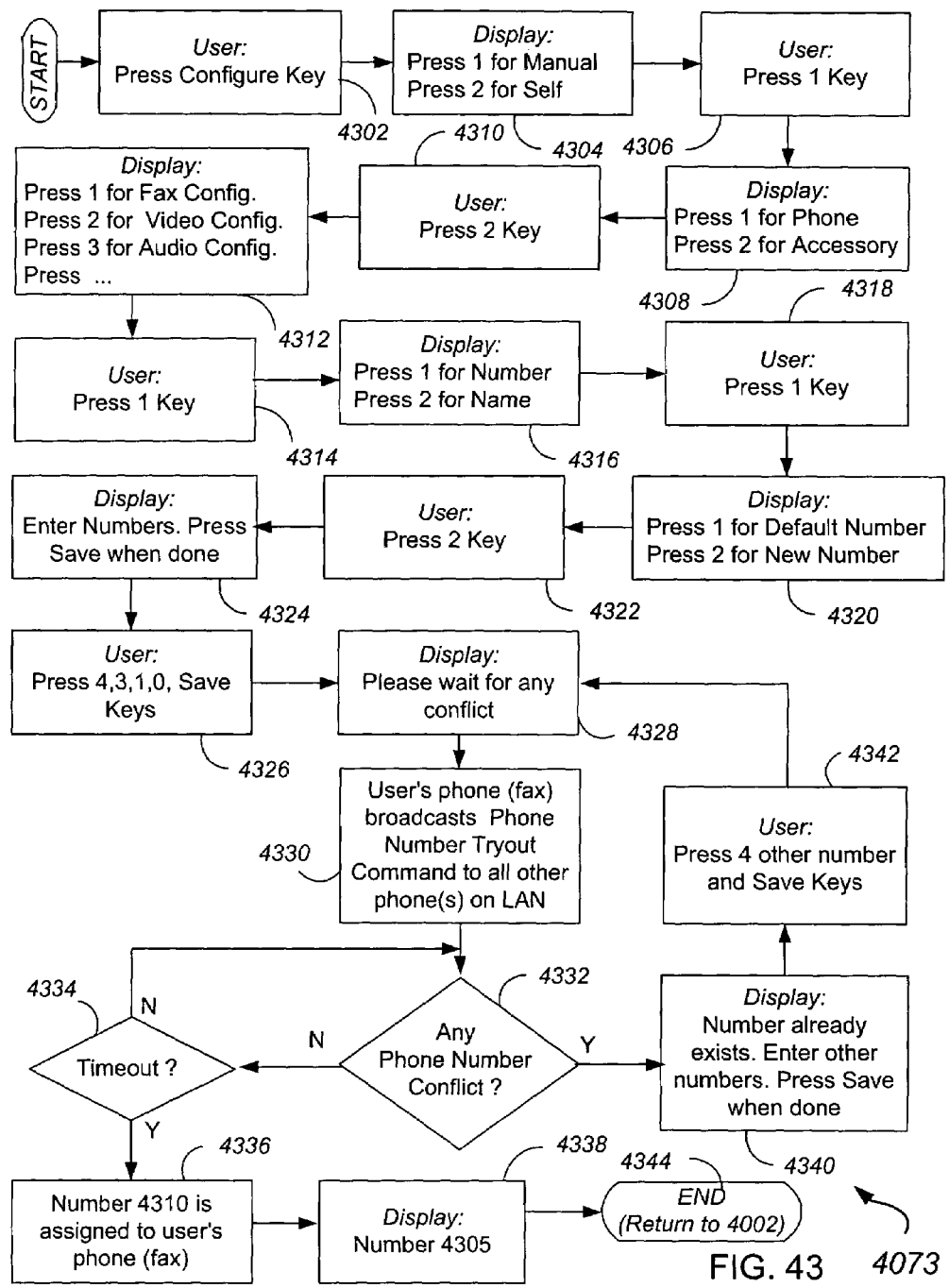
FIG. 43 shows a flow chart illustrating the process for manually configuring a phone number to the network phone device accessory in accordance with an embodiment of the present invention.

FIG. 43 shows a flow chart 4073 illustrating the process for configuring a network phone, e.g., phone 2807 coupled to one or more phone accessories, in accordance with an embodiment of the present invention. In this process, the user manually configures a particular phone extension number "4310" into the fax machine 2904, which is connected to the accessory port (USB) of the network phone 2902, as shown in FIG. 29. Starting at step 4302, the user presses the Configure key 3006g. In the next step 4304, the phone display 3002 indicates a choice of Manual Configuration "1", or Self Configuration "2". In step 4306, the user presses the "1" key for manual selection. In step 4308, the display asks if it is for the phone, or accessory configuration. In step 4310, the user presses the "2" key to program the accessory. In step 4312, the display asks for a choice of different kinds of accessories. The user picks fax by pressing "1" key, in step 4314. In step 4316, the display asks to pick number, or name choice. In step 4318, the user presses "1" the number choice. In step 4320, the display asks if the user wants to use the default number, or enter new number. In step 4322, the user presses the "2" key, so he/she can enter new number. In step 4324, the display prompts the user to enter the numbers and press the Save key 3006a, when completed. In step 4326, the user presses the "4", "3", "1", "0", and Save keys. In step 4328, the display instructs the user to wait while the phone checks for phone number conflicts elsewhere on the LAN. In step 4330, the network phone (fax) sends out the 'Phone Number Tryout' command to all other network phones on the LAN. In steps 4332 and 4334, the network fax is waiting for the response from other network phones and accessories. If no other phone responds with "Phone Number Exists" command, extension number "4310" is assigned to the user's fax, in step 4336. All other devices will update their lookup tables (LUTs) with the new number, such as shown in step 4222. The number will be displayed on the user's phone, in step 4338. If there is any phone number conflict, then phone number already exists message is shown by the display, in step 4340. The user then enters different phone numbers for fax device, in step 4342, and the process starts again, at step 4328. Password verification is not necessary because the network phone has already been configured into the system.

Figure 44:
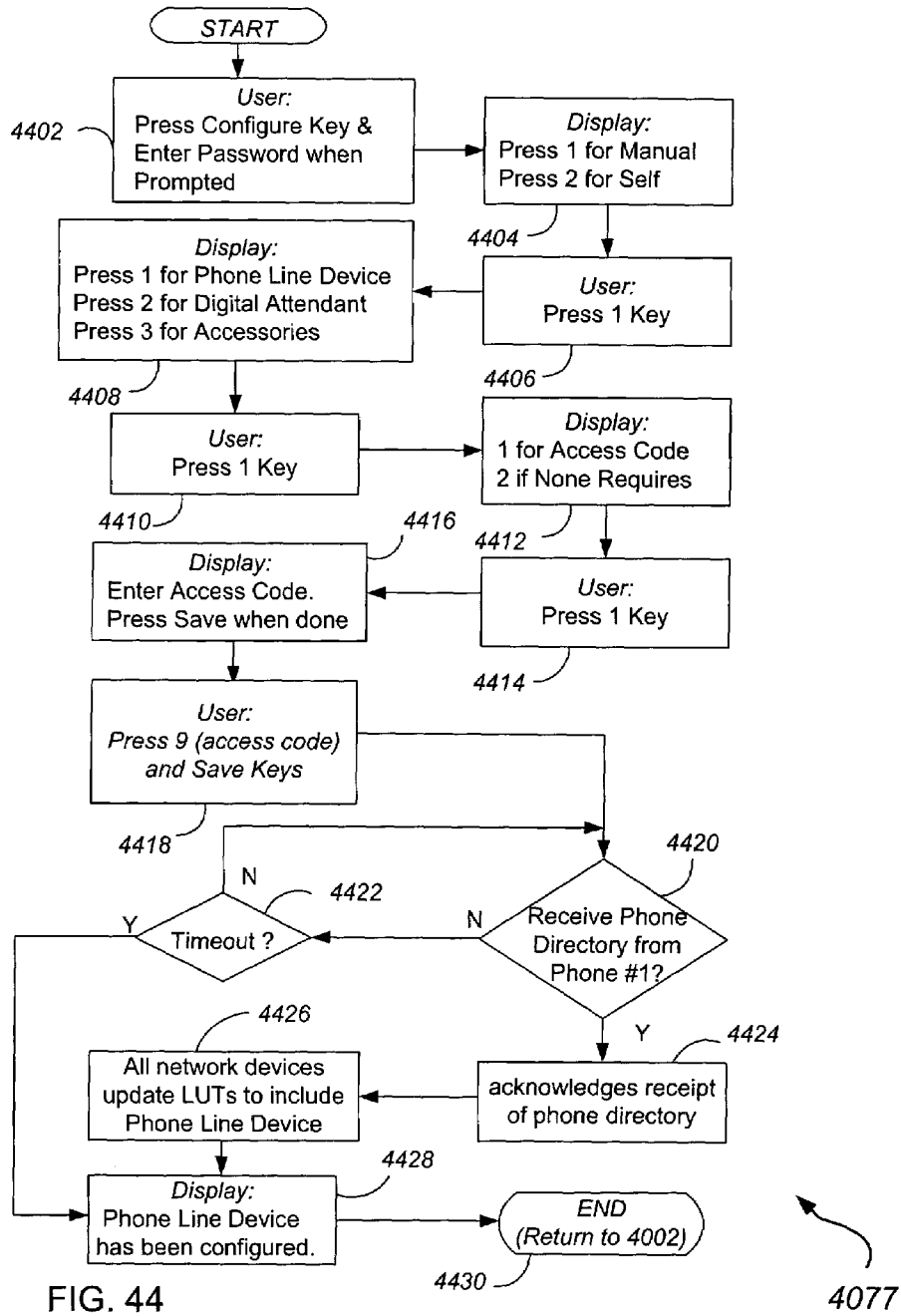
FIG. 44 shows a flow chart illustrating the process of manually configuring a Phone Line Device & Digital Attendant that is added to the network in accordance with an embodiment of the present invention.

FIG. 44 shows a flow chart 4077 illustrating the process of configuring a Phone Line Device & Digital Attendant, e.g., device 2841, attempting to connect to the network, in accordance with an embodiment of the present invention. In this process, the user manually configures the phone line device & digital attendant by pressing configure key 3006g and enters the password if prompted, in step 4402. The display asks for the manual or self-configure choice, in step 4404. The user then picks "1" key, in step 4406, for manual choice. The display then asks if it is for phone line device (trunk line device), digital attendant or accessory configuration. The user then presses "1" key for phone line device (trunk line) configuration. The display then asks if external access code is required, in step 4412. The user picks "1" key for access code requirement, in step 4414. The display instructs the user to enter access code, in step 4416, and the user presses key "9" to use it as access code, and save key in step 4418. If there is no password request or password is not verified, then the phone line device & digital attendant goes directly to step 4428, as determined by step 4422. Otherwise, it receives the phone directory from phone #1 as determined, in step 4420 and acknowledges it, in step 4424. All network devices update their LUTs, in step 4426 and the phone line device & digital attendant completes the configuration, in step 4428. The phone line device & digital attendant (or actually the phone line part of the phone line & digital attendant) finishes the configuration, which is shown on its display, in step 4428. Finally the device goes to idle state as indicated, in step 4430. The digital attendant (its phone number) should be configured as described below.

The digital attendant can be assigned a separate extension manually, as shown step 4408 choice "2", since it is also a phone with extra features; such as: monitor phone activity, enable/disable phone device, account billing and so forth. If the user picks choice "2", in step 4408, the digital attendant phone will be configured, as shown starting in step 4116, and ending in step 4140.

Figure 45:
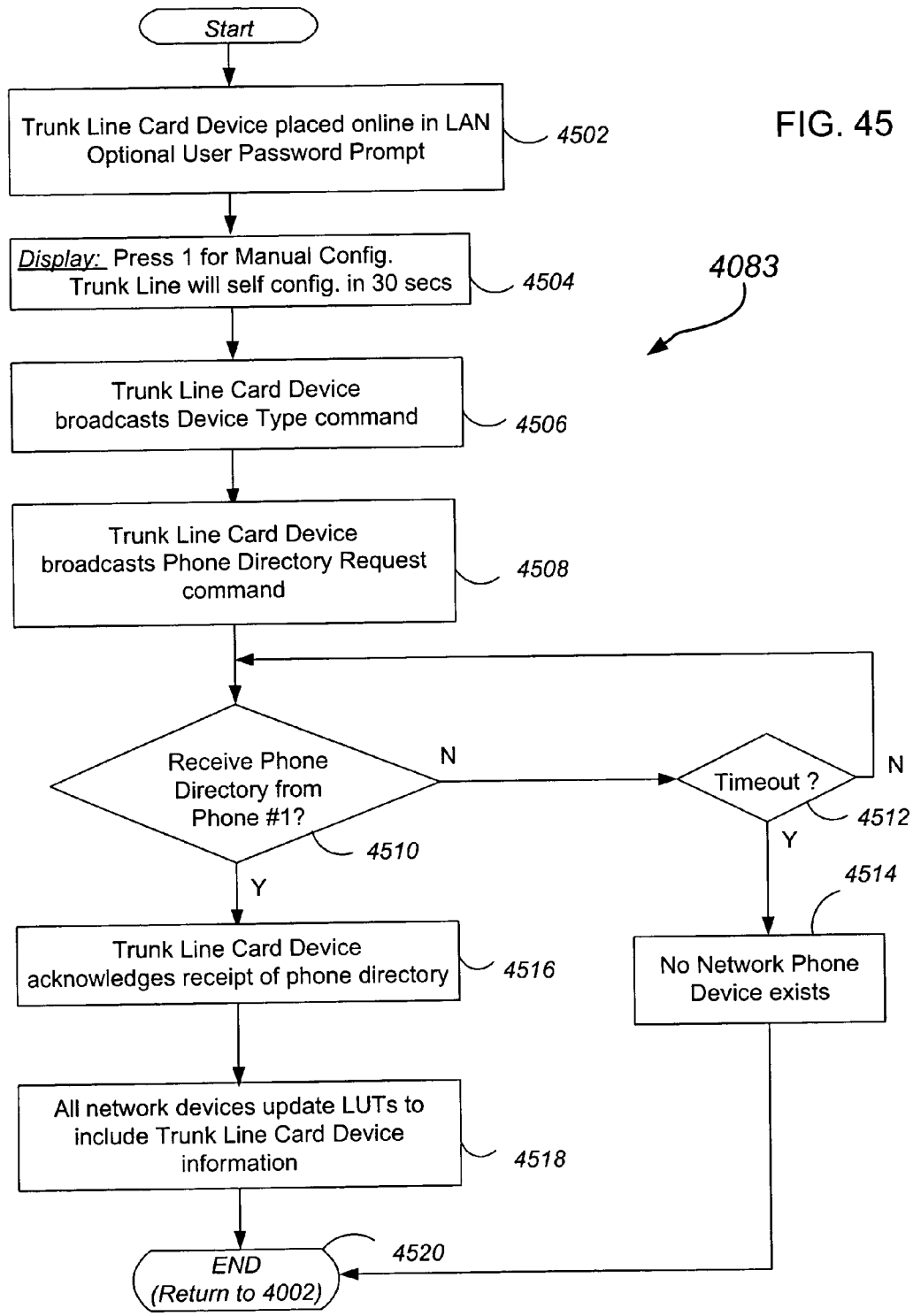
FIG. 45 shows a flow chart illustrating the process of self-configuring a Trunk Line Card Device that is added to the network in accordance with an embodiment of the present invention.

FIG. 45 shows a flow chart 4083 illustrating the process of configuring a trunk line card device, e.g., device 220, attempting to connect to the network, in accordance with an embodiment of the present invention. In step 4502, the Trunk line card device is placed online in the network and the user enters the password. It gives the user a choice of manual configuration, or it will self-configure (in this example) after 30 seconds, as shown in step 4504. The Trunk line card device broadcasts a 'Device Type' command, in step 4506, followed by a 'Phone Directory Request' command and waits for the password verification, in step 4508. If there is no password verification or verification is not OK, then the trunk line card device goes directly to step 4514. Otherwise, in steps 4510 and 4512, the Trunk line card device waits for response from network phone. In step 4510, phone #1 (or digital attendant) broadcasts the directory of phone numbers, in response to the 'Phone Directory Request' command. The Trunk line card device acknowledges receipt of the phone directory, in step 4516, and all network devices update their LUTs to include the Trunk line card device information, in step 4518. The trunk line card device returns to idle state, as shown in step 4520.

Figure 46:
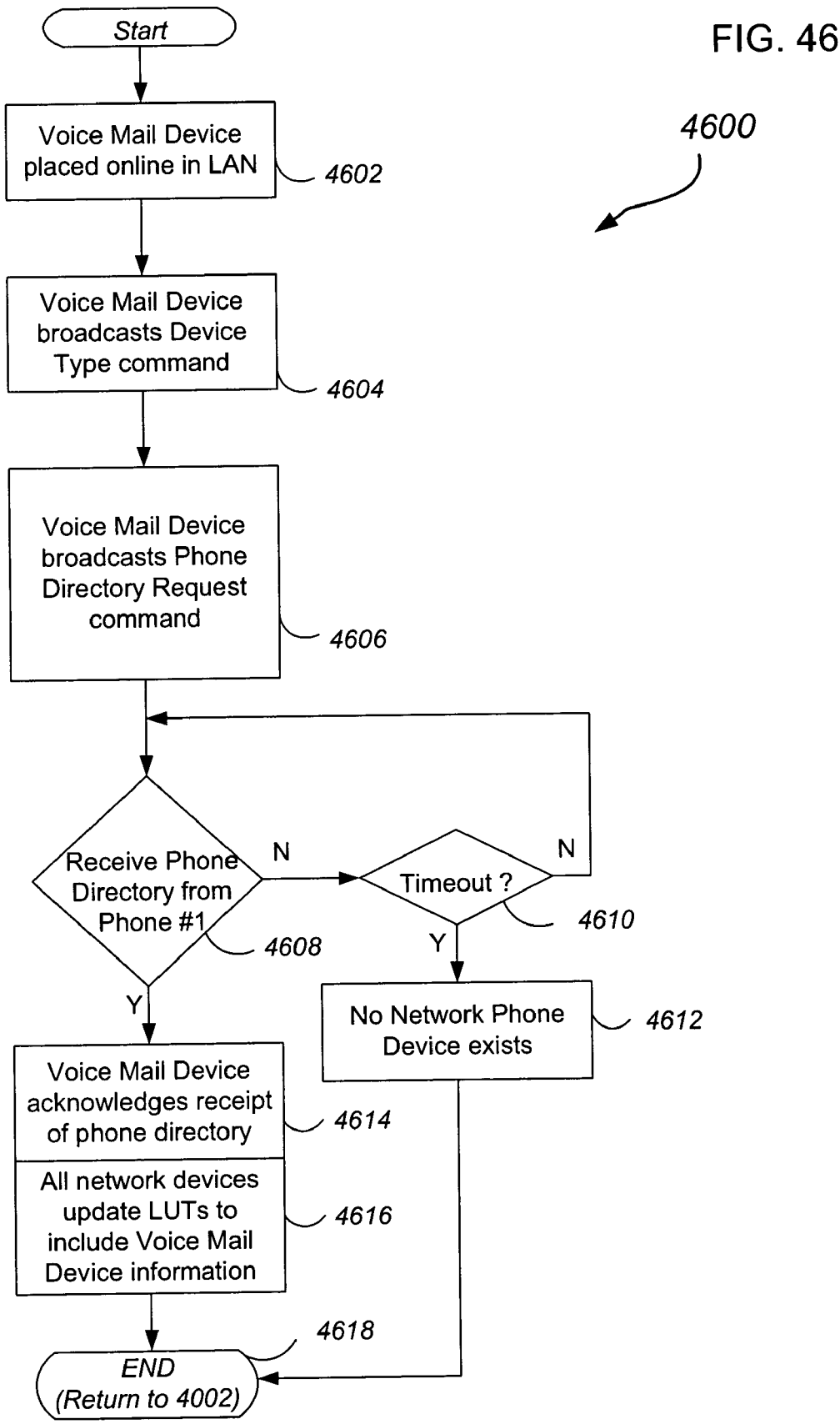
FIG. 46 shows a flow chart illustrating the process of configuring a Voice Mail Device added to the network in accordance with an embodiment of the present invention.

FIG. 46 shows a flow chart 4600 illustrating the configuration of a Voice Mail/Network Storage Device, e.g., device 2809, coupled to the network, in accordance with an embodiment of the present invention. This process is similar to the one that is described above for adding new phones or trunk line device. In this process, phone #1 (or digital attendant) must be preferably installed and operational. Starting in step 4602, a Voice Mail/Network Storage device is placed online in the network. In step 4604, the Voice Mail/Network Storage Device broadcasts the 'Device Type' command and the 'Phone Directory Request' command, in step 4606, and waits in steps 4608 and 4610, for a response (Directory broadcast from phone #1 or digital attendant). The Voice Mail/Network Storage Device acknowledges receipt of the phone directory, in step 4614, and all network devices update their LUTs to include the Voice Mail/Network Storage Device information, in step 4616.

If there is no response, then the process ends in step 4612, meaning there are not any other phones in the network. The network device, which fails to receive the phone directory, as shown in step 4612 will send out "Device Type Broadcast" command again as soon as a network phone is plugged in, and finishes its self-configuration on the network. The process is shown starting at step 4604.

Voice Mail/Network Storage Device can also store call history, billing statement, client phone & fax numbers, customer profile, incoming fax and outgoing fax for later retrieval or sending. One application is for customer profile and history based on his/her phone number forwarded to the agent whose PC is connected to the phone as an accessory in order to provide the highest possible service.

Table 9 and Table 10 define the upper 4 bits of byte 1 as device number as indicated by $2^{nd}$ entry of column 1. Device number allows multiple network phone devices to communicate with other devices via one single RJ45 (wired or wireless) connection. Using 4 bit as the device number, up to 16 devices (15 accessory devices plus network phone) can have their connections take place concurrently via a single network phone.

TABLE 9

| Byte 1 | Byte 2 | Description |
|---|---|---|
| xxxx:xxxx | yyyy:yyyy | Binary Bit Code, Command/Status xxxx:xxxx:yyyy:yyyy |
| xxxx:_____ | | device number |
| _____:xxx__ | | accessory |
| _____:000__ | | network phone |
| _____:001__ | | USB port |
| _____:010__ to _____:111__ | | reserved |
| _____:_____x | | count bit = 0, payload is ≧ 46 bytes for Type 1 frame |
| | yyyy:yyyy | Command/Status Code. (See Tables 4 & 11) |

TABLE 10

| Byte 1 Command/Status | Byte 2 Command/Status | Byte Count | Description |
|---|---|---|---|
| xxxx:xxxx | yyyy:yyyy | zzzz:zzzz | Binary Bit Code, Command/Status (2 bytes) xxxx:xxxx yyyy:yyyy |
| xxxx:_____ | | | device number |
| _____:xxx__ | | | accessory |
| _____:000__ | | | network phone |
| _____:001__ | | | USB port |
| _____:010__ to _____:111__ | | | reserved |
| _____:_____x | | | count bit = 1, payload is < 46 bytes for Type 1A frame |
| | yyyy:yyyy | | Command Code. (See Tables 4 & 11) |
| | | zzzz:zzzz | Byte count |

TABLE 11

00: Voice Data
01: Character Data (ASCII Data)
02: DTMF Data
03: Video Data
04: Hex Data
05: Idle Data
06-0F: Reserved
10: Ring (Initiate Call)
11: Ring Transfer
12: Call Ring Back
13: Ring Tone Status (normal ring)
14: Ring while Busy Tone Status
15: Phone Off-hook Status
16: Phone Busy
17: Call Connected
18: Call Transfer
19: Reserved
1A: Call Disconnected (End Command)
1B: Attention (Link) Request
1C: Attention (Link) Acknowledge
1D: Command End
1E: Command Acknowledge
1F: Call Forward Request
20: Phone Number Tryout (broadcast)
21: Phone Number Broadcast
22: Phone Name Broadcast
23: Phone Number Delete Broadcast
24: Reserved
25: Phone Number Already Exists
26: Phone Directory Request
27: Broadcast Phone Directory Request

TABLE 11-continued

28: Phone Directory Broadcast
29: Phone Directory Transmit
2A: Phone Directory Received
2B: Disable Phone Device Broadcast
2C: Enable Phone Device Broadcast
2D: Phone Set Inventory Request Broadcast
2E: Device Tally Broadcast
2F: Device Group/Type Request
30: Device Group/Type Status
31: Device Group/Type Configure
32: Device Group/Type (Broadcast by Non Ethernet Phone)
33: Reserved
34: Reserved
35: Data Message Storage Request
36: Voice Message Storage Request
37: Data Message Storage Acknowledge
38: Reserved
39: Retrieve Data Message
3A: Retrieve Voice Message
3B: Retrieve Next Data Message
3C: Retrieve Next Voice Message
3D: Retrieve Previous Data Message
3E: Retrieve Previous Voice Message
3F: Retrieve Data Message N
40: Retrieve Voice Message N
41: Reserved
42: Reserved
43: Data Message Available
44: Voice Message Available
45: Delete Current Data Message
46: Delete Current Voice Message
47: Delete All Data Messages
48: Delete All Voice Messages
49: Reserved
4A: Reserved
4B: Data Message Deleted
4C: Voice Message Deleted
4D: Data Mail Box Empty
4E: Voice Mail Box Empty
4F: Data Mail Box Full
50: Voice Mail Box Full
51: Data Message Ready
52: Reserved
53: Password Request
54: Password Transmit
55: Password OK
56: Password not OK
57: Call Park Retrieve
58: Call Park Available
59: Remote Call Pickup
5A: Program Call Forward
5B: Paging
5C: Call Park Request
5D: Call Park Acknowledge
5E: Reserved
5F: Time Transmit
60: Date Transmit
61: Reserved
62: Call Log Request
63: Reserved
64: Device Polling
65: Bridge Feature Program
66: Device Activity Request
67: Device Activity Report
68: Device Account Open
69: Device Account Close
6A-DF: Reserved
E0: Retrieve Firmware Version
E1: Retrieve Hardware Version
E2: Reserved
E3: Reserved
E4: Firmware Version/Revision Number
E5: Hardware Version/Revision Number
E6: Reserved
E7: Reserved
E8: Reserved
E9: Transmit Data Loop Back
EA: Echo Data Loop Back
EB: Command Error Status TABLE 11-continued EC: Command Does not Exist
ED: Request
EE: Acknowledge
EF: Reserved
F0: Firmware Update Download Broadcast
F1: Firmware Update Download Request
F2: Firmware Update Download Transmit
F3: Firmware Download Acknowledge
F4: Key Map Download Request
F5: Key Map Download
F6-FF: Reserved Table 11 above is another version of table 4 with some of new commands added in and described below (not all commands are listed):

23: Phone Number Delete Broadcast. Broadcasted to all Network Devices by the network phone to inform the destination devices that it abandons its current phone number. All the network devices remove the phone number and the MAC addresses of the network phone from their LUTs. This command is needed in the case where a self-configured phone connects successfully to the network with its default phone number. It then finds out that its number is totally out of bound with the ones in the directory. It then issues this command to abandon its just acquired number and uses the next available number from the phone directory for its new number. It then follows, as shown in FIG. 42A, all the needed steps to complete the new phone number configuration process. As mentioned previously in the description paragraph of Table 8, the internal phone (extension) numbers should be the subset of the external phone numbers. This command allows the network phone configure itself by picking the next available phone number (in the directory) within the range and thus comply with the requirement. In other words, the user should configure the first phone (phone #1 or digital attendant) in the network manually, so its extension matches the least significant digits of the assigned phone number (by the phone company). Afterward, all other phones can self-configure and assign themselves the next available extensions, which fall within the range allocated by the phone company.

2B: Disable Phone Device. Broadcasted to all Network Devices by the trunk line card device/digital attendant or phone #1 to all network devices that network phone device (its phone and MAC numbers in the data field) is to be removed from the phone directory (purged from LUTs). It can no longer be configured either manually or automatically into the system.

2C: Enable Phone Device. Broadcasted to all Network Devices by the trunk line card device/digital attendant or phone #1 to all network devices that network phone device (its phone and MAC numbers in the data field) is to be enabled so it can be configured into the network later. This command is used to enable the previously disabled device.

53: Password Request. Sent by Phone #1 or Trunk line card device (if there in no phone #1) to destination phone when the later is first plugged online. The destination phone will respond with password transmit command. See explanation below 54: Password Transmit. Send to the Network Telephone Destination Phone who requests the password. This command along with Passwork OK and Password not OK (codes 55 and 56) are part of the password verification protocol so it can prevent unwanted phone devices from configuring into the network. This can happen in the wireless LAN where hubs/switches are within working distance of the neighboring phones.

57: Call Park Retrieve. Send to the Network Telephone Destination Phone Device (where the call is parked) for Call Park Retrieval. Upon receiving this command, the called device will transfer the call to the Caller, if only one parked call is available. If multiple parked calls are available, see code 58 below.

58: Call Park (Retrieve) Available. Send to the Network Telephone Destination Phone who request the call part retrieval if more than one call is parked. The Call Part Retrieve Command is issued again with the line number so the appropriate call is forwarded.

5C: Call Park Request. Send to the network phone device (Phone or digital attendant) for Call Park for later Retrieval. The destination phone device responds with Call Park Acknowledge to Source Phone.

5D: Call Park Acknowledge. Send to the Network Telephone Destination Phone to acknowledge that the call is being parked by the source phone.

Figure 47:
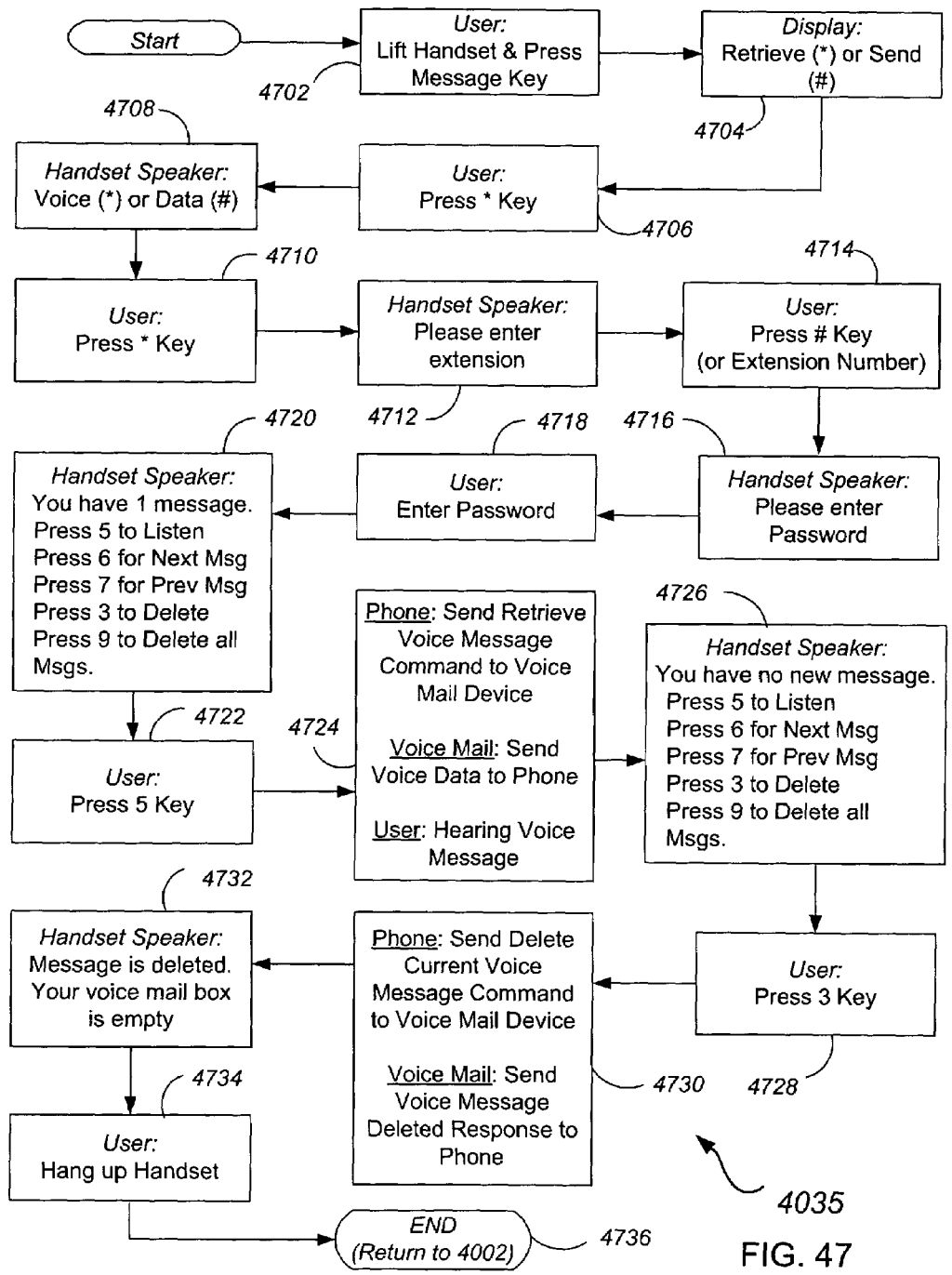
FIG. 47 shows a flow chart illustrating the process of retrieving a voice message from a network telephone in accordance with an embodiment of the present invention.
Figure 54:
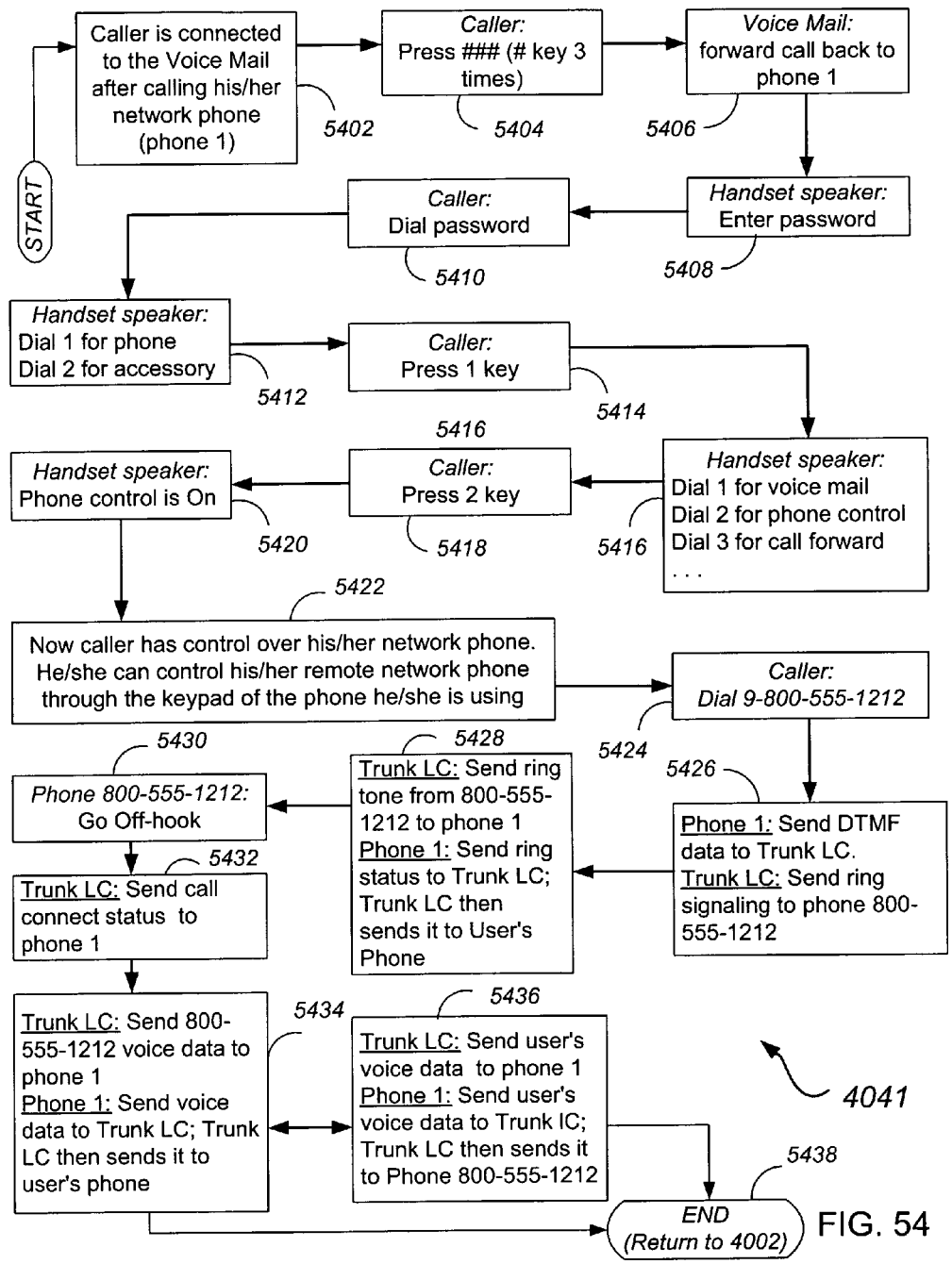
FIG. 54 shows a flow char illustrating the process occurring during a calling in a network phone and using it as a remote phone to call another telephone in accordance with an embodiment of the present invention.

FIG. 47 shows a flow chart 4035 illustrating the process of retrieving a voice mail message using a network phone, e.g., phone 10 of FIG. 28A, in accordance with an embodiment of the present invention. In this process, the user lifts the handset or presses hand-free key 3006h, and then presses the Message key 3006e, in step 4702. The user chooses to retrieve voice message by pressing "*" keys, in steps 4706 and 4710. In steps 4714 and 4718, the user enters extension and password respectively. The handset speaker prompts the user various choices on voice menu, in step 4720. The user presses "5" key, in step 4722, in order to listen to the message, in step 4724. After listening to the message, the user decides to erase it by picking "3" key, in step 4728. In step 4732, the message is deleted and the user hangs up the handset, in step 4734. Retrieving voice mail, as well as other functions can be controlled by any other phone inside, or outside of the network. An example is for the user to call his/her network phone from an external phone. The call is connected to the voice mail device after a short time since nobody there answers the phone (the caller calls his/her own phone from another phone). He/she then presses "#" keys three times, which will make the voice mail device transfer the connection back to the (user's) network phone. The caller then enters his/her password. The phone then gives the caller an audio menu of selection he/she can choose such as: Dial "1" to listen to voice mail. Dial "2" to have control over his/her network phone so he can use his/her home phone to call another phone, as shown in FIG. 54 example, via company phone without incurring long distance charge for company business. Dial "3" for forwarding all calls intended to his company phone to another phone and so forth.

FIGS. 48 to 53 illustrates various functions of a netphone with flow charts on the right hand side of the drawings, and corresponding netphone display screens associated with the respective netphone functional steps (joined by dotted lines in the drawings) on the left hand side of the drawings.

Figure 48:
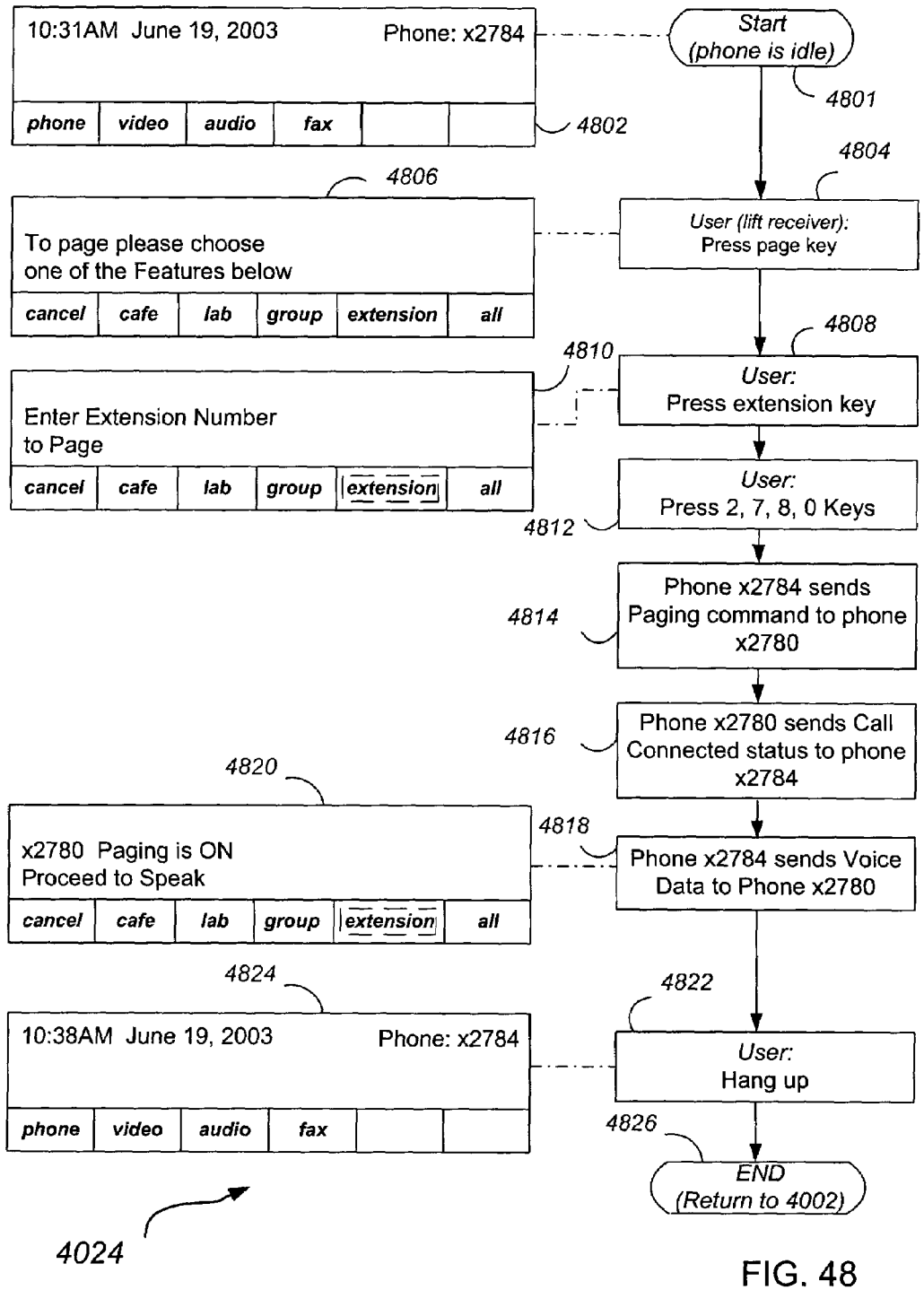
FIG. 48 shows a flow chart illustrating the process for paging in accordance with an embodiment of the present invention.

FIG. 48 shows a flow chart 4024 illustrating a process for paging somebody at another extension, using a network phone, e.g., phone 10, in accordance with an embodiment of the present invention. The user starts the process by lifting the handset and pressing the Page key 3006c, in step 4804 while the phone is in idle mode, in step 4802. The display prompts the user for a choice, in step 4806. The choices are cafeteria, lab, group, phone extension, or all (all phones). In this example, the user chooses phone extension by pressing extension key 3003e, in step 4808. In step 4810, the display prompts for the extension phone number to which the page is to be directed. In this example, the user enters '2780' by pressing "2","7","8" and "0" keys, in step 4812. In step 4814, phone '2784' sends a paging command to phone '2780'. In step 4816, phone '2780' sends to phone '2784', a 'Call-connected' command. In step 4818, the phone at '2784' sends user's voice data to phone at '2780' and so indicated by the display, in step 4820. The phone finally goes back to idle mode, in step 4824, after the user finishes talking and hangs up the handset, in step 4822.

Figure 49A:
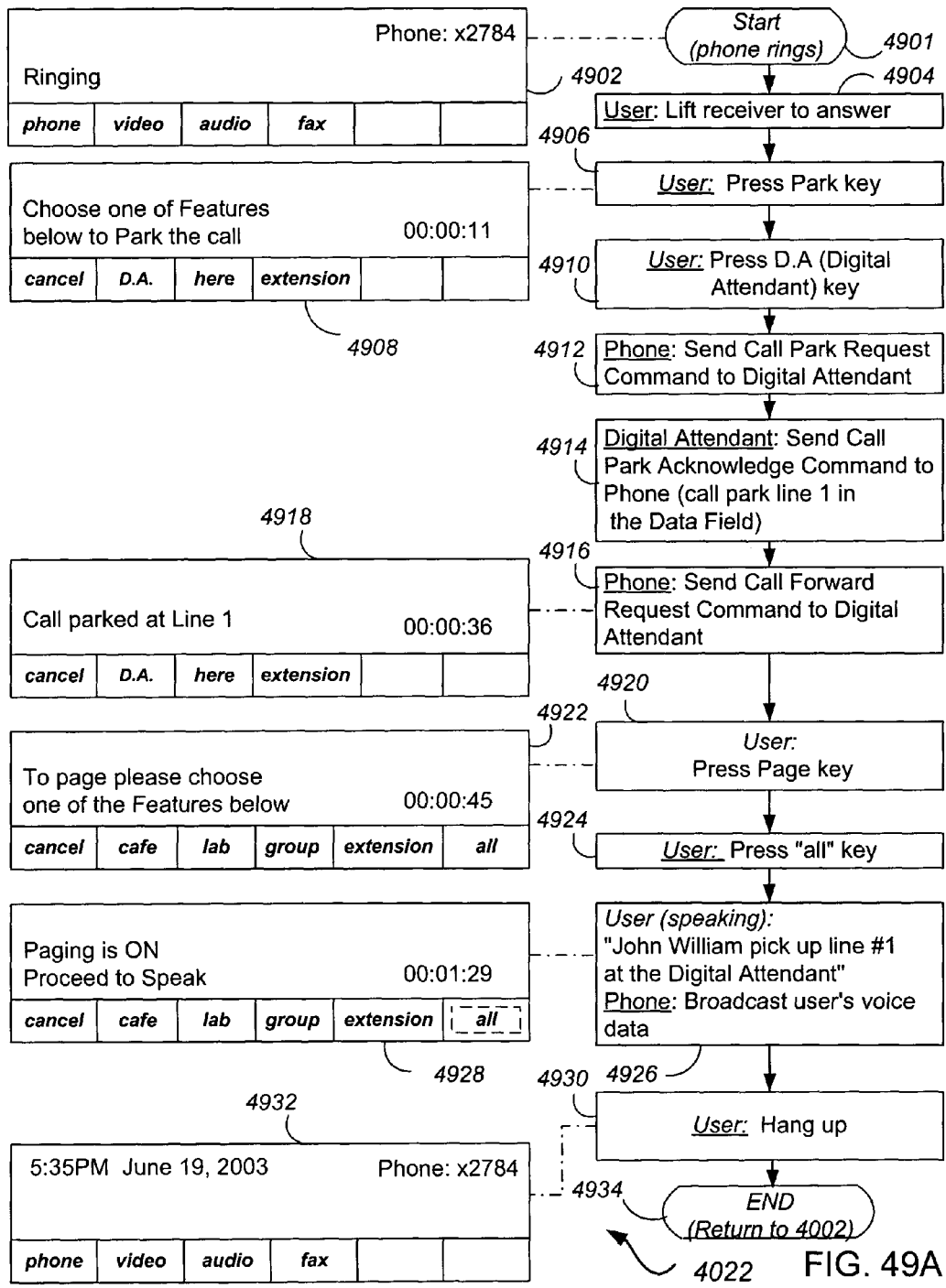
FIG. 49A shows a flow chart illustrating the process of parking a call at the digital attendant in accordance with an embodiment of the present invention.

FIG. 49A shows a flow chart 4022 illustrating the process of parking a call at the digital attendant, in accordance with an embodiment of the present invention. The user, in this example, answers the call from an outside caller (800-555-1212) and finds out that it is intended for John William who is not there. The user then parks the call at the digital attendant; waits for the response back from the digital attendant to see which line the call is parked at, and then pages John. The process starts at step 4902 when the phone is ringing and the user answers the call by picking it up, in step 4904. The user finds out that the call is intended for John William who is not in sight. The user then decides to park the call, in steps 4906. The display offers multiple selections such as: parking the call at the D.A. (digital attendant) key 3003b, here (at this extension) key 3003c or another extension key 3003d, in step 4908. The user picks digital attendant choice by pressing key 3003b, in step 4910. The phone sends call park request command to the digital attendant, in step 4912. The digital attendant sends back the call park acknowledge command making line 1 available to park the call to the phone, in step 4914, who then forwards the call to the digital attendant, in step 4916. The user sees the result at the display, in step 4918. The user then starts paging by pressing Page key 3006c, in step 4920. The display then gives the user the selection of whom or where to page. The choices are cafeteria, lab, group, phone extension, or all (all phones), as shown in step 4922. The user proceeds to pick all key allowing the paging to go everywhere (all phones) in the company so John William can be reached, in step 4924. The paging can start as indicated by the display, in step 4928. The user does the paging, which phone 2784 broadcasts to all phones in the network, in step 4926, and hangs up the phone when he/she finishes it, in step 4930. The phone goes back to the display of idle mode in step 4932.

The network phone system offers the paging capability, as indicated by steps 4806 of FIG. 48 and 4922 of FIG. 49A so that no separate speaker wiring is needed in the network phone system. In the big or medium sized company, the group paging (i.e. marketing, sale, engineering so forth) feature (see Table 5 first column, Group Paging feature) allows a particular group to be paged so someone from the group can be alerted since he/she will likely be in the vicinity. Lab and cafeteria are network phones whose extensions are already programmed into the feature keys and therefore require no extension (number) dialing in order to page the lab or cafeteria. This feature also replaces paging speaker in buildings, and the intercom for a small business or at home.

Figure 49B:
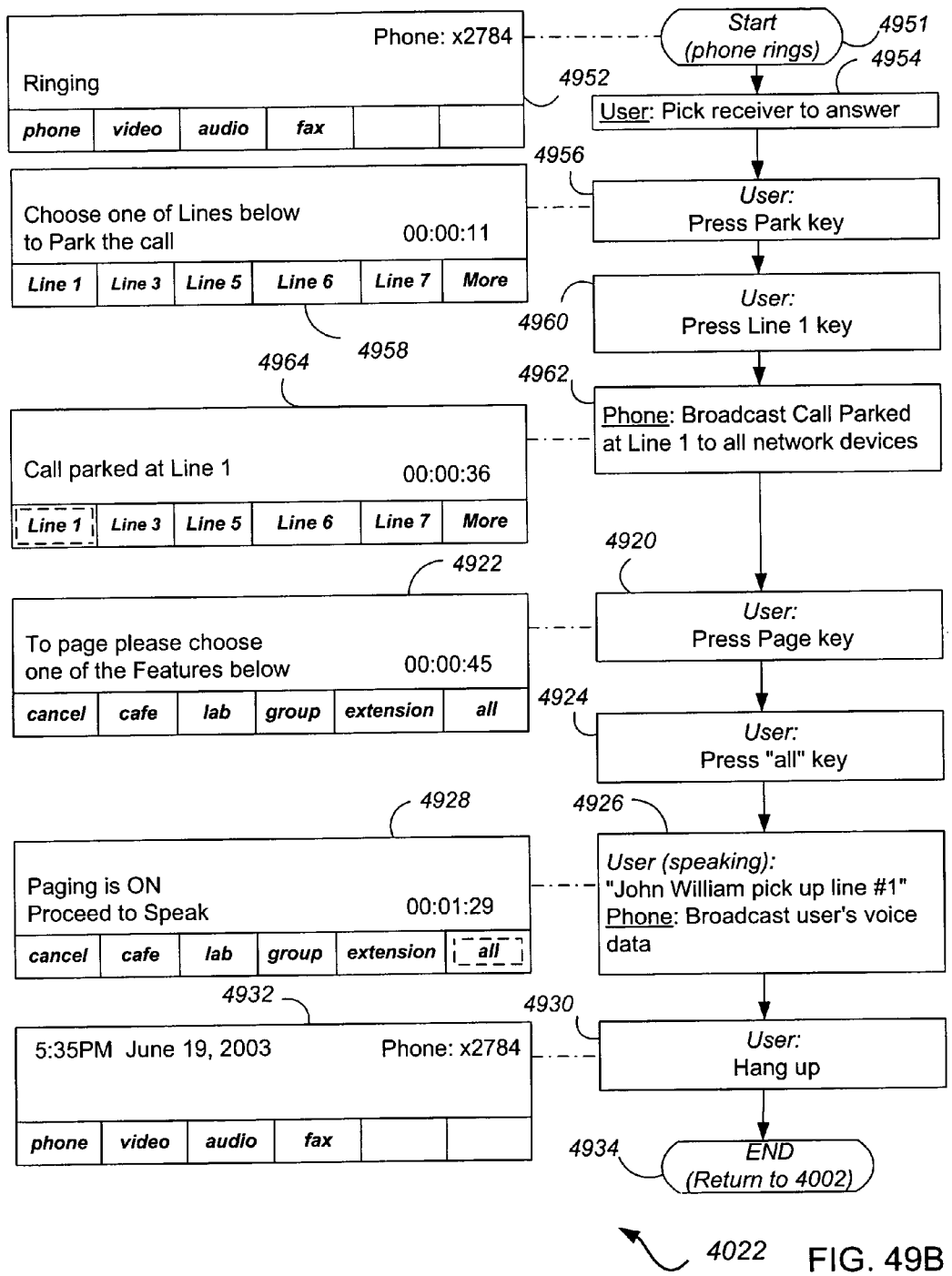
FIG. 49B shows a flow chart illustrating another process of parking a call in accordance with an embodiment of the present invention.

FIG. 49B shows a flow chart 4022 illustrating another process of parking a call at the line #1, in accordance with an embodiment of the present invention. The same scenario happens like the one in FIG. 49A (but the process is different) when the phone rings and the user parks the call so another person can pick it. Steps 4952 to 4956 are identical like steps 4902 to 4906 of FIG. 49A. In step 4958, the phone gives the user many lines to park the call. The choice of lines #2 & #4 is missing because they have other calls parked at them at the moment. All these lines are logical lines and can be with any phones in the network. In this example, the call parked at line #2 can be at one phone while the one at line #4 can be at different phone in the network. The user presses line #1 key 3003a, in step 4960, to park the call at line #1. The phone broadcasts "call park at line #1" to all network devices, in step 4962; in other words, it has a call parked at line #1, as shown in step 4964, and therefore, line #1 is not available anymore Oust like lines #2 and #4). See FIG. 49A for the description of steps 4920 to 4932.

FIG. 49B shows that lines where the calls parked can be controlled by any phone, reside at any phone(s) in the network, and with no involvement of the digital attendant since the lines are not physical lines like the current PBX system where they are controlled by fixed keys. The numbers of lines are therefore not constrained by the keypad.

Figure 50A:
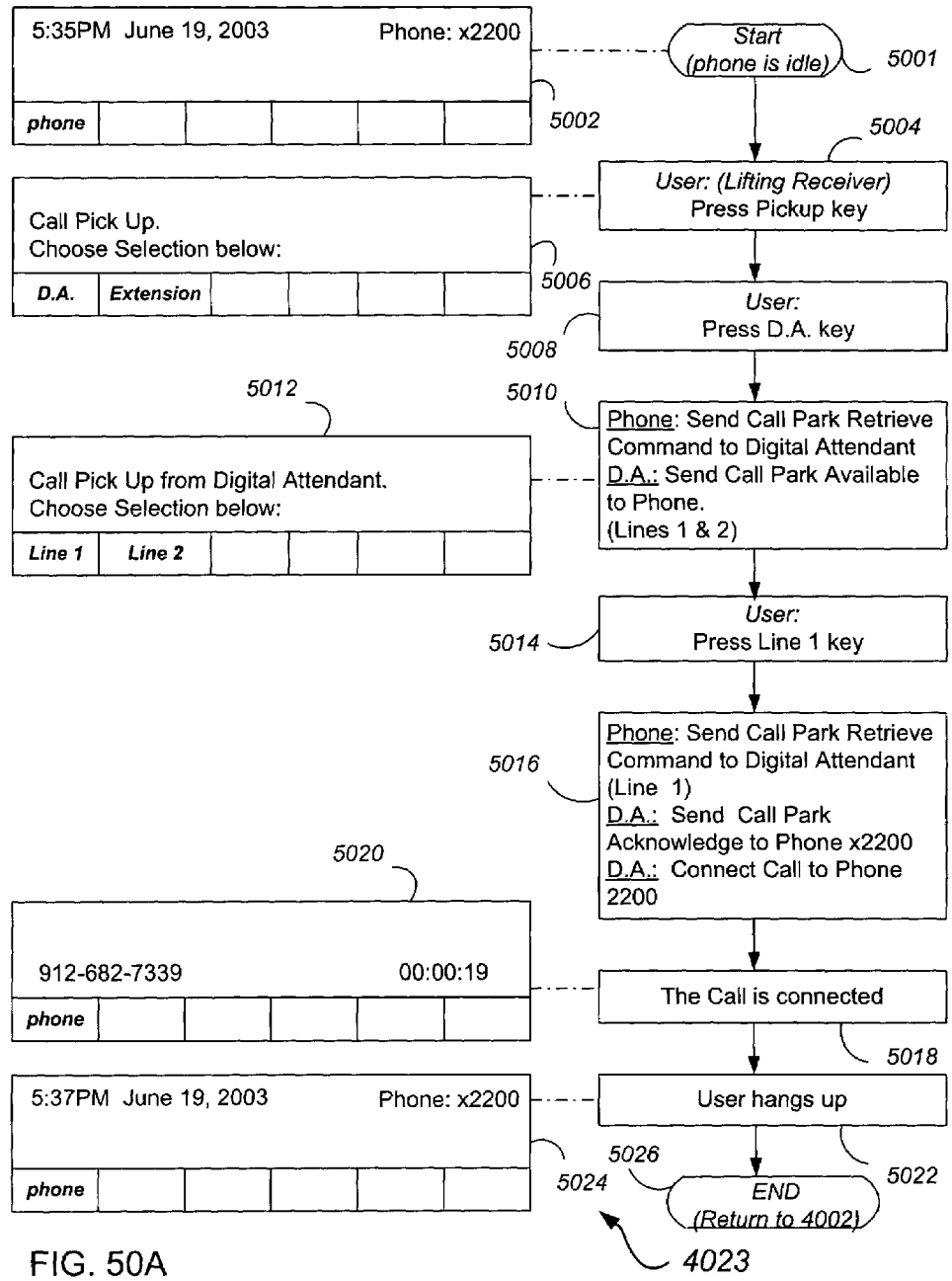
FIG. 50A shows a flow chart illustrating the process of picking up a call parked at the digital attendant in accordance with an embodiment of the present invention.

FIG. 50A shows a flow chart 4023 illustrating the process of picking up a call parked at the digital attendant, in accordance with an embodiment of the present invention. FIG. 50A is the follow up of FIG. 49A. The user picks up phone x2200 in this example and presses pickup key 3006j, in step 5004. The display instructs the user either to use key 3003a (D.A soft key) to pick up the call from the digital attendant or from another extension using key 3003b, in step 5006. The user presses D.A. key in order to retrieve the call from the digital attendant, in step 5008. The phone requests call park retrieve command to digital attendant and the digital attendant sends call retrieval with lines 1 and 2 availability, in step 5010. The display indicates there are two parked calls to be picked at lines 1 and line 2, in step 5012. The user presses line 1 key, in step 5014, since he/she was so paged in FIG. 49A. The phone sends "call park retrieve" from line 1 to the digital attendant, who in turn acknowledges, and connects the call to the phone, in step 5016. The call is connected and the user can talk to the caller, in step 5018, and so indicated by the display, in step 5020. Finally, the user hangs up, step 5022, and the phone goes back to idle state, as indicated by step 5024.

Figure 50B:
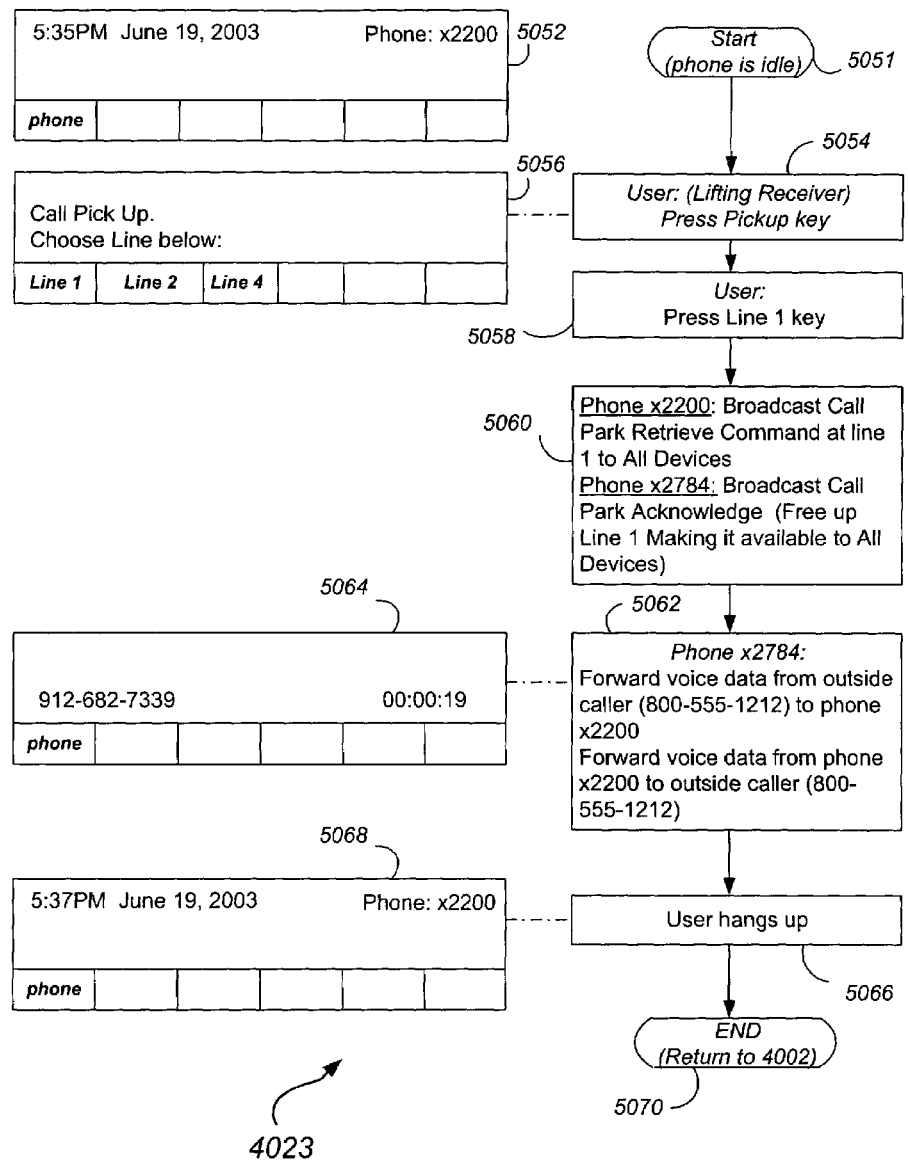
FIG. 50B shows a flow chart illustrating another process of picking up a parked call in accordance with an embodiment of the present invention.

FIG. 50B shows a flow chart 4023 illustrating another process of picking up a call parked at the line 1, in accordance with an embodiment of the present invention. FIG. 50B is the follow up of FIG. 49B. The user picks up phone extension "2200" in this example and presses pickup key 3006j, in step 5054. The choice of line to be picked up either is line 1, line 2 or line 4, as shown in step 5056. The user presses line 1 key, in step 5058, since he/she so paged in FIG. 49B. In step 5060, phone extension "2200" broadcasts 'call park retrieve command at line 1' to all devices and phone extension "2084" broadcasts 'call park acknowledge command' thus making line 1 available to other phones. In steps 5062 and 5064, the user talks to the outside caller (800-555-1212) since the conversation is now being forwarded by phone extension "2784" between the user and the outside caller. Another alternative, in step 5062, is for phone extension "2784" to send 'call forward request command' to digital attendant device (or trunk line device) to forward the call directly to phone extension "2200" so it does not have to provide the communication link for the conversation. Steps 5066 and 5068 are when the conversation ends and phone extension "2200" goes back to idle state. Phone extension "2784", in step 5062, is forwarding the conversation between two parties but is still available for any user to use it. The user can lift up phone extension "2784" to make phone call or to answer a call without affecting the connection between phone extension "2200" and the outside caller. In other words, all links in the network phone are logical.

Figure 51:
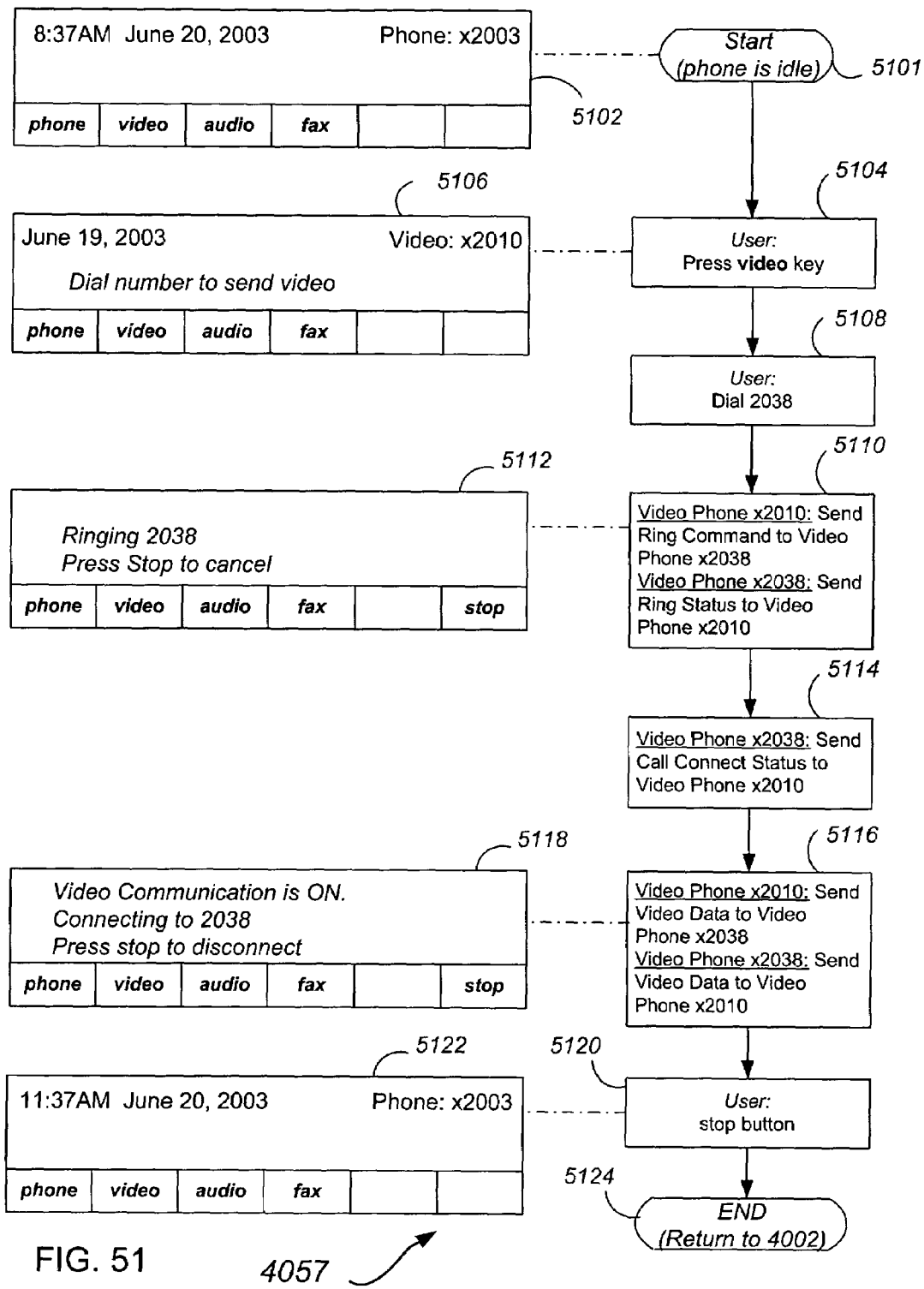
FIG. 51 shows a flow chart illustrating the process occurring during a video call (video communication) between two network phones (video accessories) in accordance with an embodiment of the present invention.

FIG. 51 shows a flow chart 4057 illustrating the process occurring during a video call between two network phones, in accordance with an embodiment of the present invention. The process starts at step 5102 while the display shows a default phone menu screen. It also displays its accessories such as: video 3003b, audio 3003c, and fax 3003d. The user presses the 3003b key (video key function), in step 5104, to choose video function whose display menu is shown, in step 5106, with the videophone extension number "2010". The user then dials extension number "2038" to make to video connection (while a voice and/or accessory connection(s) can be active or not active at the time), in step 5108. Videophone extension "2010" sends ring command to and receives ring status from videophone extension "2038", in step 5110, and the display indicates what is going on, in step 5112. In step 5114, videophone extension "2038" sends call connected status to videophone extension "2010". In step 5116, the video connection is made and communication is on and its status is displayed, in step 5118. The connection is active until the user presses stop 3003f key, in step 5120, or videophone extension "2038", stops the communication and the device goes back to idle mode, as indicated by step 5122.

Figure 52:
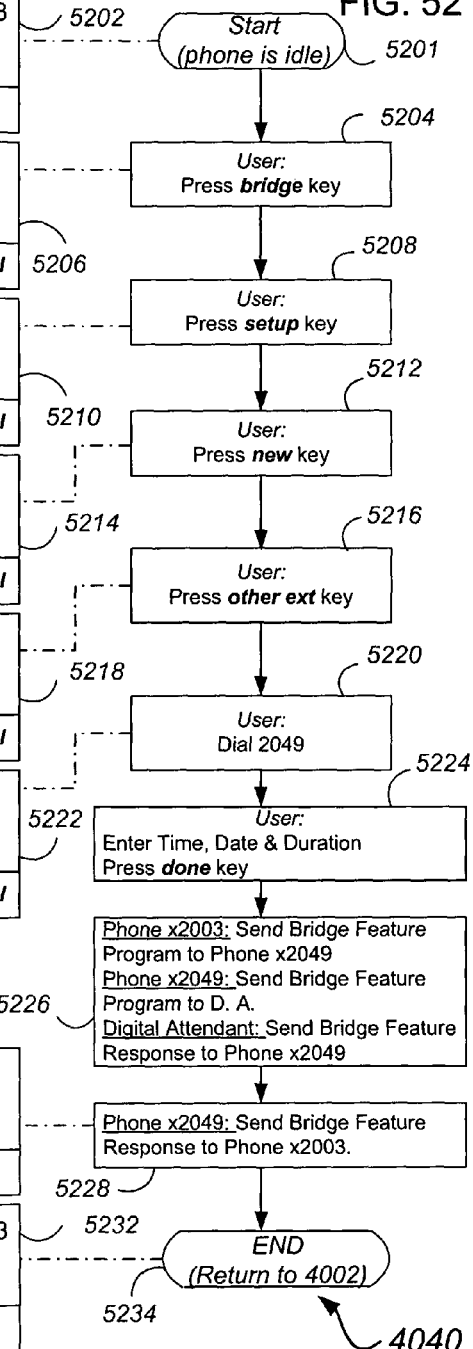
FIG. 52 shows a flow chart illustrating the process occurring during setting up a conference bridge to another phone in accordance with an embodiment of the present invention.

FIG. 52 shows a flow chart 4040 illustrating the process occurring during the set up of a conference bridge, in accordance with an embodiment of the present invention. The conference bridge is being setup from phone extension "2003" to phone extension "2049", so participants can call in phone extension "2049" for teleconference. The process starts at step 5202 while phone extension "2003" is at idle mode. The user presses bridge key 3006k, in step 5204. The display gives the user the choice of setting up a conference bridge (setup key 3003a) or calling in for a conference call (conf. key 3003b), in step 5206. The user presses setup key 3003a, in step 5208, so he/she can program a call conference set up. The display asks if it is for the new conference bridge (new key 3003a) or existing conference bridge (existing key 3003b), in step 5210. The selection of existing conference bridge will allow the user to change or cancel previously programmed bridged conference. In step 5212, the user selects new key, so he/she can set up a brand new conference bridge. In step 5214, the display asks if the conference bridge is for this phone extension "2003" (this ext key 3003a) or another extension (other ext key 3003b). In step 5216, the user picks other ext key. The display then prompts the user to dial the extension number, in step 5218. The user dials extension "2049", in step 5220, so he/she can set up the conference bridge for that extension. In step 5222, the display is ready for conference bridge setup. It instructs the user to enter time, date, and duration of the conference the user is setting up. It also allows the user the option to see its schedule (view schedule key 3003b), so the user can choose the time and date, which will not conflict with what already scheduled. The user enters time, date, duration, and presses done key 3003a, in step 5224. Phone extension "2003" sends bridge feature program command to phone extension "2049". Phone extension "2049" in turn sends bridge feature program to the digital attendant. Digital attendant sends bridge feature response back to phone extension "2049", in step 5226. In step 5228, phone extension "2049" sends bridge feature response to phone extension "2003". In step 5230, the display shows the conference bridge is already set up for extension "2049". The duration of the conference is 1 hour. The date is Jun. 19, 2004 and the time is 9:30 AM. It also displays the bridge number so caller from inside the network uses it to dial in for conference call. External caller calls in the main number (digital attendant), after the connection is made to the digital attendant, and then dials the bridge number for conference call. From step 5230, the display will go back to idle mode, in 30 seconds (or any predetermined time) as indicated by step 5232.

Figure 53:
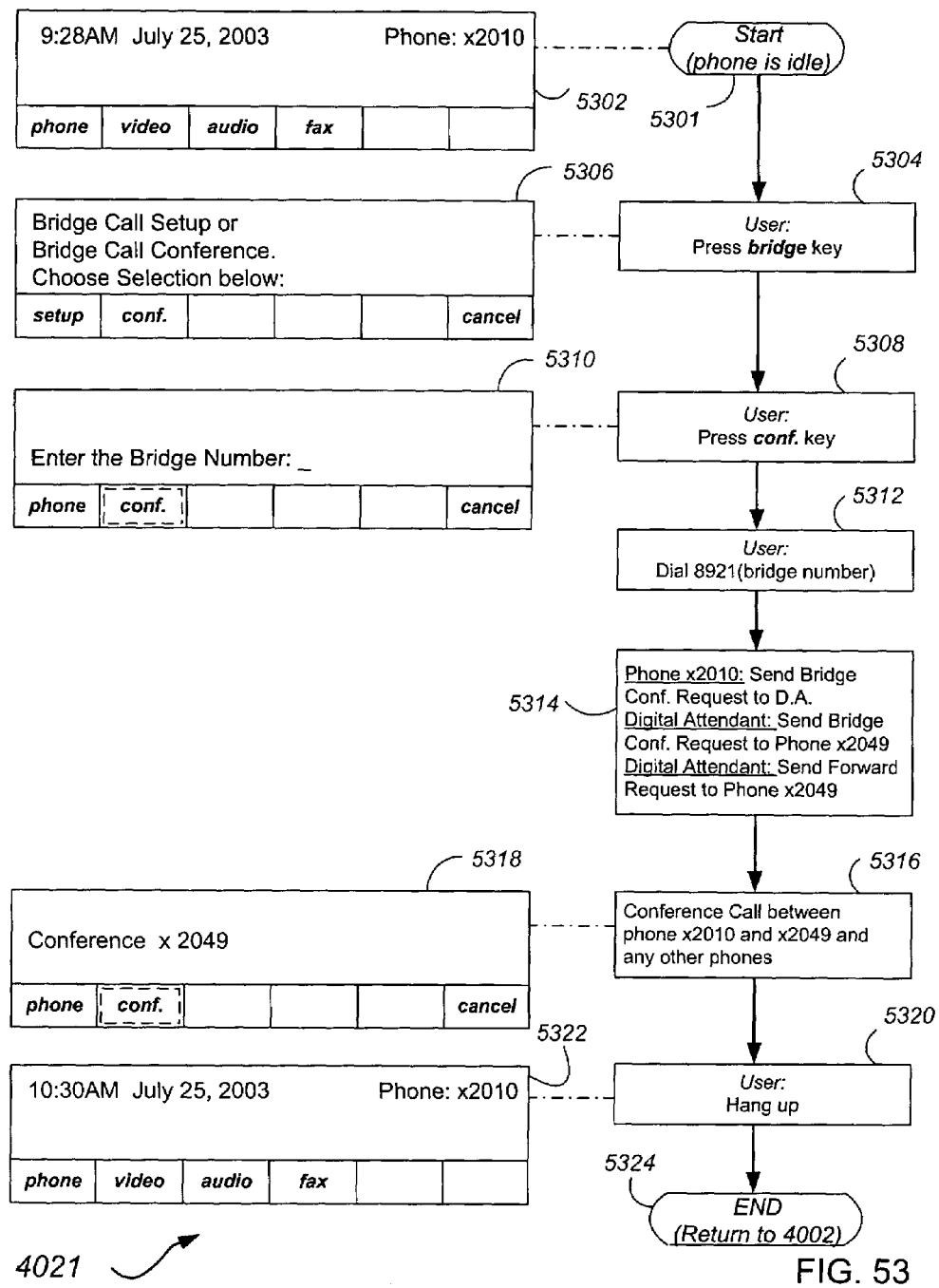
FIG. 53 shows a flow chart illustrating the process occurring during an incoming call for a bridged conference to another phone in accordance with an embodiment of the present invention.

FIG. 53 shows a flow chart 4021 illustrating the process occurring during an incoming call for a bridged conference to another phone, in accordance with an embodiment of the present invention. In this process, the user from phone extension "2010" calls in for a conference call (which was set up in FIG. 52 as an example). The process starts at step 5302 while phone extension "2010" is in idle mode. The user presses bridge key 3006k, in step 5304. This display asks if it is for conference call set up (setup 3003a) or conference call in (conf. 3003b), in step 5306. The user presses conf. key 3003b so he/she can dial in for conference call, in step 5308. The display prompts for the bridge number, in step 5310. The user enters the bridge number, in step 5312. Phone extension "2010" sends bridge conference request command to digital attendant. The digital attendant in turn sends bridge conference request command to phone extension "2049" and sends call forward request to phone extension "2049", in step 5314. Conference call is established between phone extensions "2010" and "2049", in step 5316. The display shows the conference call is active, in step 5318. After finishing the conference call, the user hangs up, step 5320, and the phone goes back to idle state, as indicated by step 5322.

FIG. 54 shows a flow chart 4041 illustrating the process occurring during the calling into a network phone and using it as a remote phone to call another telephone, in accordance with an embodiment of the present invention. This feature allows user to control network phone from another phone and uses it as a remote phone, either to make a phone call to another telephone, or program the network phone remotely. In step 5402, the caller called in his/her network phone, e.g., phone #1. Since there was no answer, he is connected to the voice mail device. The caller then press "#" key three times, in step 5404, to get phone #1 in attention mode (Voice mail forwards the call back to phone #1 after detecting the "#" tone three times, in step 5406). The caller hears from phone #1, through the handset speaker, asking him/her to enter the password, in step 5408 and he/she dials his/her password, in step 5410. Phone #1 (through the handset speaker) asks to pick "1" for phone function or "2" for accessory function, in step 5412. The caller then dials "1" for phone function, in step 5414. Phone 1 (through the handset speaker) announces the different selection, in step 5416 and the caller picks "2", in step 5418, for call control since he/she would like to use the handset from the phone he/she is calling to control the network phone #1 and uses it as if he/she is there using phone #1, as explained in step 5422. He/she then dials calls phone 800-555-1212, in step 5424, so the connection is from the phone the caller is using through network phone #1 to phone 800-555-1212. The trunk line card device within network phone system, which phone #1 belongs, should have two external phone lines or more since the trunk line card device is the point of connection of user's phone to phone #1, and also the connection of phone #1 to phone 800-555-1212. Phone #1 sends DTMF data (800-555-1212) to trunk line card device, and trunk line card device in turn rings phone 800-555-1212, as shown in step 5426. The trunk line card device sends ring tone from phone 800-555-1212 to phone #1, and phone #1 in turn sends ring tone to user's phone through the trunk line card device, in step 5428. In step 5430, somebody answers at phone 800-555-1212 and the trunk line card device sends call connected status to phone #1, in step 5432. The conversation takes place, in steps 5434 and 5436. This application is useful when an employee working at home (or small satellite office) needs to make long distance business call. He/she can dial in to the local office and utilize company network for a lower long distance connection. At the end of the conversation, the user hangs up and the phone goes to idle mode (end state), as indicated by step 5438.

Figure 55:
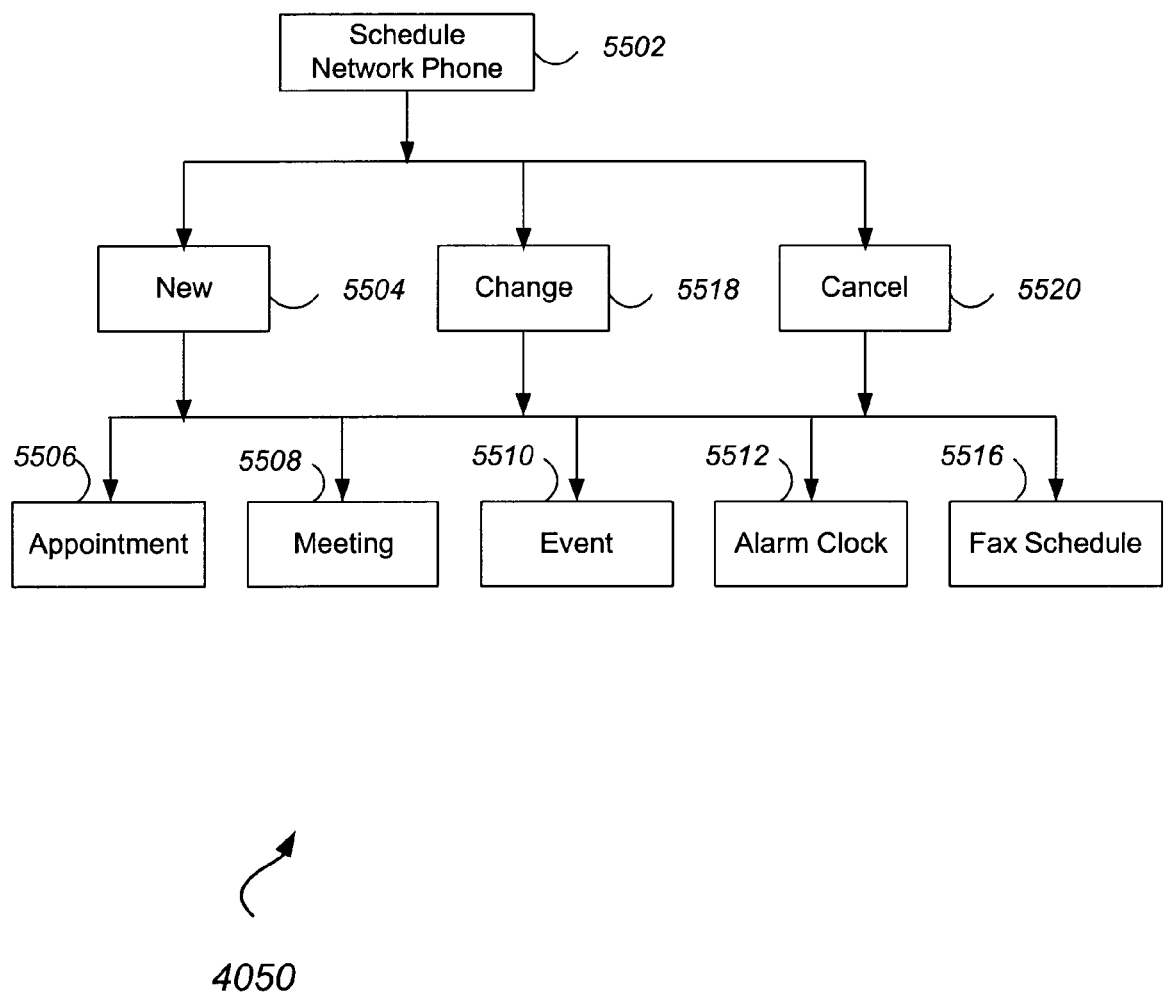
FIG. 55 shows a chart illustrating the program steps taken by a network phone during the scheduling process in accordance with an embodiment of the present invention.

FIG. 55 shows a flow chart 4050 illustrating the program steps taken by a network phone during the scheduling process, in accordance with an embodiment of the present invention. Network has the option of allowing the user to schedule reminder of appointment 5506, meeting 5508, events 5510, and alarm 5512. FIG. 55 also shows schedules can be changed 5518 or cancelled 5520 and faxing can be scheduled (step 5516) at a later date or later time for any purposes.

Figure 56:
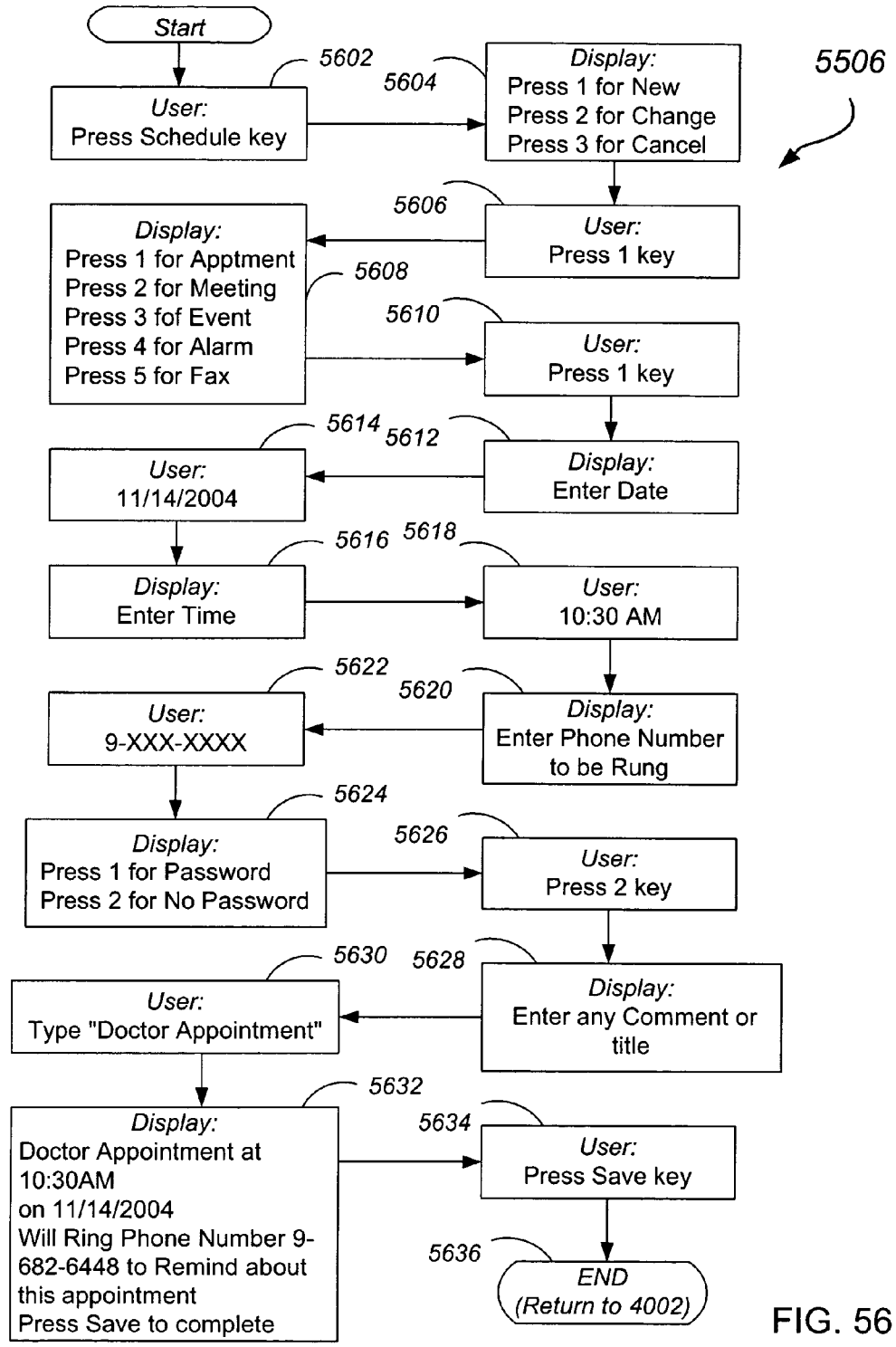
FIG. 56 shows a flow chart illustrating the program steps taken by a network phone during an appointment scheduling reminder process in accordance with an embodiment of the present invention.

FIG. 56 shows a flow chart 5506 illustrating the program steps taken by a network phone during an appointment scheduling reminder process, in accordance with an embodiment of the present invention. This process starts at step 5602 when the user presses schedule key 3006f in FIG. 30. The display asks to pick several options as shown in step 5604. Press "1" for new schedule; press "2" for making changes of schedule or press "3" for canceling of old schedule. The user presses "1", in step 5606 and the display lists a choice of schedule remainder, in step 5608. The user picks appointment reminder schedule, in step 5610. He/she enters date and time of the schedule, in steps 5614 and 5618. He/she then enters destination phone number so the phone can call (the destination phone) to reminder him/her about the schedule, in step 5622. The user has the option to use the password or not, in the case where personal or private matter requires a password to be reminded of the schedule, in step 5624. The user enters "Doctor's appointment", in step 5630 so he/she can be reminded about the doctor appointment on the date and time he/she entered, in steps 5614 and 5618. The display shows the doctor appointment schedule remainder summary and prompts the user to press save key, in step 5632. The schedule process ends after the user presses save key, in step 5634, as shown in step 5636.

Although the present invention has been described in considerable detail with reference to exemplary embodiments, modifications and variations may be made to the disclosed embodiments while remaining within the subject and spirit of the invention. Therefore, the spirit and scope of the appended claims should not be limited to the description of the preferred versions contained herein.

What is claimed is:

1. In a distributed directory telephony system, a digital attendant useful in association with at least one netphone, a voicemail device and a local area network, the digital attendant comprising:

a local area network interface configured to be coupled, via the local area network, to the at least one netphone and the voicemail device;

a telephony interface for coupling the at least one netphone to an external telephone system, and wherein each of the at least one netphone includes a netphone directory configured to store and to update network addresses for the digital attendant and the voicemail device, and wherein the voicemail device includes a voicemail directory configured to store and to update network addresses for the digital attendant and the at least one netphone; and an attendant directory configured to store and to update network addresses for the netphone and the voicemail device.

2. The digital attendant of claim 1 wherein the telephony interface is wireless.

3. The digital attendant of claim 1 wherein the telephony interface is based on a dial-up modem protocol.

4. The digital attendant of claim 1 wherein the telephony interface is based on a cable modem protocol.

5. The digital attendant of claim 1 wherein the telephony interface is based on an ISDN protocol.

6. The digital attendant of claim 1 wherein the telephony interface is based on an xDSL protocol.

7. The digital attendant of claim 1 wherein the telephony interface is based on a VPN protocol.

8. The digital attendant of claim 1 wherein the telephony interface is based on TCP/IP protocol.

9. The digital attendant of claim 1 wherein the external telephone system is a PSTN telephone system.

10. The digital attendant of claim 1 wherein the external telephone system is a PBX telephone system.

11. The digital attendant of claim 1 wherein the local area network is based on an Ethernet protocol.

12. The digital attendant of claim 1 wherein the local area network is wireless.

13. The digital attendant of claim 1 wherein the netphone is coupled to an external device.

14. The digital attendant of claim 13 wherein the external device is a USB device.

15. The digital attendant of claim 13 wherein the external device is a facsimile device.

16. The digital attendant of claim 13 wherein the external device is a video input device.

17. The digital attendant of claim 13 wherein the external device is a video output device.

18. The digital attendant of claim 1 wherein the at least one netphone is configured to schedule a reminder.

19. The digital attendant of claim 1 wherein the at least one netphone is configured to park a call.

20. The digital attendant of claim 19 wherein the at least one netphone is configured to pickup the parked call.

21. The digital attendant of claim 19 wherein the call is parked at the digital attendant.

22. The digital attendant of claim 21 wherein the at least one netphone is configured to pickup the parked call from the digital attendant.

* * * * *